(12) United States Patent
Murphy et al.

(10) Patent No.: US 8,200,532 B2
(45) Date of Patent: *Jun. 12, 2012

(54) SYSTEM AND METHOD FOR PROVIDING INCENTIVES TO PURCHASERS

(75) Inventors: Thomas P. Murphy, Ashburn, VA (US);
Steven D. Baker, Sterling, VA (US);
Howard I. Epstein, Rockville, MD (US)

(73) Assignee: ASN Holdings, LLC, Suwannee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,022

(22) Filed: Feb. 22, 2010

(65) Prior Publication Data

US 2010/0153198 A1    Jun. 17, 2010

Related U.S. Application Data

(63) Continuation of application No. 09/735,446, filed on Dec. 13, 2000, now Pat. No. 7,668,747.

(60) Provisional application No. 60/170,368, filed on Dec. 13, 1999, provisional application No. 60/208,504, filed on Jun. 2, 2000.

(51) Int. Cl.
*G06Q 30/00* (2006.01)

(52) U.S. Cl. ................... 705/14.15; 705/14.36
(58) Field of Classification Search ............. 705/14.15, 705/14.36

See application file for complete search history.

(56) References Cited

U.S. PATENT DOCUMENTS 4,674,041 A  *  6/1987  Lemon et al. .......... 705/14.35
5,185,695 A  *  2/1993  Pruchnicki ............. 705/14.26

(Continued)

FOREIGN PATENT DOCUMENTS

WO    WO9951031    * 10/1999

OTHER PUBLICATIONS

Williamson, Craig, "Re: Why Pay for Catalogs ?", Jan. 14, 1998, Usenet newsgroup: rec.models.railroad, message-ID: <34bd2ecb.0@masters>#1/1, (groups.google.com newsgroup archive).*

(Continued)

*Primary Examiner* — Michael Bekerman

(57) ABSTRACT

An online system presents remote users with static incentives, dynamic incentives and the ability to create and submit customizable incentives related to goods or services of interest to the user. By using the incentive delivery system, the user can research goods or services of interest and in an interactive fashion create an incentive package most desirable to the user and submit same to a central location. The systems performs decisioning routines on submitted incentive requests and makes such requests available for review. Ultimately, the submitted requests may be accepted or rejected or a counter-incentive may be issued to the user for consideration. A manufacturer, such as an automobile manufacturer, can offer incentives direct to its consumers and enter into an electronic dialogue with its customers to help drive profits and sales in the most efficient manner. For instance, where certain models of vehicles are in over-supply in a certain geographic region a manufacturer may in real-time tailor its incentive offerings to help account for seasonal or other demand events. Further, the manufacturer can in real-time see the response to its incentives offerings and make appropriate changes to insure the desired result of its marketing efforts is obtained. A graphical user interface enables the remote user to search products or services of interest and to selectively build desired incentives and submit same for acceptance.

8 Claims, 42 Drawing Sheets

U.S. PATENT DOCUMENTS

| | | | | |
|---|---|---|---|---|
| 5,245,533 | A | * | 9/1993 | Marshall .................... 705/14.13 |
| 5,502,636 | A | * | 3/1996 | Clarke ......................... 705/7.33 |
| 5,642,485 | A | * | 6/1997 | Deaton et al. .............. 705/14.25 |
| 5,761,648 | A | * | 6/1998 | Golden et al. .............. 705/14.36 |
| 5,794,207 | A | * | 8/1998 | Walker et al. ................... 705/77 |
| 5,822,735 | A | * | 10/1998 | De Lapa et al. ............ 705/14.26 |
| 5,855,007 | A | * | 12/1998 | Jovicic et al. .............. 705/14.26 |
| 5,915,243 | A | * | 6/1999 | Smolen ...................... 705/14.19 |
| 5,924,080 | A | * | 7/1999 | Johnson ........................ 725/138 |
| 5,956,693 | A | * | 9/1999 | Geerlings .................. 705/14.53 |
| 5,974,399 | A | * | 10/1999 | Giuliani et al. ............ 705/14.25 |
| 5,987,425 | A | * | 11/1999 | Hartman et al. ................ 705/20 |
| 5,999,914 | A | * | 12/1999 | Blinn et al. .................. 705/26.8 |
| 6,009,411 | A | * | 12/1999 | Kepecs ...................... 705/14.17 |
| 6,014,634 | A | * | 1/2000 | Scroggie et al. ........... 705/14.25 |
| 6,016,504 | A | * | 1/2000 | Arnold et al. ................. 709/200 |
| 6,035,280 | A | * | 3/2000 | Christensen ............... 705/14.26 |
| 6,075,971 | A | * | 6/2000 | Williams et al. ................ 725/23 |
| 6,101,484 | A | * | 8/2000 | Halbert et al. ............... 705/26.2 |
| 6,101,486 | A | * | 8/2000 | Roberts et al. ............. 705/14.66 |
| 6,105,003 | A | * | 8/2000 | Morohashi et al. .......... 705/26.8 |
| 6,119,100 | A | * | 9/2000 | Walker et al. ................... 705/20 |
| 6,330,543 | B1 | * | 12/2001 | Kepecs ...................... 705/14.17 |

OTHER PUBLICATIONS

Larson, Derek Roth, "Re: Sam's or Costco??", Nov. 5, 1998, Usenet newsgroup: misc.consumers, message-ID: <71sugh$rlf$2@flotsam. uits.indiana.edu>#1/1, (groups.google.com newsgroup archive).*

Lenny, "Re: Small Claims Court—The Judgement", Jul. 24, 1999, Usenet newsgroup: sci.electronics.repair, message-ID: <3799F6E4. 7F58@hotmail.com>, (groups.google.com newsgroup archive).*

Williamson, Craig, "Re: Why Pay for Catalogs ?", Jan. 14, 1998, Usenet newsgroup: rec.models.railroad, message-ID: 34bd2ecb. O@masters>#111, (groups.google.com newsgroup archive).*

Larson, Derek Roth, "Re: Sam's or Costco??", Nov. 5, 1998, Usenet newsgroup: misc.consumers, message-ID: 71sugh$rlf$2@flotsam. uits.indiana.edu>#1/1, (groups.google.com newsgroup archive).*

Lenny, "Re: Small Claims Court—The Judgement", Jul. 24, 1999, Usenet newsgroup: sci.electronics.repair, message-ID: 3799F6E4. 7F58@hotmail.com>, (groups.google.com newsgroup archive).* website: www.coupon.com, printed Oct. 25, 2000.*
website: www.hotcoupons.com, printed Oct. 25, 2000.*
website: www.otford.com, printed Oct. 25, 2000.*
website: www.cookco.com, printed Oct. 25, 2000.*

* cited by examiner

WELCOME TO AutoSavings.Net

Current Incentives | Current Interactive Incentives | Upcoming Interactive Incentives | Previous Interactive Incentives | My Next Interactive Incentives | My Information | Manuf. Links | Dealer Links | Consumer Aids | Chat Rooms | Consumer Feedback Save@AutoSavings.Net

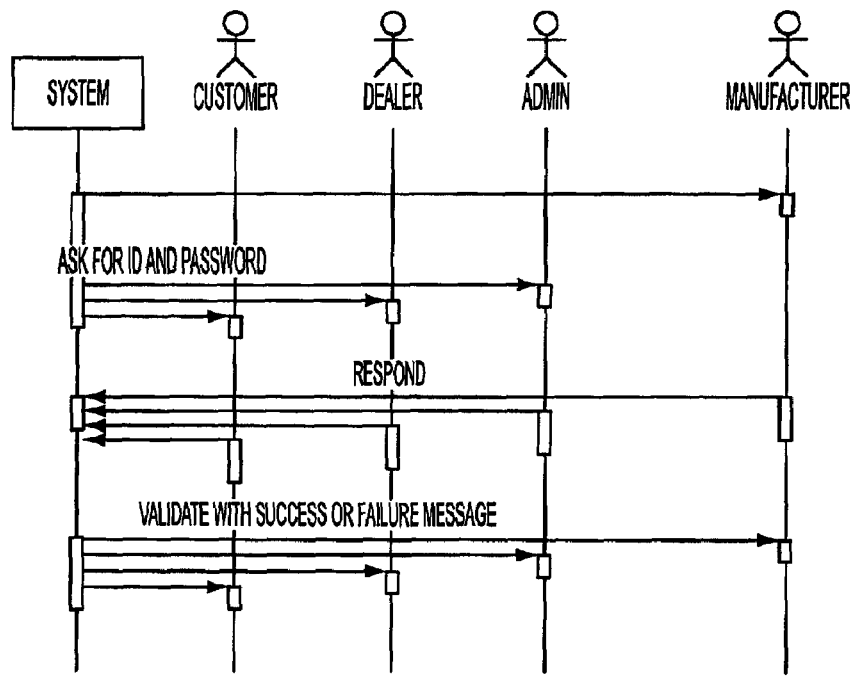
FIG. 13
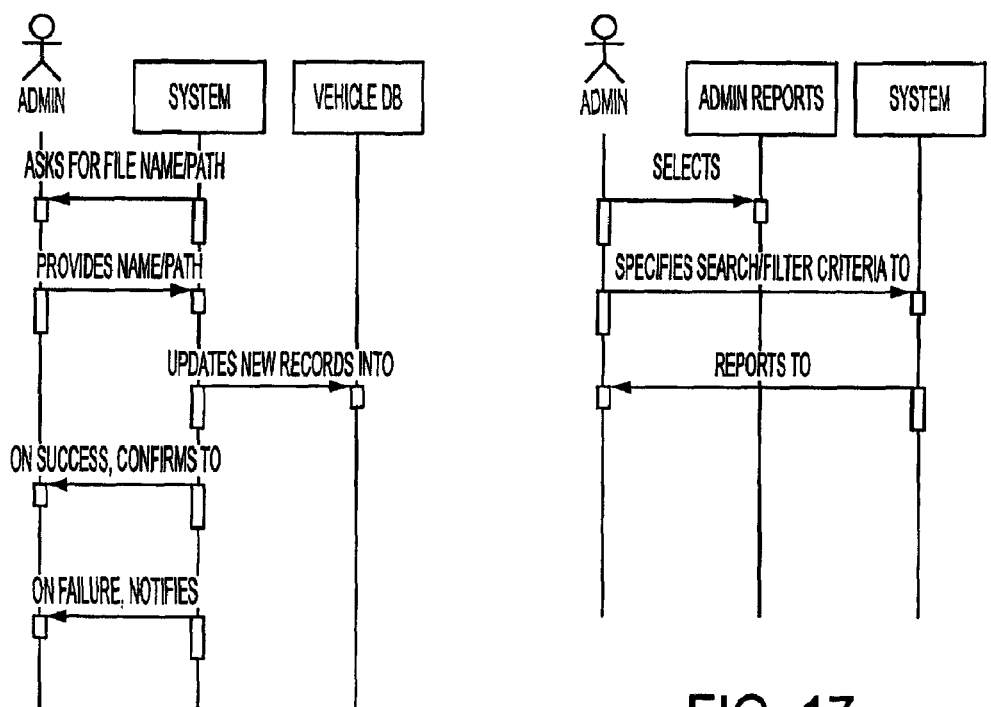
FIG. 16
FIG. 17

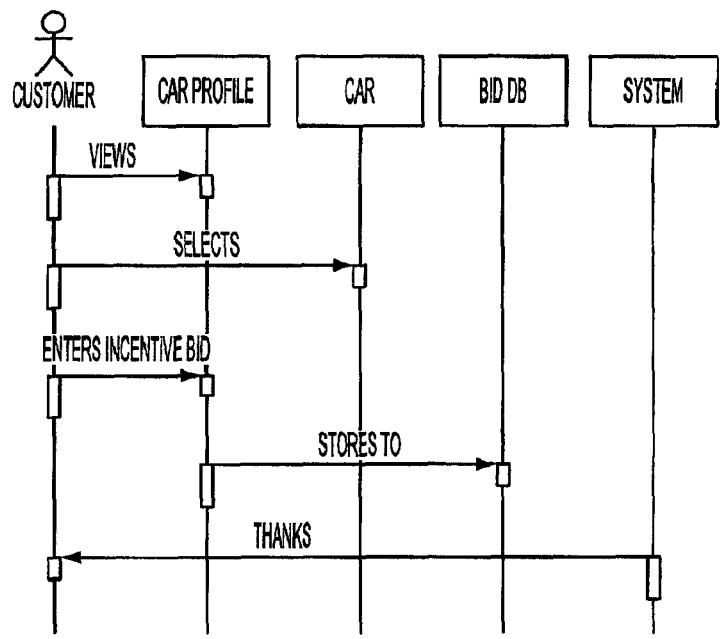
FIG. 29
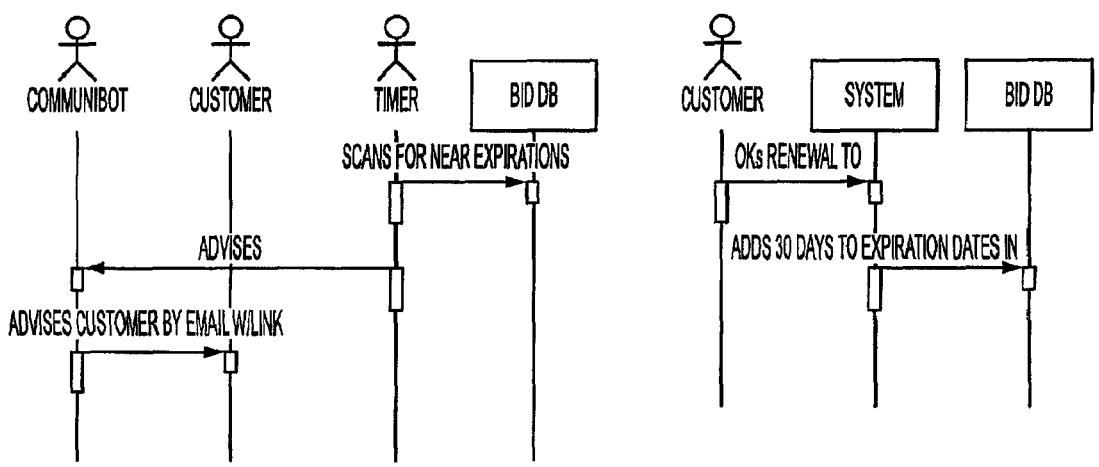
FIG. 30
FIG. 31

SYSTEM AND METHOD FOR PROVIDING INCENTIVES TO PURCHASERS

CROSS REFERENCE TO RELATED APPLICATIONS

This application is a continuation of U.S. patent application Ser. No. 09/735,446, entitled SYSTEM AND METHOD FOR PROVIDING INCENTIVES TO PURCHASERS, filed Dec. 13, 2000 now U.S. Pat. No. 7,668,747, and claims the benefit under Title 35, U.S.C. §119(e) of U.S. Provisional Patent Application Ser. No. 60/170,368, entitled SYSTEM AND METHOD FOR PROVIDING INCENTIVES TO PURCHASERS, filed on Dec. 13, 1999, and U.S. Provisional Patent Application Ser. No. 60/208,504, entitled SYSTEM AND METHOD FOR PROVIDING INCENTIVES TO PURCHASERS, filed on Jun. 2, 2000.

FIELD OF THE INVENTION

The invention relates to a website and method for providing incentives to purchasers of automobiles and other products or services to dynamically and/or interactively stimulate sales within a predetermined time period for individual purchasers or a group of purchasers.

BACKGROUND OF THE INVENTION

Automobile and other manufacturers often offer rebates or other incentives to stimulate purchasers to buy certain products during an offer period. They also offer rebates in an attempt to "fine-tune" the price of the product to achieve market equilibrium. Various problems and drawbacks exist with rebate programs and the methods by which they are implemented.

For example, often a manufacturer will spend a significant amount of money on national or regional mass market advertising to promote a rebate program. This can add significantly to the cost of the rebate program. The mass market advertising approach often is over inclusive or under inclusive with respect to the group of likely potential buyers. This leads to market inefficiencies.

Over-incenting leads to lower profit margins, and under-incenting leads to excess inventory. Other drawbacks include the lead time necessary to implement a rebate program, the lack of meaningful information about potential purchasers and what would prompt them to buy at any given time, and the inability to effectively target individual or specific groups of purchasers, among other drawbacks.

SUMMARY OF THE INVENTION

An object of the invention is to overcome these and other drawbacks of existing incentive programs and methods by which they are implemented. This is accomplished, in one respect, by providing a mechanism through which automotive manufacturers may make their price sensitivity known to consumers, a mechanism through which consumers may make their price sensitivities known to manufacturers and a mechanism through which a managed interactive dialogue between manufacturers and consumers can be conducted.

Another object of the invention is to provide a website and method for providing incentives to prospective purchasers of automobiles and other products or services to dynamically stimulate sales within a predetermined time period for individual purchasers or a group of purchasers.

Another object of the invention is to provide a website and method for providing incentives to prospective purchasers of automobiles and other products or services to interactively stimulate sales within a predetermined time period for individual purchasers or a group of purchasers.

Another object of the invention relates to providing the ability to effectively target incentives to certain purchasers. Another object of the invention relates to the ability to enable potential purchasers to specify incentive parameters that would motivate them to make a purchase, and to let manufacturers or other incentive providers analyze collective data and create an incentive based on this information.

These and other objects are achieved according to various embodiments of the invention. One embodiment comprises a system and method for providing incentives to prospective purchasers via a computer network. For example, the invention may be implemented via a web site accessible via the Internet.

According to one embodiment, the website may include various modules including an existing incentives module, a current interactive incentives module, a past incentives module, a future incentives module and a personalized "my next" interactive incentive module. In one aspect of the invention the incentive provides a dynamic, interactive capability to afford value to the consumer on a mass-market basis or on a market segment basis, which ultimately is capable of segmenting to the individual consumer. In this embodiment of the invention, the website may appear as an extension of the host's site, where the host is, for example, a manufacturer site, a dealer site or a financing site. In this instance, certain parts of the subject website might be brand-identified, such as the login function and the payment function. This would advantageously permit a consumer to have the perception of dealing with several different manufacturers while actually providing personal preference data to a single entity.

The existing or current incentives module preferably enables a user to view incentives that are currently being offered. Alternatively, the existing incentives module may enable a particular user (for example, based on a profile or other information known about that user) to access only certain currently available incentives. This module may enable a user to search by category or all or some incentives may be displayed for a user to view. If the user is able to search by category, some of the search categories may include the manufacturer, model or other characteristics of a product, the amount of the incentive, the availability of the incentive based on demographics or other characteristics.

According to one embodiment of the invention, after logging onto the system through a system administrator and searching for cars and incentives of interest, a user identifies an incentive of interest. The user then registers for that incentive electronically or otherwise, such as via email registration. A certificate of registration for the incentive may be provided to the user directly (electronically or otherwise) or forwarded (electronically or otherwise) to a redemption location (e.g., a car dealership).

According to another aspect of the invention, a manufacturer or other provider of incentives may monitor the number of users who register for a particular incentive along with other information (for example, the time period over which the registrations occur, the inventory available, known trends in upcoming sales, and other factors) to dynamically change the existing incentives. The dynamic change, for example, may increase a rebate to encourage more users to make a purchase of a particular product or decrease an existing incentive amount if greater response than anticipated was achieved with a higher rebate amount. Advantageously, a manufacturer or other provider of incentives can be in communication with the website if it is hosted by another entity, or the manufacturer or incentive provider may operate a website directly and tie in with its back end management systems (for example, on line analytical processing systems or other computer-implemented management tools that track inventory, sales and various other factors) to facilitate decisions.

Another aspect of the invention relates to providing "interactive" incentives. Interactive incentives enable a user to register or commit to an incentive based on certain predetermined criteria (for example, a minimum acceptable rebate). Based on the number of users who commit to a particular incentive, or other factors, such as identified opt-in incentive value thresholds, etc., a manufacturer or other incentive provider may: decide to issue or not issue an incentive based on the response; determine the amount of the incentive; determine minimum and maximum incentive values; determine the duration of the incentive program; determine the geographical region in which to offer the incentive; and/or take other desired action.

According to another aspect of the invention a user may create a personalized or "my next" interactive incentive, which can take the form of a request for incentive. This type of incentive could also be referred to as a "demand" incentive. This function enables a user to specify certain incentive terms that would cause the user to make a particular purchase. According to another aspect of the invention, the system administrator or website may periodically search a local or remote database to find incentives that match personalized interactive incentive criteria established by a user. If and when a match is found, the website may notify the user of the availability of the incentive. According to another aspect of the invention, to demonstrate to the manufacturer the user's level of interest and commitment to the deal the user is required to pay a fee in conjunction with making the request to the manufacturer(s). In one manner, in the event the request is denied, then the fee is returned to the user, in the event the manufacturer accepts the request, then the fee may be returned to the user by the manufacturer over and above the requested incentive value.

In another manner of operation for the my next interactive incentive feature, a user transmits an offer for an incentive to the program manager, which either passes along the user incentive information to the manufacturer or processes the information based on parameters and instructions provided/derived from the manufacturer. For example, the information provided by the user may include any one or more of the following: product identifying data; incentive amount or range data; color or other desired product characteristics; timing of purchase; delivery terms; warranty terms; financing terms; and/or other such terms. A user could limit acceptance of the offer for a rebate to a certain time frame or may hold the offer open. An offer that Must be accepted within twenty-four hours would require a quick response. In addition, the manufacturer could issue a counter-offer with terms at variance to those set by the user. This provides users and manufacturers a dynamic, real-time transactional platform on which to conduct business. After receiving a rebate from a manufacturer, the user then approaches the dealer(s) of choice to strike the best deal for the product. Also, a user could place more than one offer for a rebate with multiple manufacturers, giving notice of such competition to the involved manufacturers. User acceptance could be based on first manufacturer to reply or at the end of the predefined time period based on the best rebate offer issued.

In another manner of operation for the "my next incentive" feature, the manufacturer may respond to aggregate demand in a manner requiring data which some consumers may not have provided when creating their next incentive. In this case, the system would preferably engage these consumers to discover the missing data and qualify them for the incentive.

According to another aspect of the invention, a user registering for an incentive (existing or interactive) may be required to pay a predetermined fee to indicate seriousness of interest. For example, in connection with the purchase of an automobile, the user may be required to pay a $50.00 fee to register for an incentive, current or otherwise. If the incentive is redeemed by the user (for example, a $1,000.00 rebate towards the purchase of an automobile), the user will actually be credited $1,050.00 by the dealer and the dealer in turn will be credited $1,050.00 from the manufacturer. In this way, the website operator collects a fee of $50.00 for each incentive issued and the manufacturer ultimately bears the cost if, and only if, the purchaser actually executes a transaction and redeems the incentive (rebate). If, however, a manufacturer makes a decision to issue a group of incentives having certain parameters, for instance the incentive amount, based in part on the commitment from purchasers who do not redeem the incentive, then those purchasers are out the predetermined fee, but the website operator keeps the incentive registration fee, e.g., $50, and it costs the manufacturer nothing.

Another object of this invention relates to providing the ability for manufacturers to shift product demand to or focus product demand on specific products or specific timeframes in order to align vehicle demand with vehicle supply and to accommodate other market conditions and forecasts.

Another aspect of the invention relates to pre-determination of qualifying criteria for incentives. A user may register for or commit to an incentive based on certain predetermined criteria (for example, a minimum acceptable rebate). Based on the number of users who commit to a particular incentive, a manufacturer or other incentive provider may decide to issue or not issue an incentive based on the response, and determine the amount of the incentive and other terms. The user would only be committed to the incentive if the final incentive met the user's qualifying criteria.

According to another aspect of the invention, a manufacturer may establish a real-time incentive of indefinite duration. This aspect of the invention enables a user to specify certain incentive terms that would prompt the user to make a particular purchase. The website or system administrator may immediately search a local or remote database to find incentives that match the interactive criteria established by a user. If a match is found, the website may immediately grant an incentive to the user. If a match is not found then the system will continuously update the search on a periodic basis and notify the user in the event a match is subsequently made. Also, the system administrator may inform one or more manufacturers of the incentive criteria specified by the user. Also, the system administrator may forward to the user alternative incentives that are currently or prospectively will be available.

According to another aspect of the invention, manufacturers will be able to see future demand for vehicles, in addition to seeing historical sales patterns. The website will collect and manage data in such a way that manufacturers may view aggregated data at the make/model level, the style/trimline level or the options level, seeing competition, demographic distribution and geographic distribution at the same level. This will give each participating manufacturer a precise view of current market demand involving the complete automotive demand universe.

According to another aspect of the invention, automobile dealers may use the website as a prospect management tool.

This aspect of the invention allows the dealer to lead a user into the system in order to register interest in a future incentive, specifying that dealer and a salesperson. From that point on, the dealer would be able to track the user's progress towards accepting an incentive and acting upon it.

According to another aspect of the invention, automobile dealers may use the website as a marketing tool. This aspect of the invention allows the dealer to establish public displays, such as in-store kiosk stations, which constantly display available existing incentives and incentives for purposes of stimulating sales. Such a customer display station would most likely provide information concerning the manufacturer, loan information, etc., and would enable the user to register and enter profile information.

According to one aspect of the invention, Multi-Path Data Acquisition, the system may obtain information from users via a gradual give-and-take process in which the system explains what benefits might convey to the user for providing a piece of information (e.g. their ZIP code), and then asks for the information. Alternatively, the system may provide a larger potential benefit (e.g. a car raffle) in exchange for a large amount of information provided all at one time. At all times, the system would be aware of what information has been provided and what information has not been provided in its interactions with users.

According to another aspect of the invention, Multi-Level Incentives, the system may attach incentives to multiple levels of the automotive product hierarchy. An incentive may be separately associated with each of an automobile make, model, style, trimline or option(s). This allows maximum market flexibility with both detailed and overlapping incentives, permitting manufacturers to respond very precisely to market demand.

According to another aspect of the invention, Multi-Domain Incentives, the system may allow incentives targeted to the product, to the geographic region and to a demographic segment of the population. These incentives may be overlapped, again permitting manufacturers maximum market flexibility in responding to demand conditions in the marketplace.

According to another aspect of the invention, Perfect Information, the system would provide a perfect competitive view of the automotive market to manufacturers and dealers. The system would provide data at four levels of refinement; at the first level, market demand would include all data in the system, including that of unidentified users. At the second level, market demand would include only the demand data associated with identified individuals. At the third level, market demand would include only the demand data of those users who had committed a fee to be included in a future interactive incentive. At the fourth level, market demand would include only the demand data of those users who had purchased a vehicle.

According to another aspect of the invention, Flexible Incentive, the system provides multiple interactive incentive models to the manufacturers. The manufacturer might choose to fully disclose a preset incentive template to users, showing levels of participation required to trigger a particular incentive level, along with an indication of current participation. The manufacturer might choose to control the incentive in real-time, showing only the current incentive level to users. The manufacturer might choose to control the incentive in real-time or by template, and reveal no incentive level information to the user until the incentive was over. The manufacturer might choose to issue certificates only at the end of the incentive, resulting in all users receiving the same incentive, or to issue certificates on user demand, which might result in various users receiving different incentives.

According to another aspect of the invention, Demand Balancing, the system allows the user to communicate in their own terms; the total level of incentive required for them to act. The manufacturer only sees the additional level of incentive required beyond what is currently available to the user through other incentives. A user may require $3000 in incentives to make a purchase. $2500 may be currently available through existing incentives. The manufacturer would see only that a $500 additional incentive would be needed.

According to another aspect of the invention, Incentive Broadcast or Incentive Narrowcast, the system identifies incentives, such as by make, model and geographic region which pertain to a particular dealer, and broadcast live incentives matching that profile to the participating dealer.

According to another aspect of the invention, Dealer's Choice, the system allows a user to register for future interactive incentives within a dealership, restricting the user to vehicles associated with that dealership, or manufacturers associated with that dealership, and to working with that dealership and/or salesman. Manufacturers/Dealers could use the system as a tool to foster interest in end-consumers, for instance, a manufacturer may provide a dealer incentive based on the number of customers registered at or in the name of the dealer. In similar fashion, the manufacturers and/or dealers may incentivize their sales force by offering incentives, such as compensation, based on the number of participants signed up by the individual sales person.

According to another aspect of the invention, Stealth Mode, the system may take on the appearance of the invoking host, whether a dealer site, manufacturer site, automotive portal, financing site, etc. The consumer would appear to be using an incentives extension of the host site, identified only as a member of a rebates and incentives network. This "virtual extension" to the host site would allow visibility only to those makes and models of vehicles. permitted by the host site. The host appearance may be achieved by adopting attributes from the host site, such as wallpaper, button styles and fonts.

According to another aspect of the invention, the system will track any number of incentives in an attempt to meet a user's incentive requirement. The system presents these incentives to the user as a single incentive package, with a set of eligibility constraints and an expiration date.

According to another aspect of the invention, when the user wishes to participate in an incentive or to issue a request for an additional incentive, they will be asked to provide payment information for purposes of securing a service fee if their incentive requirement is met or may be required to pay the fee as a prerequisite to submitting a request for an incentive or a counter-offer to a current incentive. In one manner of the system, once the target incentive level has been met for a particular user, they will be charged a service fee in exchange for receiving the certificate or coupon for rebate or the like. The fee may be returned to them when the vehicle is actually purchased, such as by the manufacturer directly or through the dealer.

With respect to the presentation and selection of vehicles of interest to the user, one aspect of the invention provides for switching views between a detailed page for a single vehicle, and a summary spreadsheet-style view covering multiple vehicles.

According to another aspect of the invention, if the vehicle selected is not that of a participating manufacturer, and a participating manufacturer is offering incentives on a similar vehicle, the website will inform the user of this fact, and offer to show them incentives on similar vehicles.

In one embodiment the present invention provides an online method for presenting one or more incentives offered by an offeror and relating to associated goods or services to a user for viewing at a remote terminal. The inventive the method includes storing in a storage device at a central location incentive related information pertaining to one or more products or services each associated with at least one incentive offer. The method further involves establishing an electrical communication between the central location and the remote terminal and determining at the central location if the user of the remote terminal is a registered user. If the user is not registered, then transmitting from the central location a user profile inquiry to the remote terminal to be electronically completed by the user. The user then transmitting the completed user profile to the central location where the user profile data is received and stored, thereafter the user being recognized as a registered user. The method also involves presenting to and viewing by the registered user at the remote terminal information pertaining to goods or services associated with the one or more incentives and means for remotely selecting by the user a particular good or service, and presenting the user with information related to one or more incentives associated with the selected good or service. In addition, upon receiving information from the remote user relating to the parameters of a selected incentive, the central location generating at least one incentive data file, the incentive data file relating to the user selected incentive parameters and comprising a plurality of fields, including a redemption amount field, a user identification field, and an associated good or service identification field, the redemption amount field representing the value of the incentive offered to the user. The method also includes transmitting from the central location to the user at the remote terminal a prompt for payment of a user fee associated with disbursement of a redeemable certificate related to the incentive data file, and receiving at the central location information from the user sufficient to effect payment of the user fee. This embodiment also calls for disbursing from the central location the redeemable certificate for redemption by the user at a retail facility for acquiring possession of the desired good or service associated with the redeemable certificate.

In another embodiment, the present invention provides an online system for presenting incentives over a distributed network, the incentives being presented over the distributed network to potential purchasers of goods or services associated with the incentives. The system includes a central location having at least one server and having a processor and a database. The database storing data related to: incentives; products or services associated with the incentives; and user Profile information. The central location server having a communication device for establishing an electrical communication over the distributed network. The central location also includes an incentive determination module adapted to compare incentive data and user input data to arrive at one or more incentives available to a remote user. The processor being adapted to process the incentive determination module. The system further includes a remote terminal operated by a remote user and having a display and a data entry device. The remote terminal includes a communication device for establishing communication with the central location over the distributed network. The remote terminal displays good or service information received from the central location and receives remote user input via the data entry device in response to the displayed good or service information. The remote terminal transmits to the central location incentive request information input by the user. The incentive determination module at the central location compares the incentive request information received from the remote terminal with a predetermined set of incentive parameters to determine issuance or non-issuance of an incentive offer to the remote user.

These and other objects of the invention are accomplished in connection with the various embodiments described in more detail below and variations and modifications thereto.

BRIEF DESCRIPTION OF THE DRAWINGS

FIG. 13 is a functional flow diagram illustrating the log in process associated with the system of FIG. 9;

FIG. 16 is a functional flow diagram illustrating the vehicle database maintenance aspect of the system of FIG. 9;

FIG. 17 is a functional flow diagram illustrating the one aspect of the administrative reports function of the system of FIG. 9;

FIGS. 27-40 represent functional flow diagrams illustrating various sub-module aspects of the customer function of FIG. 23;

DETAILED DESCRIPTION OF THE INVENTION

Figure 1:
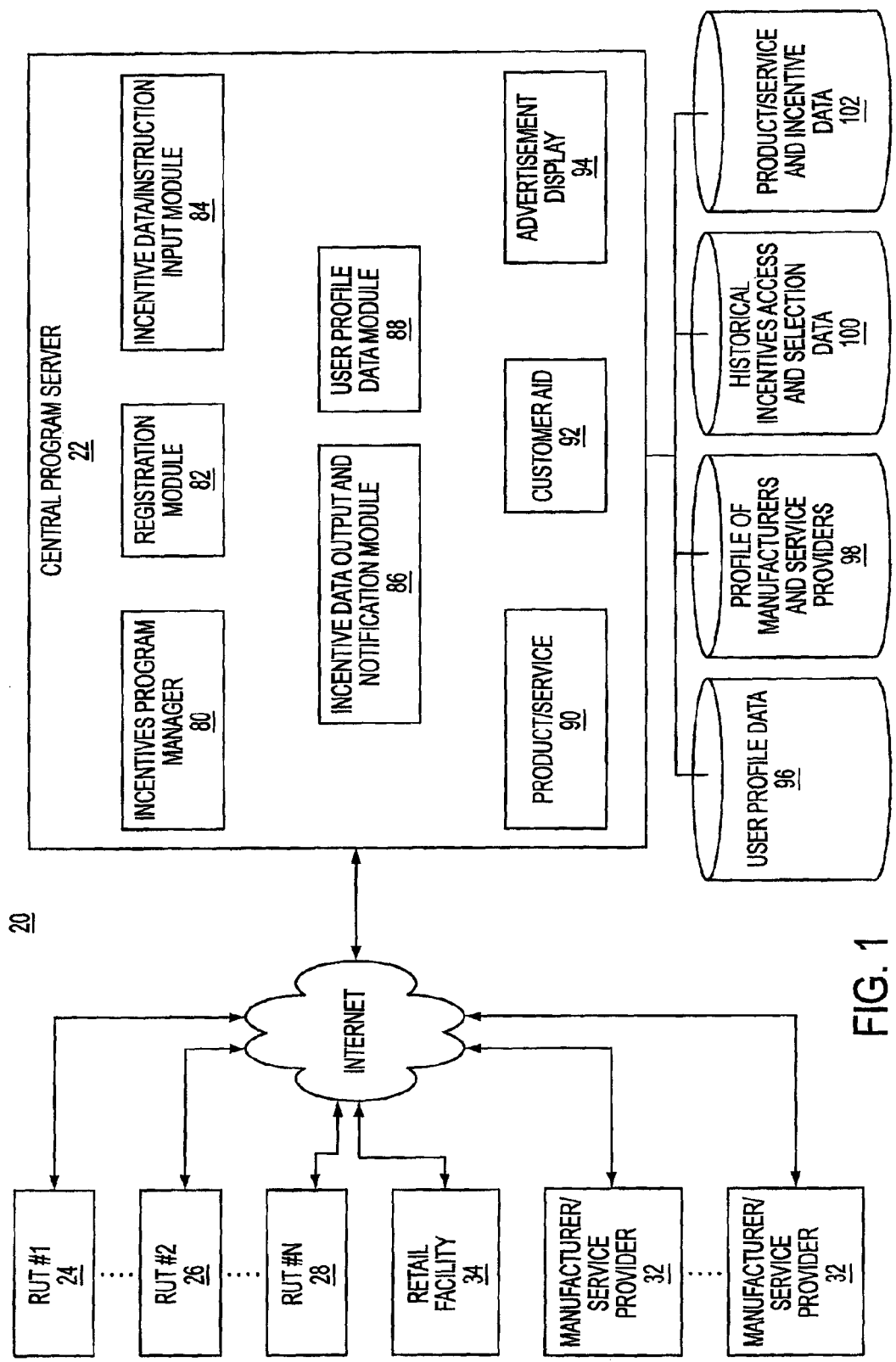
FIG. 1 provides a block diagram of a system according to one embodiment of the present invention.

FIG. 1 provides a block diagram of a system according to one embodiment of the present invention. The system 20 as shown comprises a computer network comprising a web site including a central site incentives program server 22, terminals 24, 26, and 28 (e.g., a browser enabled device such as a computer or cell phone), manufacturers (or other incentive issuers) 32, and retail (or other redemption) facilities 34. Central program server 22 includes various modules 80 through 94, which implement the various functions of the system, and databases 96 through 102, which may be a common database or separate databases. Although the embodiment of FIG. 1 is shown in an Internet environment, other network configurations and types can be used.

Figure 2:
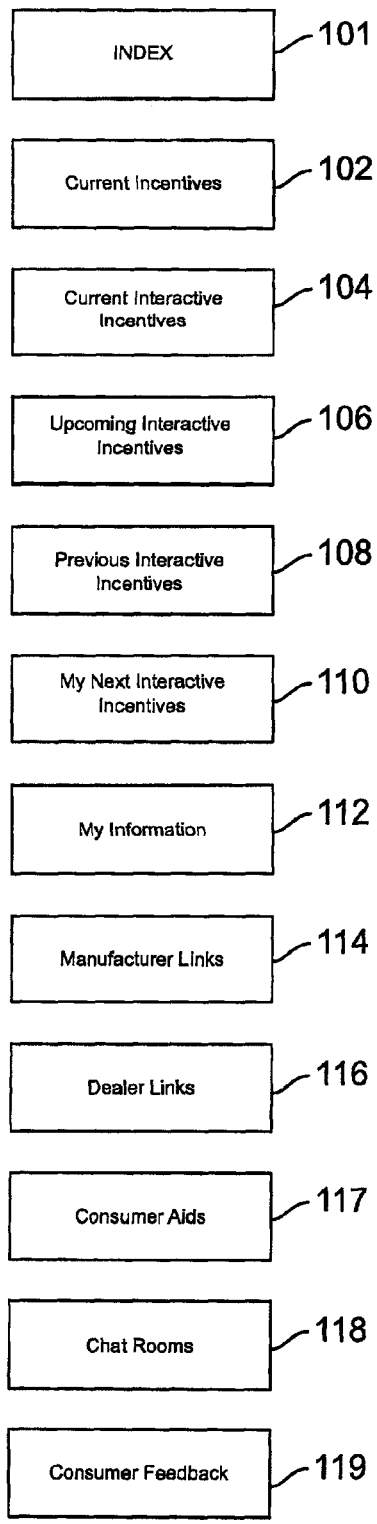
FIG. 2 is a block diagram illustrating a "screen-shot" of a web site home page associated with the present invention.

According to one embodiment of the invention, as illustrated in FIG. 2, the web site comprises a home page 100. From the home page 100, the user can access various modules. For example, the web site may comprise an index/search module 101, "current incentives" module 102, "current interactive incentives" module 104, "upcoming interactive incentives" module 106, "previous interactive incentives" module 108, "my next interactive incentives" module 110, "my information" module 112, manufacturer links module 114, dealer links module116, consumer aids module 117, chat rooms module 118, and consumer feedback module 119.

The index/search module 101 provides an index of various items available at the site, including such items as manufacturers, goods, services, incentives, articles, features, to name a few. A search function also may be provided to enable the user to quickly access a particular topic or item of interest.

The existing incentives module 102 preferably enables a user to view incentives that are currently being offered. Alternatively, the existing incentives module may enable a particular user (for example, based on profile or other information known about that user, or by querying the user) to access only certainly currently available incentives. This module may enable a user to search by category or all or some incentives may be displayed for a user to view. If the user is able to search by category, some of the categories may include the manufacture of model or other characteristics of a product, the amount of the incentive (for example, a rebate), the availability of the incentive based on demographics or other characteristics.

According to one aspect of the invention, if a user identifies an existing incentive of interest, the user may register for that incentive electronically or otherwise. A certificate of registration for the incentive may be provided to the user directly or to a redemption location.

According to another aspect of the invention, a manufacturer or other provider of incentives may monitor the number of users who register for a particular incentive along with other information (for example, the time period over which the registrations occur, the inventory available, known trends in upcoming sales, and other factors) to dynamically change the existing incentives. The dynamic change, for example, may increase a rebate to encourage more users to make a purchase of a particular product or decrease an existing incentive amount if greater response than anticipated was achieved with a higher rebate amount. Advantageously, a manufacturer or other provider of incentives can be in communication with the website if it is hosted by another entity, or the manufacturer or incentive provider may operate a website directly and tie in with its back end management systems (for example, on line analytical processing systems or other computer-implemented management tools that track inventory, sales and various other factors).

The incentives program manager 80 may be used in conjunction with an analytical processing function provided by a manufacturer 32, or other source, or may include further means to process additional data, such as sales, revenue, profit, cost, manufacturing or supplier capacities, and manpower capacity to arrive at an incentives program for a particular good or service or class of goods or services. This data may be processed to determine optimal manufacturing, sales, revenues, or other goals associated with particular ranges of incentive values or number of participating users in accordance with an established set of parameters designed to achieve certain desired goals.

The user is able to search the database of existing incentives by various parameters including manufacturer or make/model or other product characteristics, amount of rebate, availability based on geographic, demographic or other characteristic, membership in a group or class of people, or other parameters.

The current incentives may include standard incentives offered by companies to promote certain products. A full description of the requirements and restrictions associated with the incentive maybe provided to the user to help determine qualification for and interest in the incentive. Optimally, a link or a description of the product associated with the incentive is provided to aid the consumer.

The current interactive incentives button 104 opens to a page presenting access to and/or information concerning currently existing interactive incentives available to users. Users are able to search the database of existing interactive incentives by product/service type, manufacturer, or other pertinent fields. "Interactive incentives" may take any of a number of forms and are designed to be defined, or redefined, at least in part on user response to and interest in the incentive. A rules-based analysis is applied to user and program information to make decisions to arrive at the terms of the incentive. For instance, an interactive incentive may include an initial value and a range of potential values depending upon the number of users having committed to participate in the program. This range of values may be based upon parameters provided by the manufacturer, upon analytical processing of factors such as revenues, profit, inventory, and position relative to a goal. This analytical processing may be carried out at the manufacturers facility or at the central server 22.

Alternatively, the incentive may be open-ended, or have a set minimum, with the incentive value being based upon information received from the users interested in potentially participating in the program. For instance, in the example of Table 1, an interactive incentive may start out with an incentive value of $200.00 as a minimum with a range, either known to the users or unknown to the users, of between $200.00 and $2,500.00. Over the course of the incentive offer, definable by the manufacturer, users register in accordance with the numbers and the acceptable values indicated in Table 1. At the end of the offer period, the manufacturer may weigh the information received from the participating users to determine which scenario is most attractive from a business standpoint. As the business landscape is always in some state of flux, different issues may take turns as the most important factor and the same set of results may on different occasions based on different circumstances result in different business decisions and different actual incentive values being adopted.

TABLE 1

| Number of Registered Users | User Acceptable Incentive Value |
| --- | --- |
| 100 | $200.00 |
| 500 | $500.00 |
| 1,600 | $1,000.00 |
| 2,200 | $1,200.00 |
| 3,200 | $1,500 |
| 18,700 | $2,500.00 |

The upcoming interactive incentives button 106 opens to a page providing user access to information concerning interactive incentive programs to be offered in the future. The upcoming interactive incentives may relate to certain products that will be the subject of a interactive incentive or may relate to a defined interactive incentive program without identifying the particular product associated with the program. The upcoming interactive incentive program listing offers the ability to inform the consumer of upcoming incentives and to hold the consumers interest until the incentive program begins. For instance, a manufacturer may post a calendar of incentives with an opportunity for the user to provide feedback or suggestions for the program in advance of the program itself. The calendar may provide links to program descriptions and may include a comprehensive list of unlike programs. Based on consumer reaction to the posted programs, the manufacturer can forecast an expected level of participation and can proactively alter the proposed programs or base manufacturing and other business decisions on the forecasted response. The system is capable of permitting the manufacturer to list a number of potential products and request user input to help drive the decision as to which product will be offered with the program. This can also permit the manufacturers to explore the level of user interest in their proposed offerings prior to actually initiating the program. By learning of the level of interest in advance of an offering, the manufacturer is provided with a powerful forecasting tool to aid in estimating sales and scheduling production.

The my next interactive incentive button 110 opens to a page where the user can register for upcoming or other interactive incentives. The my next interactive incentive page 110 can be provided with the additional feature of transmitting from the user to the central server a desired product for which the user would be interested in purchasing if there were a interactive incentive available to the user at some preferred incentive value, time frame, location, color, size, quantity, or any of a number of criteria, individually or in combination. The central server 22 may monitor the available incentives programs and upon the requested item (or other criteria) becoming the subject of an incentive, notifying the user that it is available via an agent function or module at the central server 22. This notification may occur in any of a number of ways but preferably users indicate in their respective profiles how they prefer to be contacted, e.g., via email, telephony, PDA, etc.

Alternatively, the central server 22 may, upon receiving the permission of the user, forward the user information to one or more manufacturers, distributors or service providers who manufacture, distribute or provide the requested product or service. As this information is collected, the manufacturer can use this information to help determine whether or not to offer the requested incentive for the desired product or service.

The my information button 112 provides a page where users may update their user profile information. This information may include such information as various topics of interest to the user, hobbies, preferred products and/or manufacturers, as well as the user profile information discussed above. Based on the information provided by the users, manufacturers are provided with a tool for targeting incentives programs to a particular group of users.

The manufacturer's links button 114 opens the user to a page having links to the websites of manufacturers and service providers offering incentives through central server 22. The dealer links button 116 is directed to industries, such as the automotive industry, where a network of dealers is involved in the marketing and sale of products which are the subjects of incentives offered through central server 22.

Figure 3:
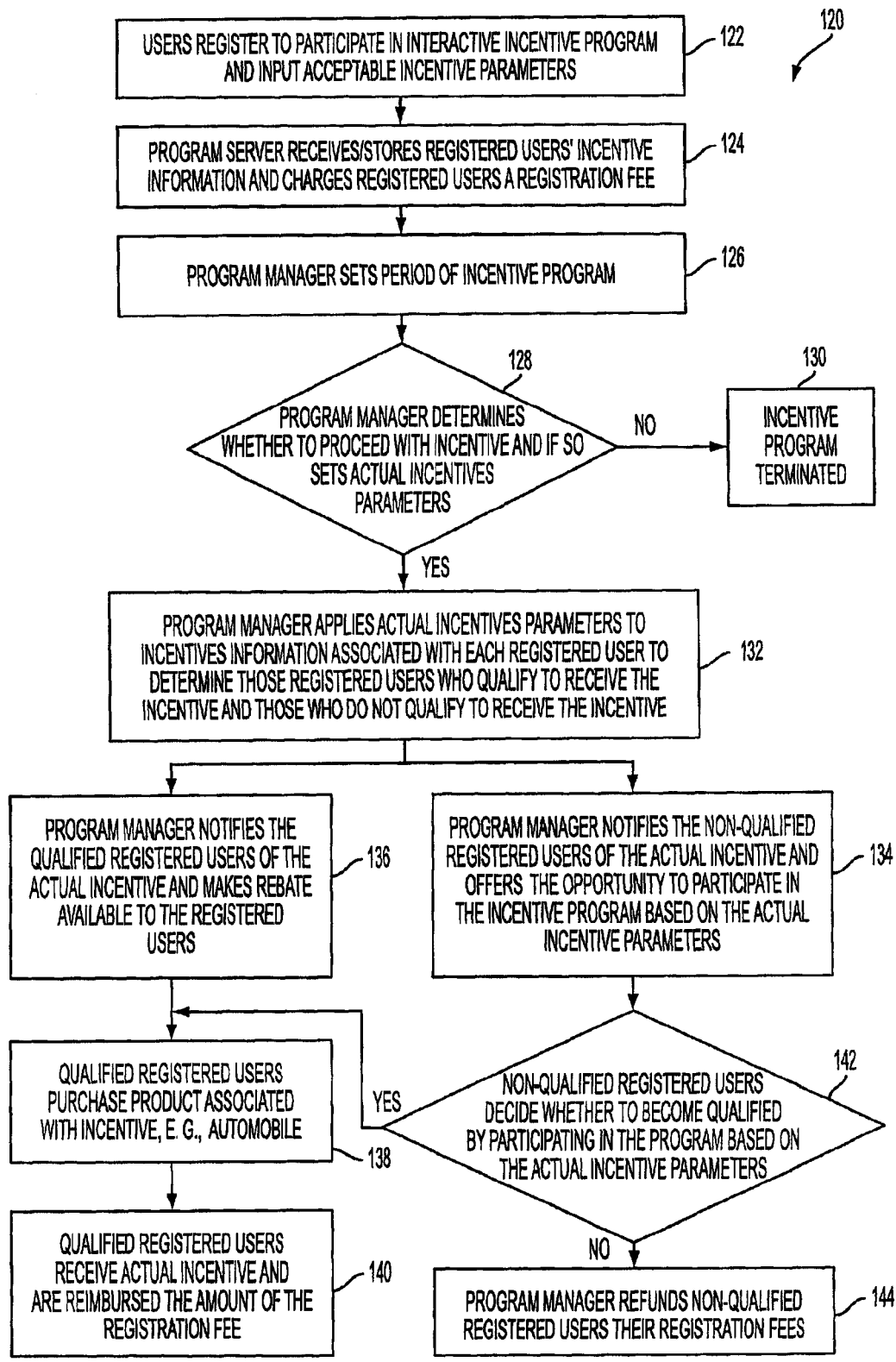
FIG. 3 is a block diagram illustrating an implementation of the present invention in a first incentive program scenario.

One example of an interactive incentives program 120 is illustrated in FIG. 3, in which users are presented with the opportunity to input acceptable incentive parameters in registering to participate in an interactive incentive program. The acceptable parameters are transmitted to the central server 22, which receives and stores the user incentive information and charges the registered users a fee. Attaching a cost, such as a registration fee, to the user's registration for participating in an incentive program is important from the manufacturer's perspective as it incentivizes users not to simply register for an incentive and then not follow through on the commitment.

Continuing with the example of FIG. 3, at block 126, the program manager sets the period during which the incentive program runs. Next the program manager 80, based on the user incentive information, determines whether or not to proceed with the incentive program. Provided that the information falls within an acceptable scenario, in accordance with instruction and data downloaded to the central server 22 from the manufacturer 32, the program manager proceeds with the program and sets the actual parameters that will be employed in the actual incentive program. The program manager then applies the actual incentive parameters to the user incentive information to determine the qualified and non-qualified registered users, block 132.

The program manager notifies the qualified users of the actual incentive and makes the incentive available to the users, such as by enabling the printing of a rebate certificate. The program manager also notifies the non-qualified users and offers them the opportunity to participate in the program in accordance with the actual incentive parameters. Those non-qualified users who choose not to participate may receive a refund of their registration fee, block 144. The qualified users, including those non-qualified users who elect to participate under the actual incentive parameters, who consummate the purchase of the product, such as an automobile, that is the subject of the incentive receives the actual incentive and is reimbursed the amount of the registration fee.

For instance, a user may be charged a fee of $50.00 to register for a rebate offer associated with the purchase of an automobile. Should the user not purchase the automobile identified with that rebate, then the user forfeits the $50.00 fee. Often charging fees such as this acts as a barrier to participation. To help avoid this, the system of the present invention provides for reimbursement of the fee to the user upon purchase of the product or service. As in our example, say the rebate for the purchase of the automobile is $1,000.00, then the user would receive a check for $1,050.00 upon purchasing the automobile. The source of the goods or service picks up the cost of participating in the rebate program, but only if the user actually consummates the purchase of the product.

In this manner, a third-party may operate the central site, at which a number of sources of goods or services may offer incentives programs, and receive the fee from the user as a source of revenue. This enables the source of goods or services to, in a real-time fashion, precisely track the costs associated with the incentive program and more accurately forecast future such programs. In the alternative, a web site such as described herein may be dedicated to a single source or consortium of sources to the exclusion of others.

Figure 4:
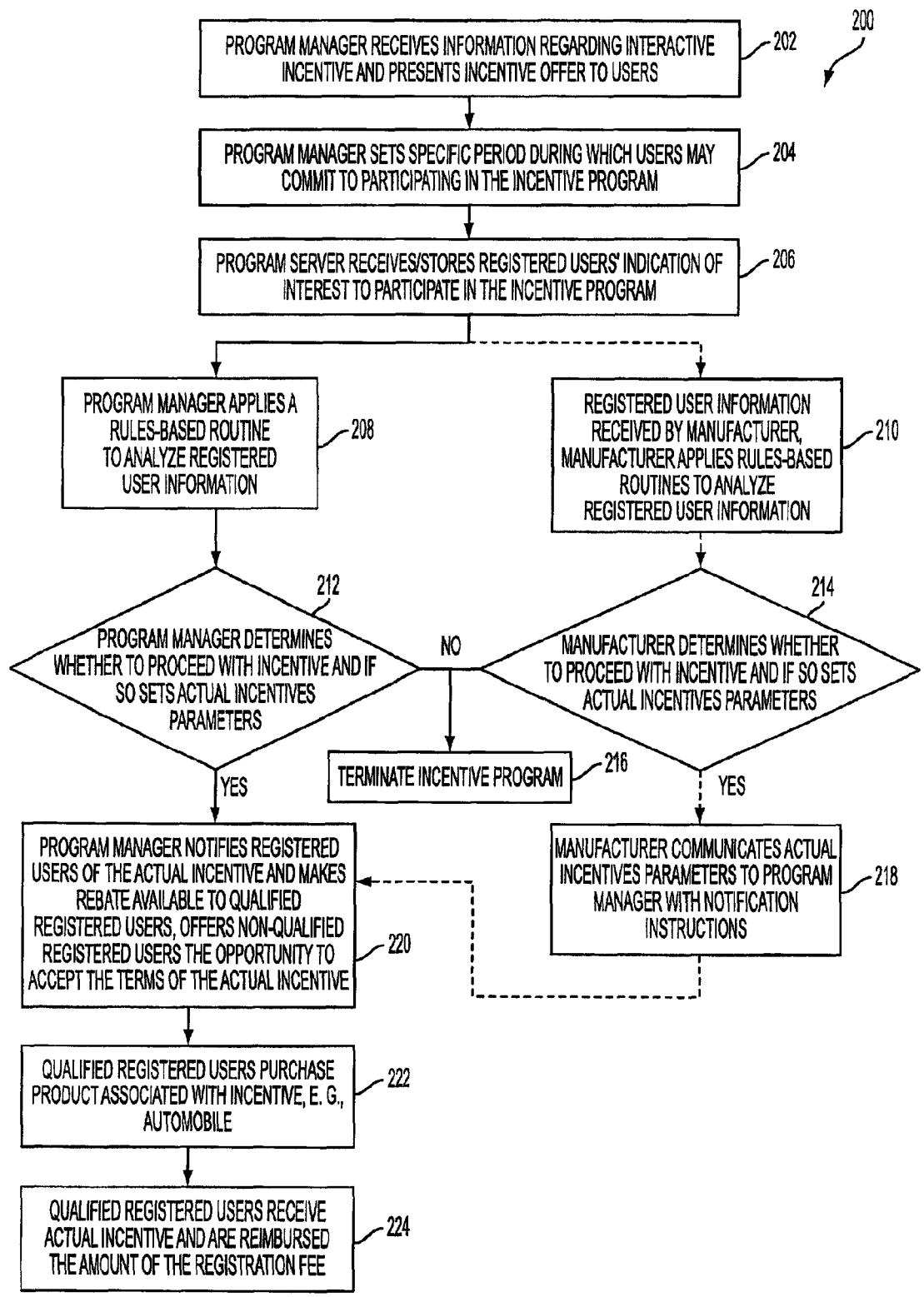
FIG. 4 is a block diagram illustrating an implementation of the present invention in a second incentive program scenario.

In the interactive incentives program of FIG. 4, the program manager receives incentive information and formats and presents the incentive offers to the users via the network. The program manager sets the user participation period and receives and stores user indications of interest in participating in the program. As shown on the left side of FIG. 4, the program manager may apply a rules-based program to analyze the user information, block 208. Based on the analysis of the user information, the program manager determines whether to proceed with the program. If it does not terminate the program, the program manager sets the actual incentive parameters based on incentive data and instructions received from the manufacturer 32. In a manner similar to that discussed above, the program manager notifies the registered users and makes the rebate available to those qualified users.

In the alternative, the user information may be transmitted to the manufacturer for processing, such as by applying rules-based routines, to determine the fate of the incentive program as described above. Should the manufacturer processor determine to go forward, it transmits incentive information and data to the central server 22 for notification and implementation of the program.

Figure 5:
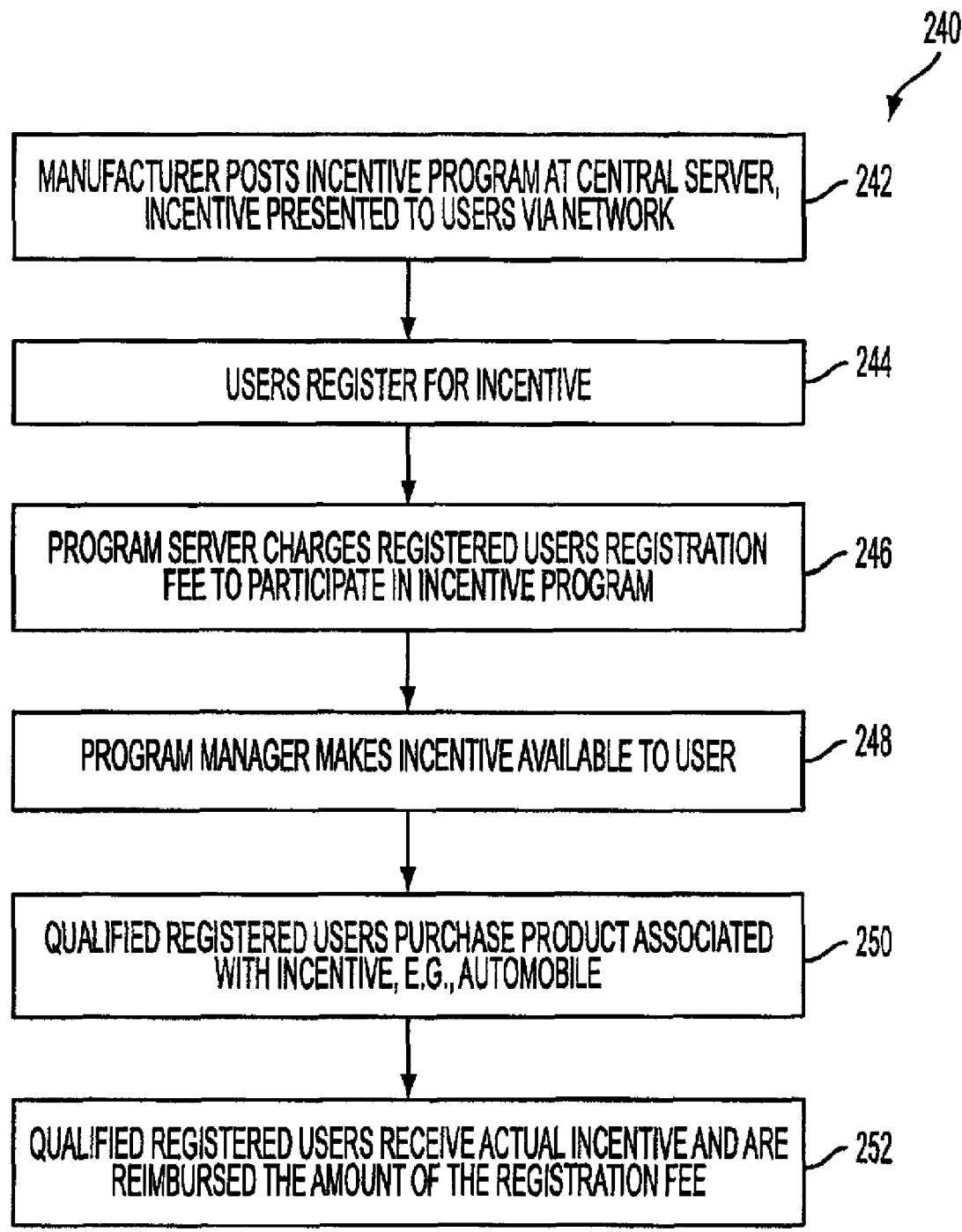
FIG. 5 is a block diagram illustrating an implementation of the present invention in a third incentive program scenario.

In the incentives program of FIG. 5, a typical incentive is posted by the manufacturer at the central server where it is accessed by the users over the network. The program server charges users a registration fee, as described above, which is reimbursed, as described above, upon purchase of the related product. Manufacturers receive the benefit of the user information and are able to maintain a dynamic, real-time monitoring of its incentives programs. This allows manufacturers to modify, initiate, terminate, and extend programs based upon the immediate user feedback they get.

Figure 6:
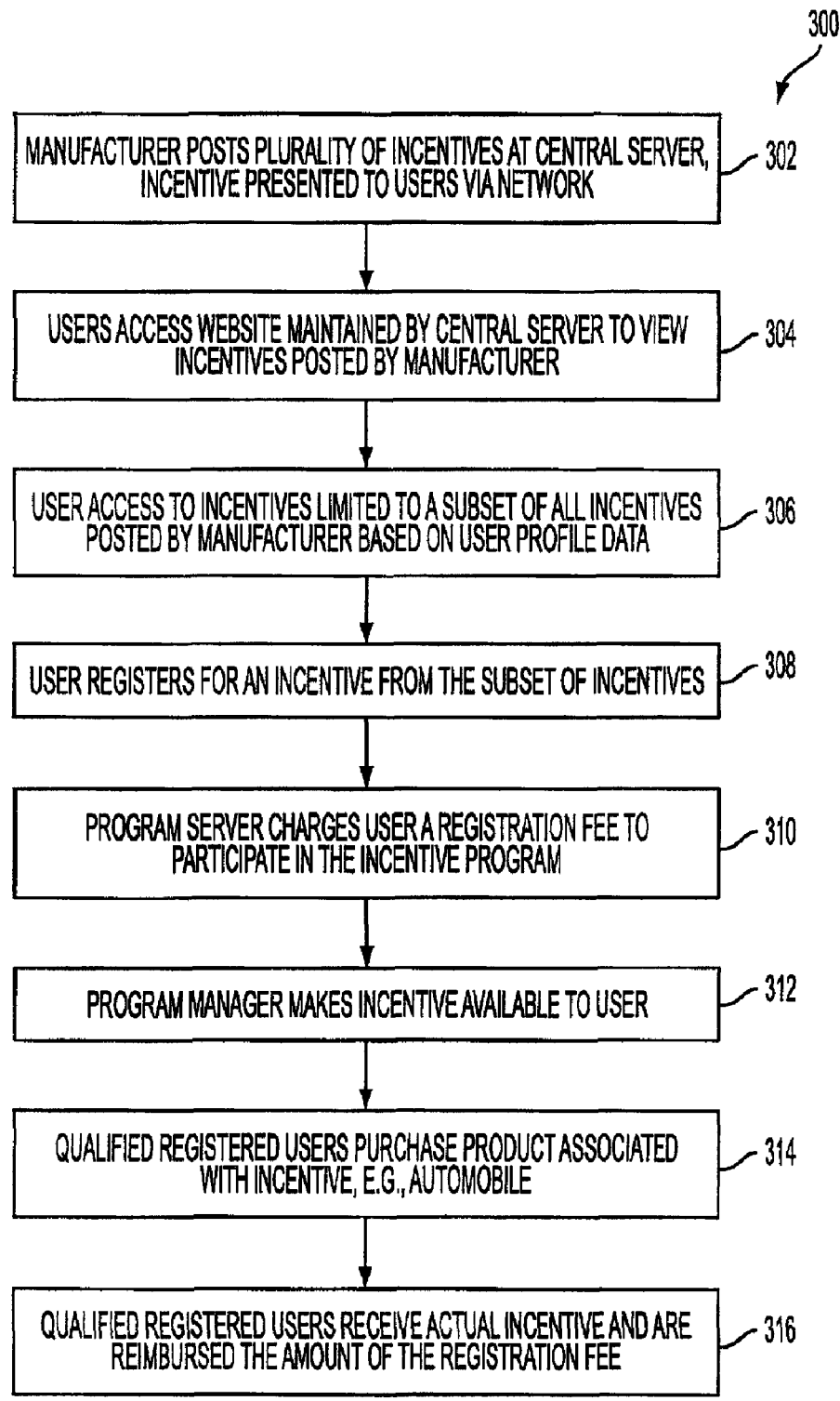
FIG. 6 is a block diagram illustrating an implementation of the present invention in a fourth incentive program scenario.

In the incentives program of FIG. 6, manufacturers or the program manager limit the number and type of incentives to be presented to particular users. Some or all of the users may only be permitted access to a subset of the available incentives. This exclusion may be based on demographic data, user purchasing historical data. Other than the step 306 to limit incentive access, the remainder of this program is essentially as described in part hereinabove.

Figure 7:
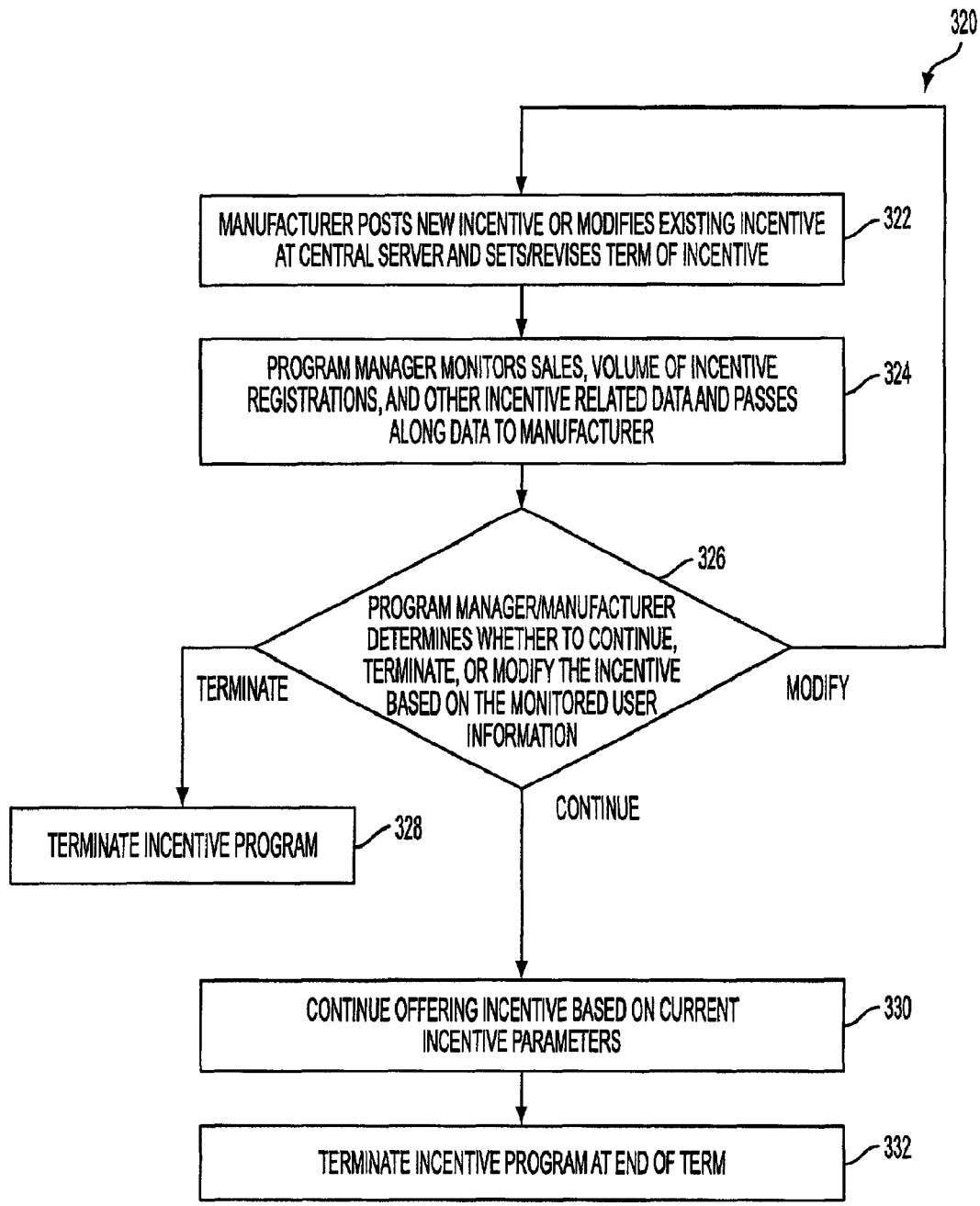
FIG. 7 is a block diagram illustrating an implementation of the present invention in a fifth incentive program scenario.
Figure 8:
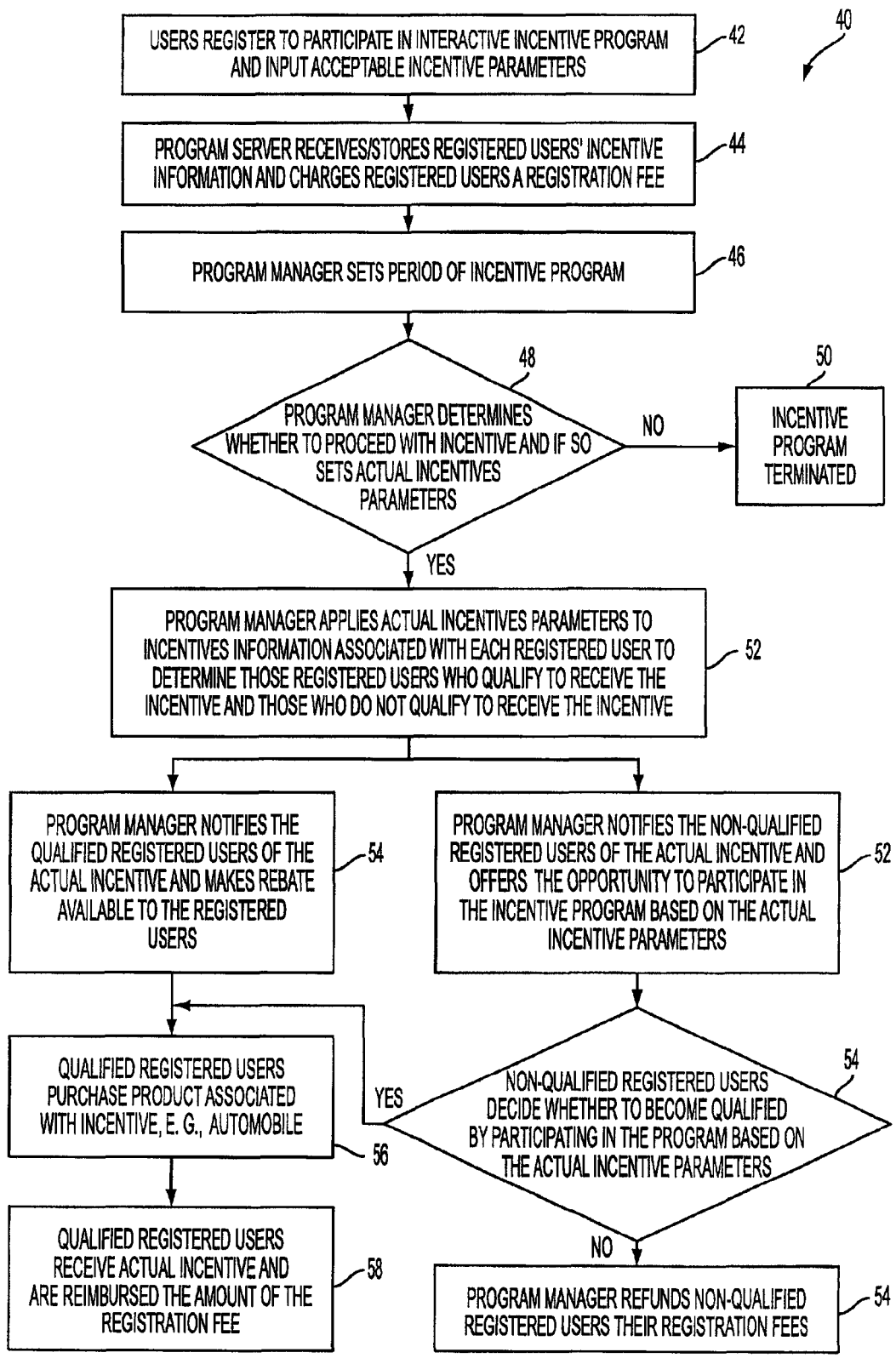
FIG. 8 is a block diagram illustrating an implementation of the present invention in a sixth incentive program scenario.

FIG. 7 offers a variation on the systems described above in that the program manager essentially loops the user information analysis to provide a potentially continuous incentives program. Based on user information, the program manager periodically modifies the program to assure that the program is operating within parameters downloaded from the manufacturer and to optimize, based on data and instructions received from the manufacturer, the incentive program. For instance, if a manufacturer desires to maintain a fairly constant number of incentive participants each month and the incentives program can attract approximately the same number of participants with the incentive value at $500.00 as it can with the value at $800.00, then the program manager, or a processor facility at the manufacturer, would maintain the program at $500.00. If the program manager or its counterpart recognizes a trend in which the number of participants is falling, then it may increase the incentive amount to $800.00 or more until it can identify the least possible amount necessary to keep the desired number of participants involved in the program. In the event the incentive amount becomes excessive, e.g., outside the range of parameters set by the manufacturer, then the program manager may terminate the program.

In one example of an interactive incentive format, each user may be permitted to input an individual acceptable incentive value at which that particular user is willing to participate in the incentive program and purchase the good or service. Upon receiving the user-specific incentive information, the incentives program manager 80 at the central server 22 processes the received user information, as well as additional information received from the source of the goods or services 32, to arrive at an actual incentive value. Those users having transmitted an individual acceptable incentive value that is no greater than the actual incentive value will be qualified to receive the incentive at the actual incentive value. Those users having transmitted an individual acceptable incentive value that is greater than the actual incentive value will not be qualified to receive the incentive at the actual incentive value. Those users not qualified to receive the incentive may be contacted, in an on-line fashion or otherwise, and offered the opportunity to participate in the program based on the actual incentive value.

The incentives program manager 80 may be used in conjunction with an analytical processing function provided by a manufacturer 32 or may include further means to process additional data, such as sales, revenue, profit, cost, manufacturing or supplier capacities, and manpower capacity to arrive at an incentives program for a particular good or service or class of goods or services. This data may be processed to determine optimal manufacturing, sales, revenues, or other goals associated with particular ranges of incentive values or number of participating users. In accordance with an established set of parameters designed to achieve the desired goals, the incentives program manager 80 determines the actual incentive value based at least in part on the level of user participation.

The user may be presented with a questionnaire regarding such things as the user's desired method for notification in the event an incentive for which the user registered is or is not being offered, as well as communicating additional transactional information related to the incentive.

After the initial uploading of user-specific information, subsequent visits to the site by a user involve a much abbreviated login procedure, merely to establish identity of the user and that the user has registered profile information at the site.

The site affords users the opportunity to update profile information and a prompt may be periodically presented to users to update the various fields. The user profile data is stored at a user profile database 94 which is connected to or forms a part of the central server 22.

The central server 22 processes incentive program information to formulate an incentive offering to present to users who visit the site. After the user has logged in, the user has access to at least some of the various goods and services offerings presented at the site as well as any associated incentives. The system 20 is capable of segregating offers based on geographic, identified areas of interest, past purchasing history, and other demographic data collected from the users and presenting the segregated offers on a targeted basis for presentation only to those users identified to receive the incentive.

According to one aspect of the invention, which shall be referred to as Multi-Path Data Acquisition, the system obtains information from users via a gradual give-and-take process in which the system educates the user as to the benefits received by the user in providing discrete bits of information (e.g. their ZIP code) to the system administrator and/or manufacture and/or dealer, and then asks for the information. Alternatively, the system may provide a larger potential benefit (e.g., a car raffle or as part of the giveaway program) in exchange for a large amount of information provided all at one time. The system, in performing various functions, considers that information that has been and has not been provided by the user and bases its actions, to some degree, on this information.

According to another aspect of the invention, referred to as Multi-Level Incentives, the system attaches incentives to multiple levels of the automotive product hierarchy. For instance, an incentive may be associated with one or more of an automobile make, model, style, trimline or option(s). This allows maximum incentive and market flexibility with both detailed and overlapping incentives, permitting manufacturers to respond very precisely to market demand.

According to another aspect of the invention, referred to as Multi-Domain Incentives, the system allows targeting of incentives to, among other things, a product, a geographic region, and a demographic segment of the population. Such targeted incentives may be overlapped, again permitting manufacturers maximum market flexibility in responding to demand conditions in the marketplace.

According to another aspect of the invention, referred to as Perfect Information, the system provides a perfect competitive view of the automotive market to manufacturers and dealers. To achieve this in one manner, the system provides data at four levels of refinement. At the first level, market demand includes all data in the system, including that of unidentified users. At the second level, market demand includes only the demand data associated with identified individuals. At the third level, market demand includes only the demand data of those users having registered and paid a fee to be included in a future interactive incentive, such as proposed by a manufacturer or requested by the user. At the fourth level, market demand includes only the demand data of those users having purchased a vehicle.

According to another aspect of the invention, referred to as Flexible Incentive, the system provides multiple interactive incentive models to the manufacturers. The manufacturer might choose to fully disclose a preset incentive "template" to users, showing, for instance, level of participation required to trigger a particular incentive level and an indication of current participation. The manufacturer might choose to control the incentive in real-time, showing only the current incentive level to users. The manufacturer might choose to control the incentive in real-time or by template, and reveal no incentive level information to the user until the incentive is finalized. The manufacturer might choose to issue certificates only at the end of the incentive, resulting in all users receiving the same incentive, or to issue certificates on user demand, which might result in various users receiving different incentives. This may take the form of a sliding window type incentives program.

According to another aspect of the invention, referred to as Demand Balancing, the system allows the user to communicate in their own terms or based on a series of pull down options or prompted inquiries. The user-defined incentive criteria can be any number of items, or in its simplest form can be one form, such as the total level of incentive required for them to act. This can be communicated directly to the manufacturer or autonomously through the system administrator. The manufacturer only sees the additional level of incentive required beyond what is currently available to the user through other incentives. A user may require $3000 in incentives to make a purchase. $2500 may be currently available through existing incentives. The manufacturer would see only that a $500 additional incentive would be needed.

According to another aspect of the invention, referred to as Incentive Broadcast, the system identifies incentives by make, model and geographic region which pertain to a particular dealer, and broadcast live incentives matching that profile to the participating dealer.

According to another aspect of the invention, referred to as Dealer's Choice, the system allows a user to register for future interactive incentives within a dealership, restricting the user to vehicles associated with that dealership and to working with that dealership.

According to another aspect of the invention, Stealth Mode, the system can acquire the look and feel of the invoking host system, while filtering the view to a subset of makes and models approved by the invoking host. This provides the "sponsoring" host with the competitively restricted view which they require, while still collecting the entire universe of automotive demand in a single database. The subject site would be pre-initialized with all wallpaper graphics, button graphics and fonts required by sponsoring hosts. Sponsoring hosts would announce themselves via a "portal ID" which defines the graphics and fonts to use, and the look and feel customization to invoke down to the individual screen level.

Figure 9:
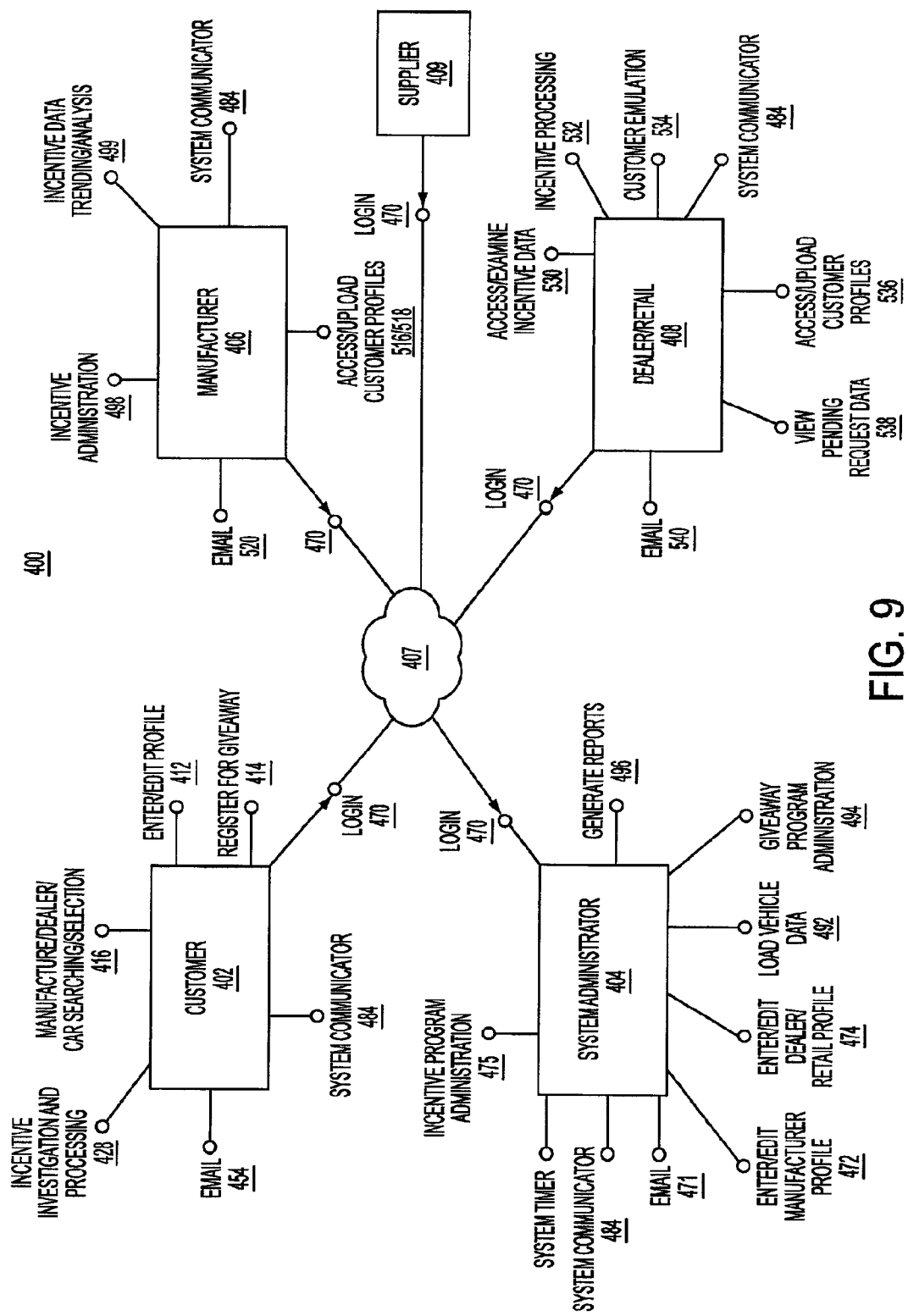
FIG. 9 is a schematic diagram illustrating a second embodiment of the incentives distribution/tracking/analyzing system of the present invention.

With reference to the embodiment of the present invention as illustrated in FIG. 9, an online system for the distribution, tracking and analyzing of incentives, generally referenced as 400, includes a central system administrator 404, a customer 402, such as a remote PC based user, a manufacturer 406 and a dealer/retail participant 408. The online system is generally implemented or re-distributed network and in particular, the participants may communicate via the Internet 407 such as on the World Wide Web. It should be understood that any of a number of means for communicatively coupling the participants is fully contemplated by the present invention.

It should be understood that the systems and methods of the present invention are equally applicable in single proprietary manufacturer embodiments as well as in embodiments having multiple participating manufacturers. The system can be powered separately at one or more manufacturer sites or systems and separately for the individual benefit of each such manufacturer. A service provider can maintain the manufacturer sites separate from other manufacturers or the system can be used to provide customers with a multi-manufacturer site. In the case of a single manufacturer arrangement, links, information, data access, and other functions of interest are accessible only by the particular manufacturer and/or dealers of the particular manufacturer. Customers would then visit each of the multiple manufacturer sites to access information pertaining to each such manufacturer.

To the extent a common site, such as a service provider, has access to information pertaining to a non-participating manufacturer, such information may be provided to customers for comparing product and incentive offerings of a plurality of manufacturers, including non-participating manufacturers. Also, many manufacturers have parent and affiliated companies and are made up of more than one division. A parent company may include the offerings of one or more of its divisions or may maintain separate sites. Clearly where manufacturers or divisions desire to maintain separate sites, or separate areas on a service provider site, but desire to share information with other manufacturers or divisions, the service provider, such as through the system administrator, can achieve this. In particular, only a subset of collected data, such as raw customer demographic data, success rates on different types of incentives, etc. may be shared.

A login module 470 of the system administrator 404 handles and processes the log in of the customers 402, the manufacturer 406 and the dealer/retailer 408. For instance, upon accessing a web site hosted by the system administrator 404, the customer is presented with a home page having various access points to information to a number of topics, including service provided by the system administrator and the benefits to the customer. Preferably, before gaining access to registration for incentives, the customer 402 is required to register with the system administrator which presents a customer profile client fields such as name, address, email address, etc., and certain non-required or voluntary fields, such as age, occupation, income, various purchasing habits including car purchases, driving habits, etc. If the customer has previously entered a profile, then the customer may proceed to login such as via a user name and password. For example see FIGS. 22 and 24-26.

Figure 22:
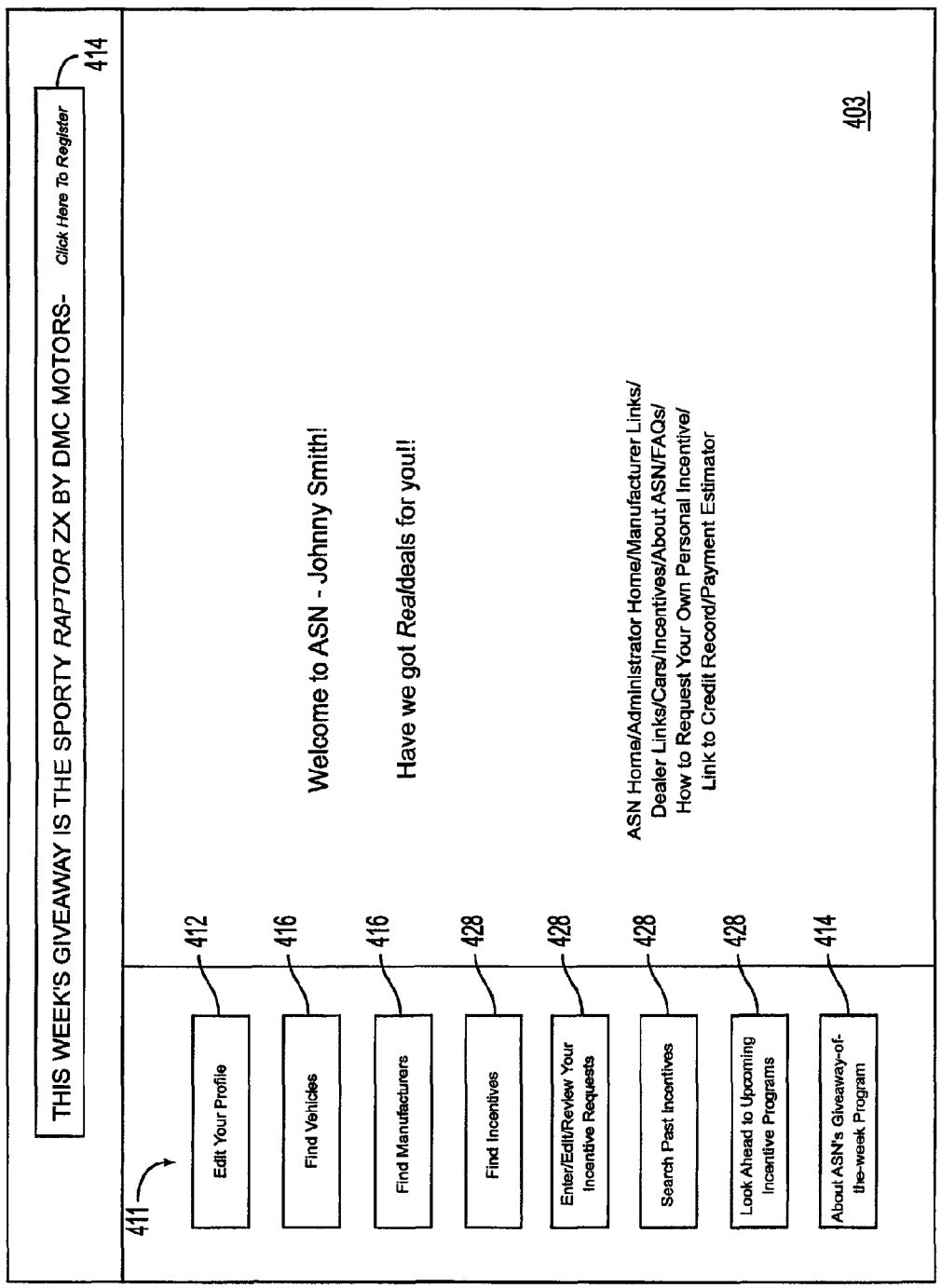
FIG. 22 represents a screen shot of a sample system administrator web page for use in a central system associated with the present invention.
Figure 23:
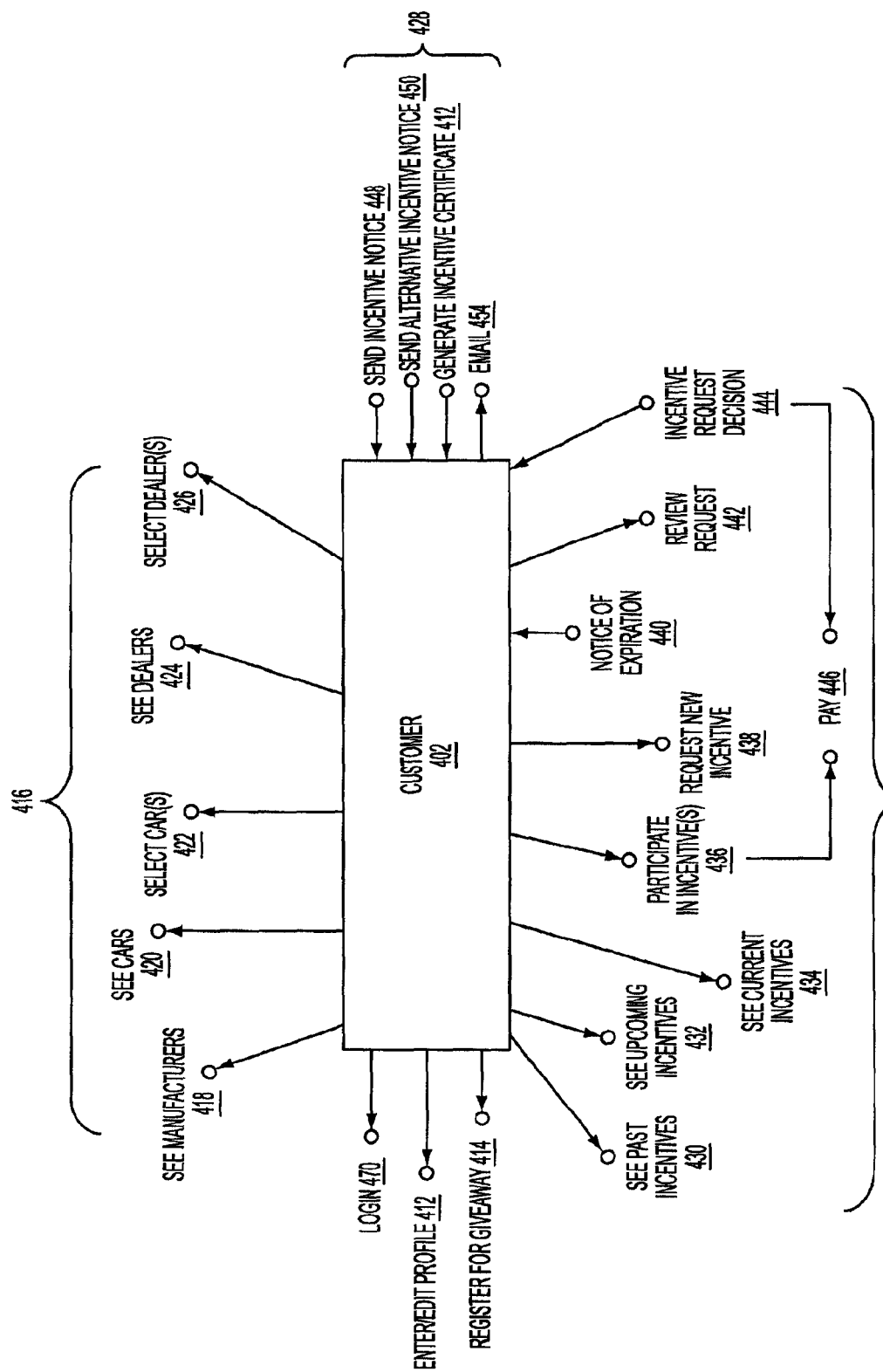
FIG. 23 schematic diagram illustrating the customer function of the system of FIG. 9.
Figure 24:
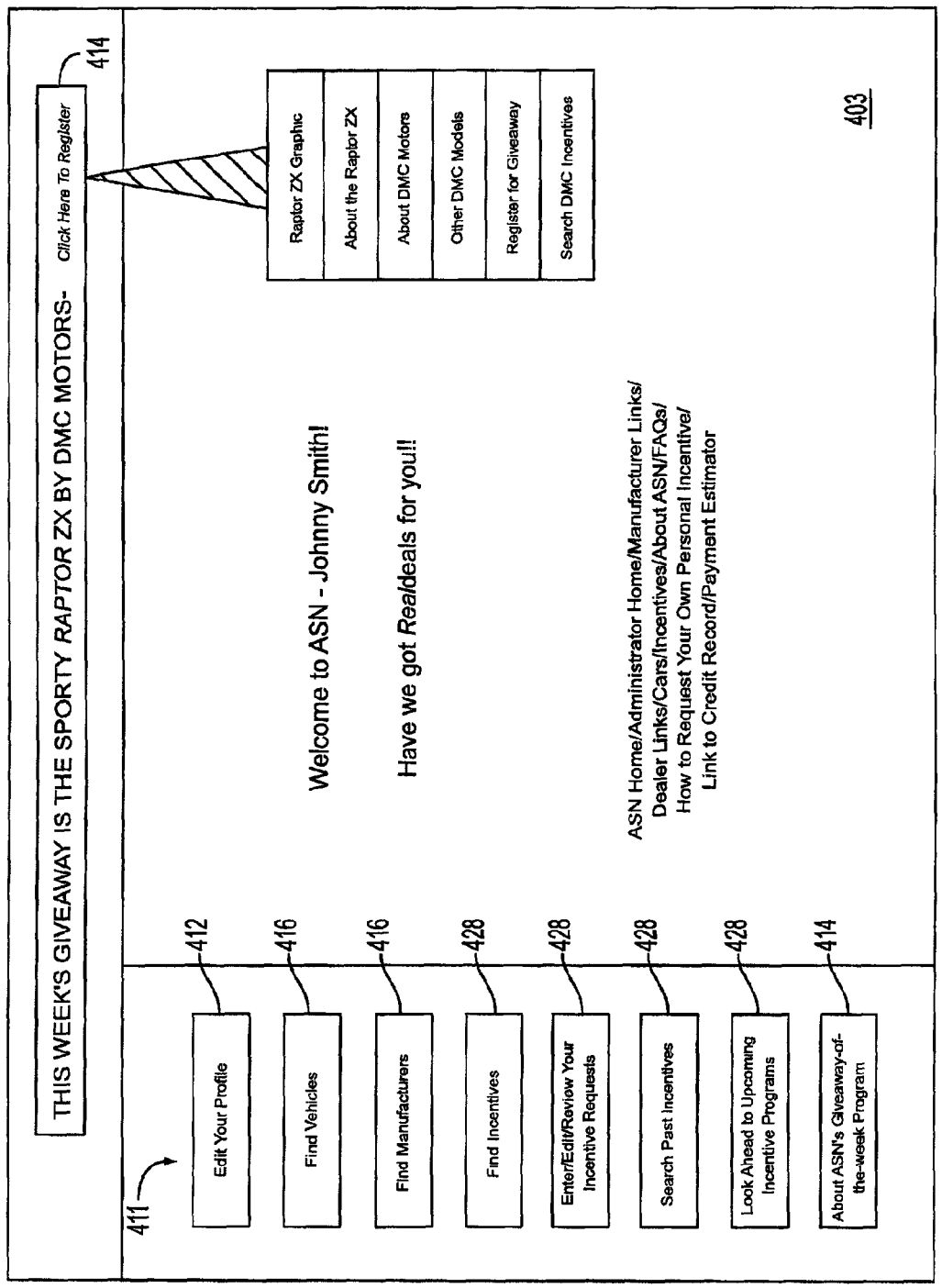
FIG. 24 represents a screen shot of a sample customer web page for use in a central system associated with the present invention.
Figure 25:
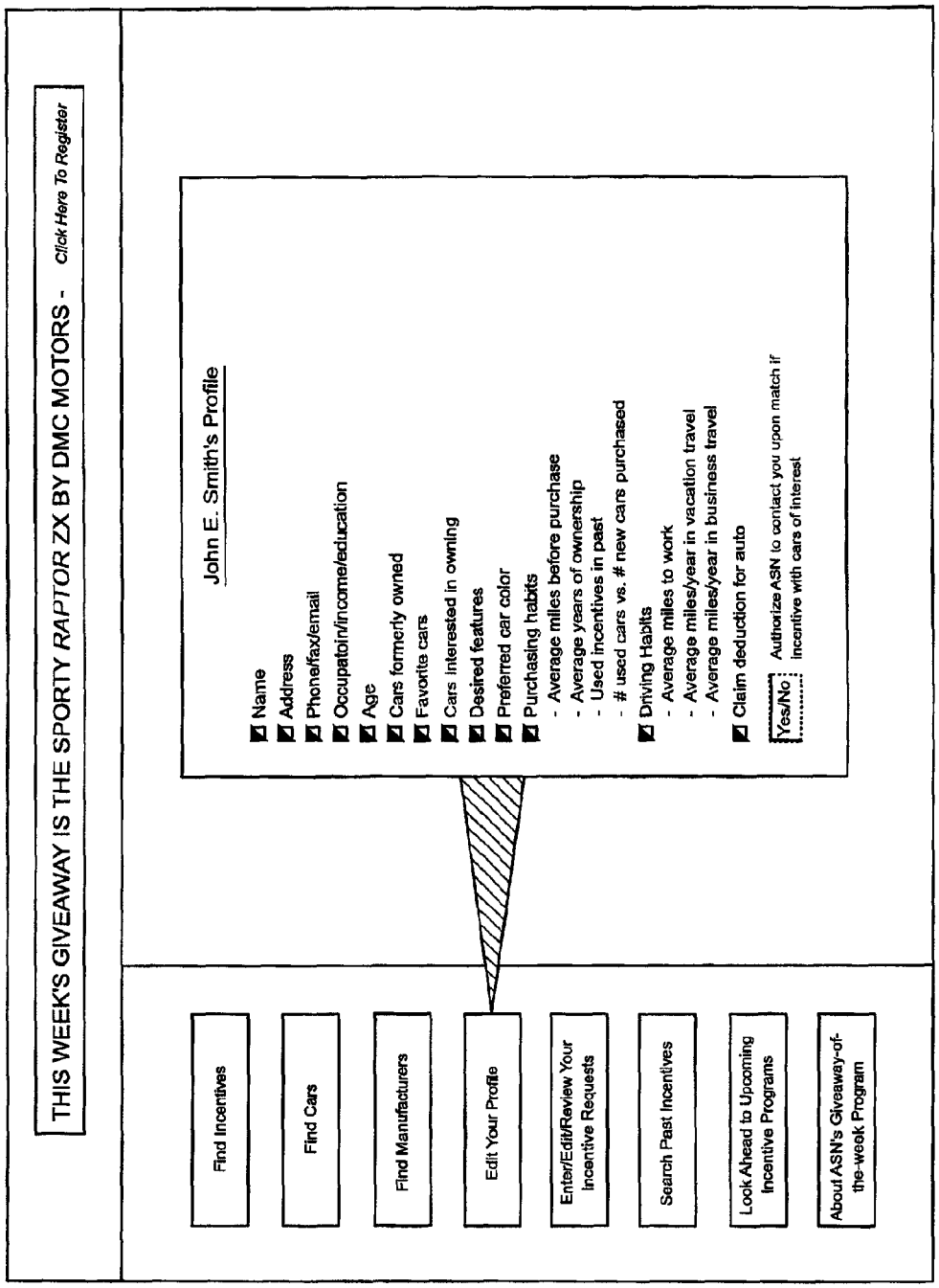
FIG. 25 represents a screen shot of a sample customer web page with profile function for use in a central system associated with the customer function of FIG. 23.
Figure 26:
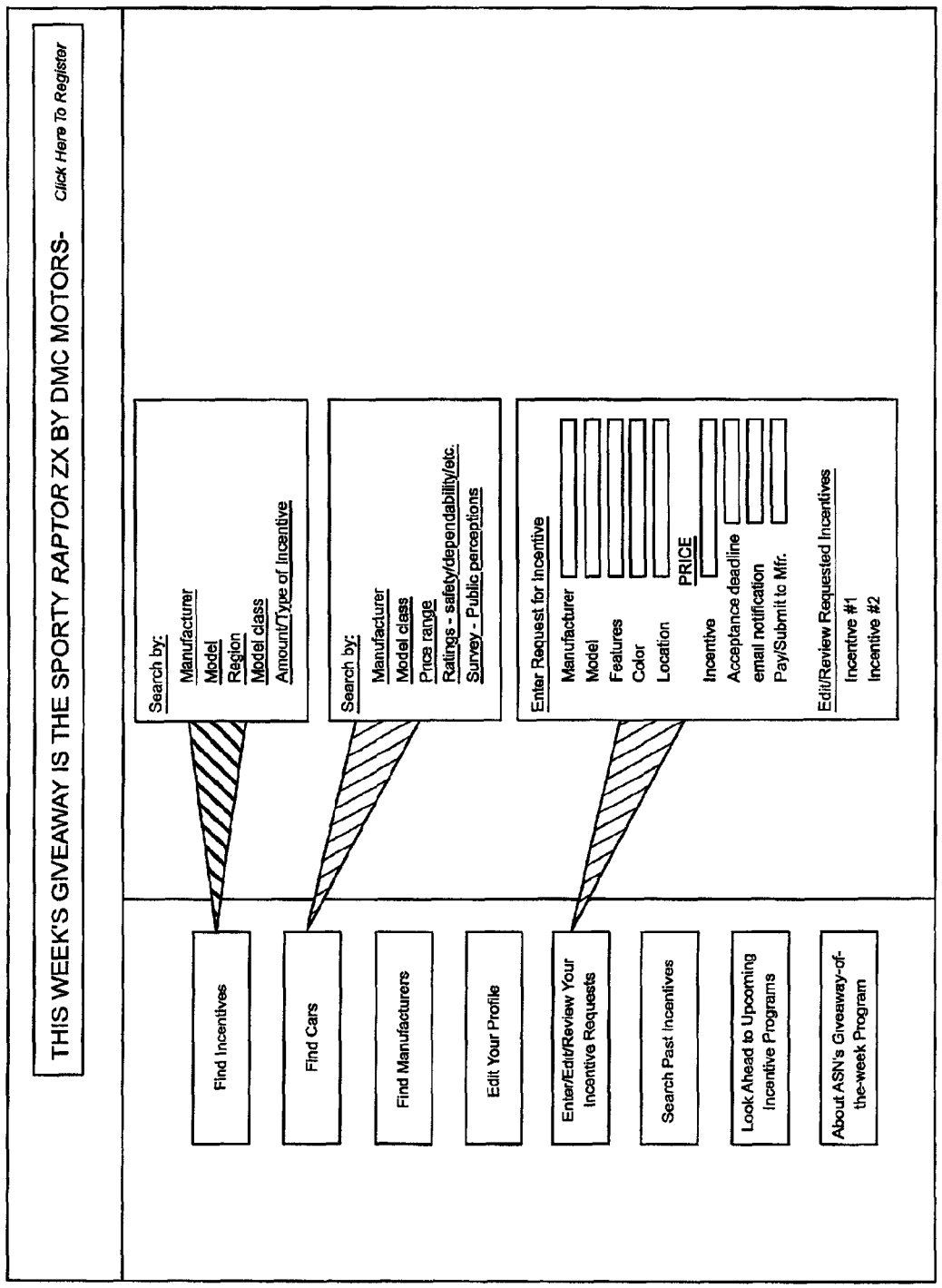
FIG. 26 represents a screen shot of a sample customer web page with search and incentive request for use in a central system associated with the customer function of FIG. 23.
Figure 27:
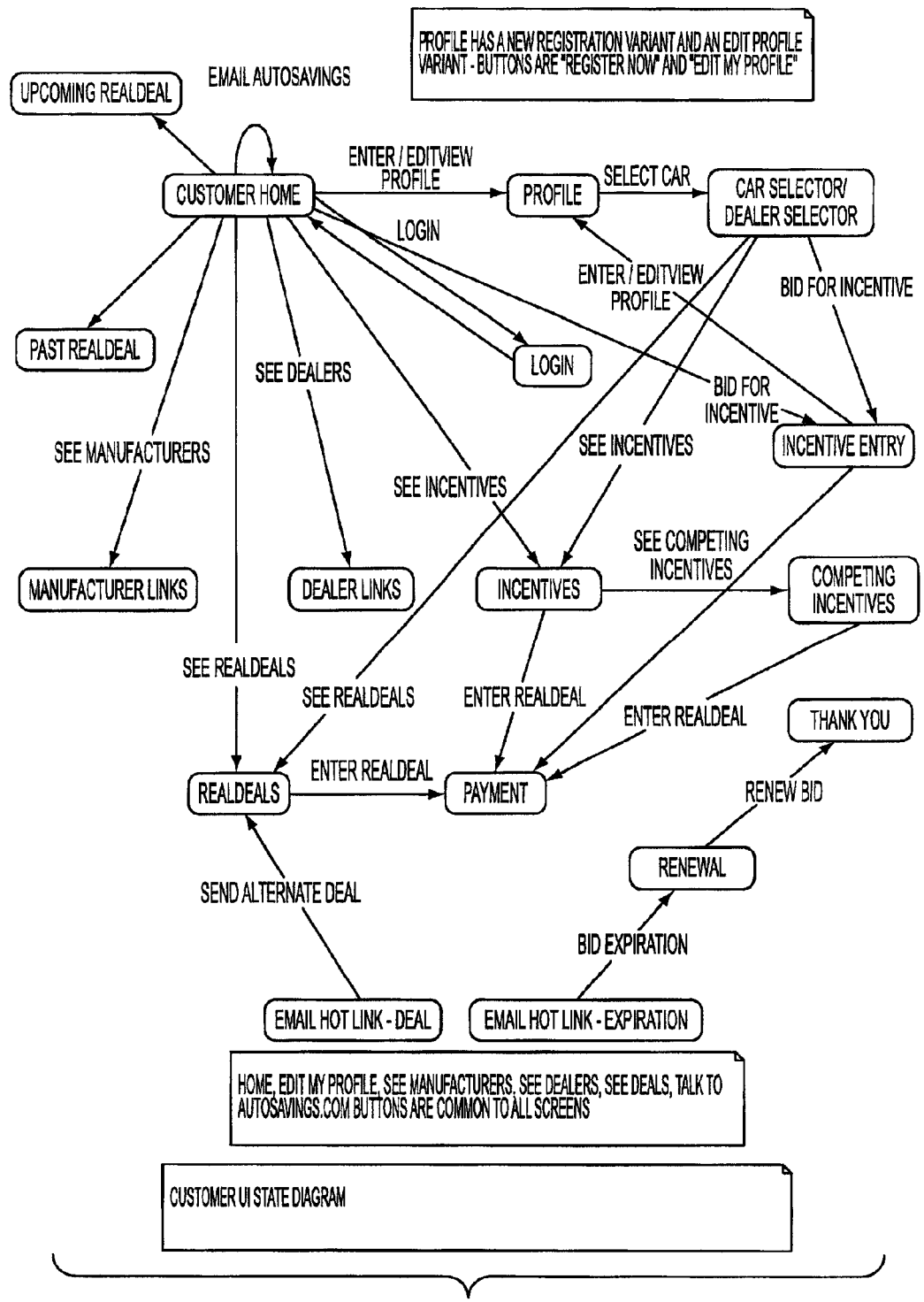
Figure 28:
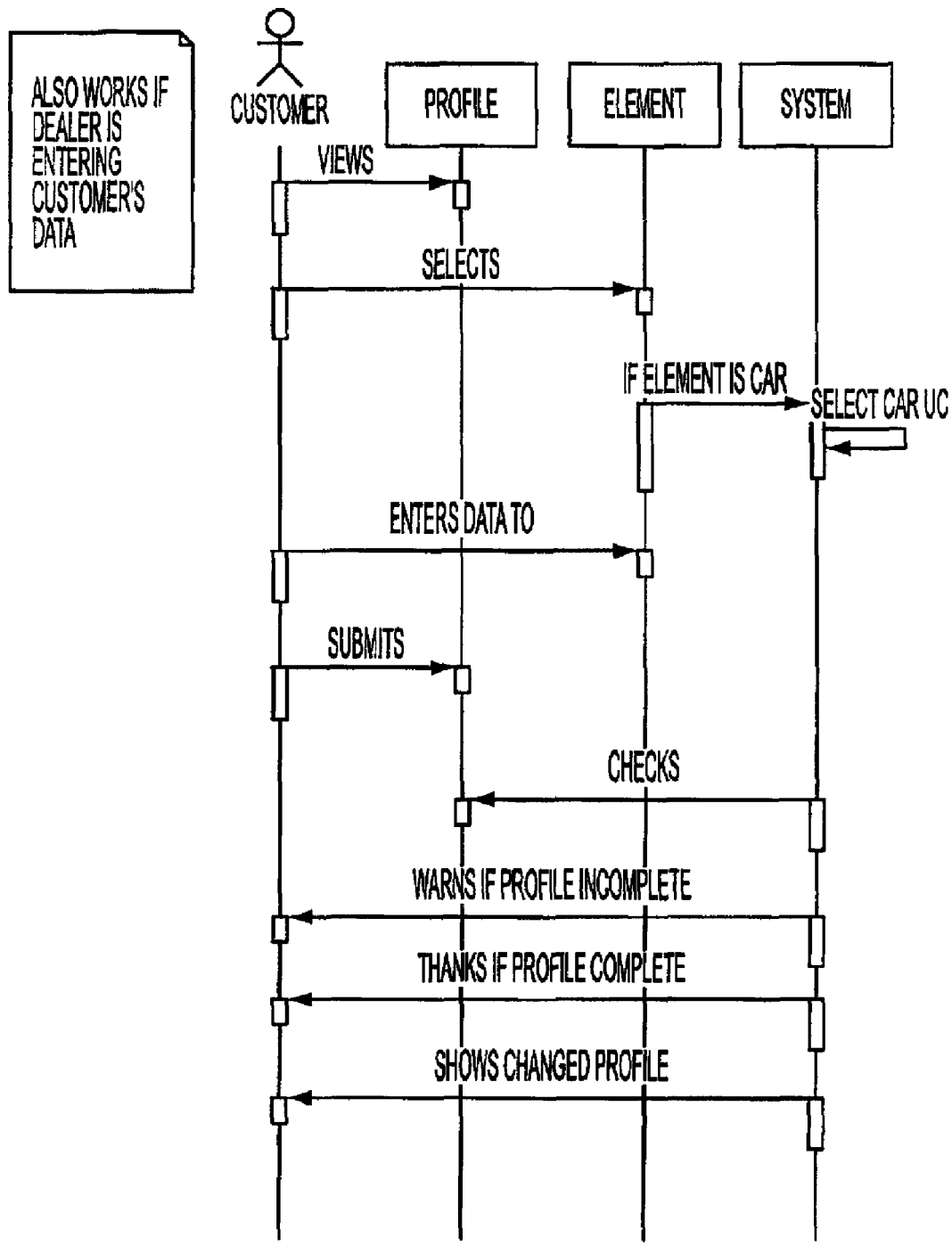
Figure 32:
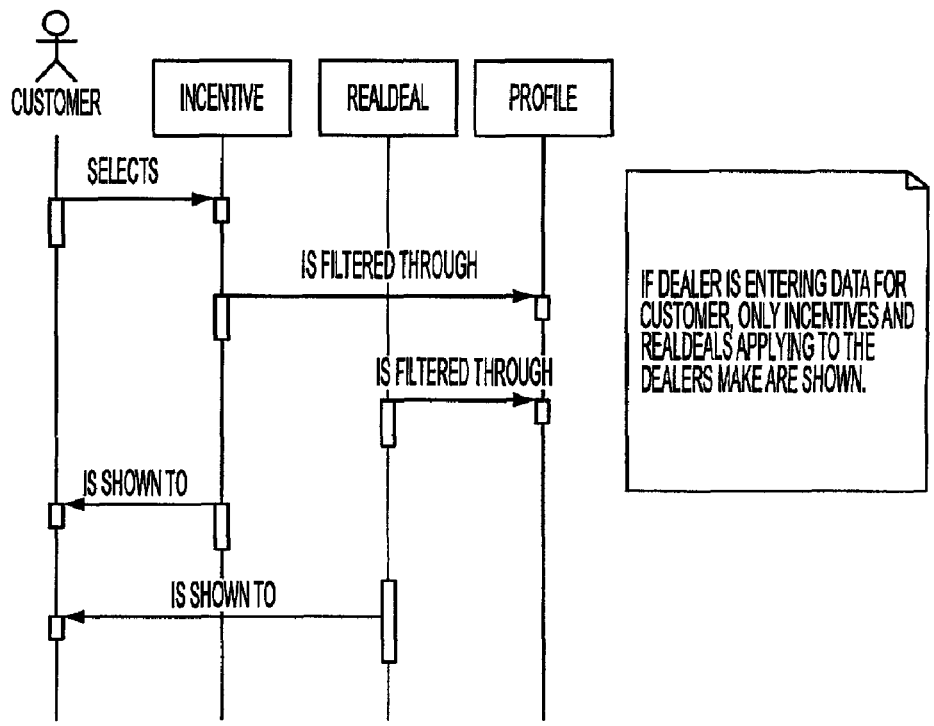
Figure 33:
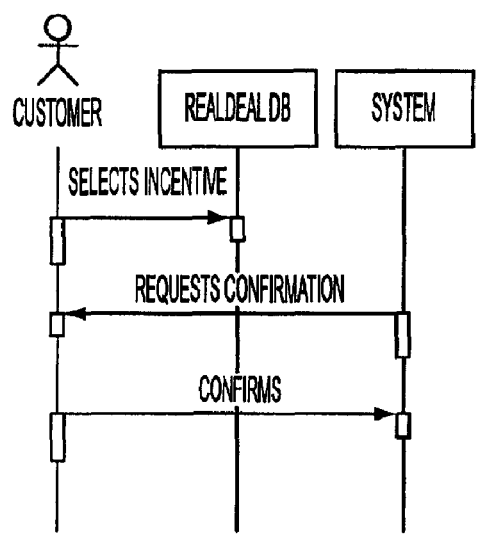
Figure 34:
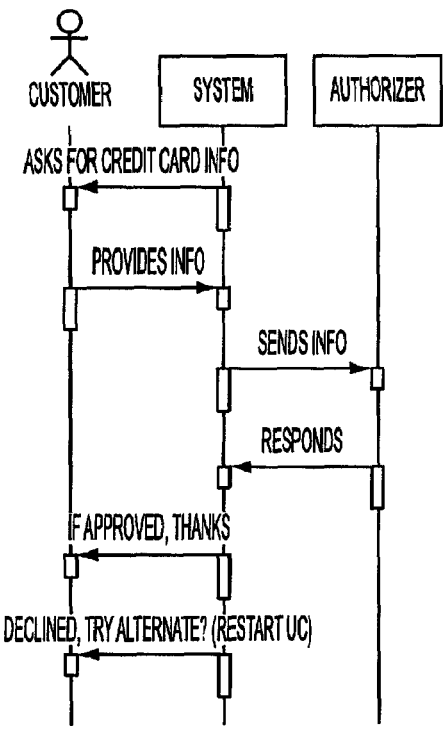
Figure 35:
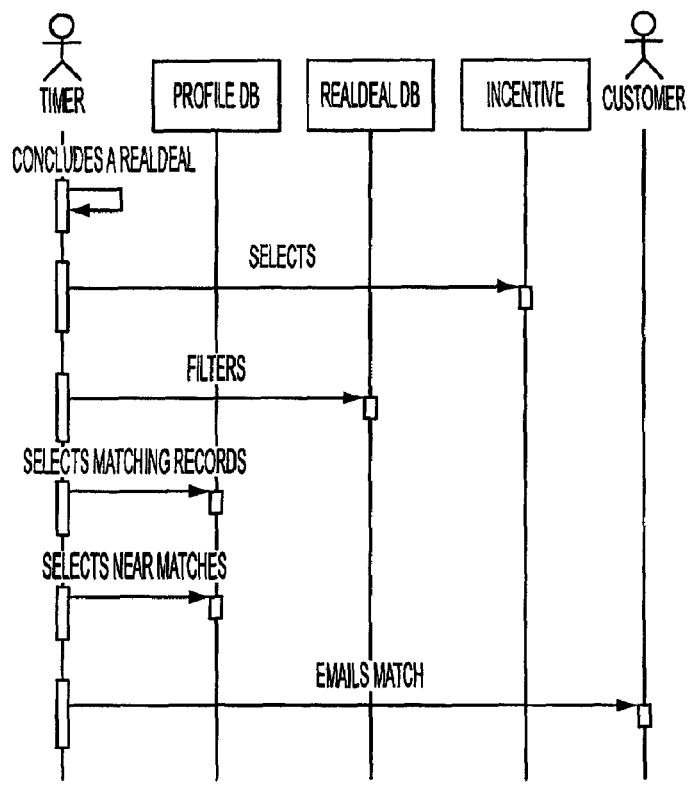
Figure 36:
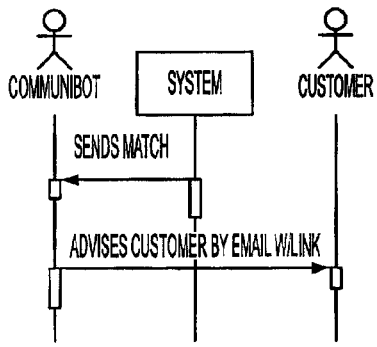
Figure 37:
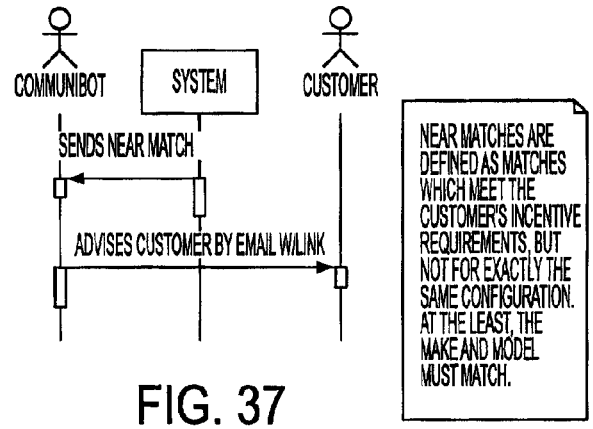
Figure 38:
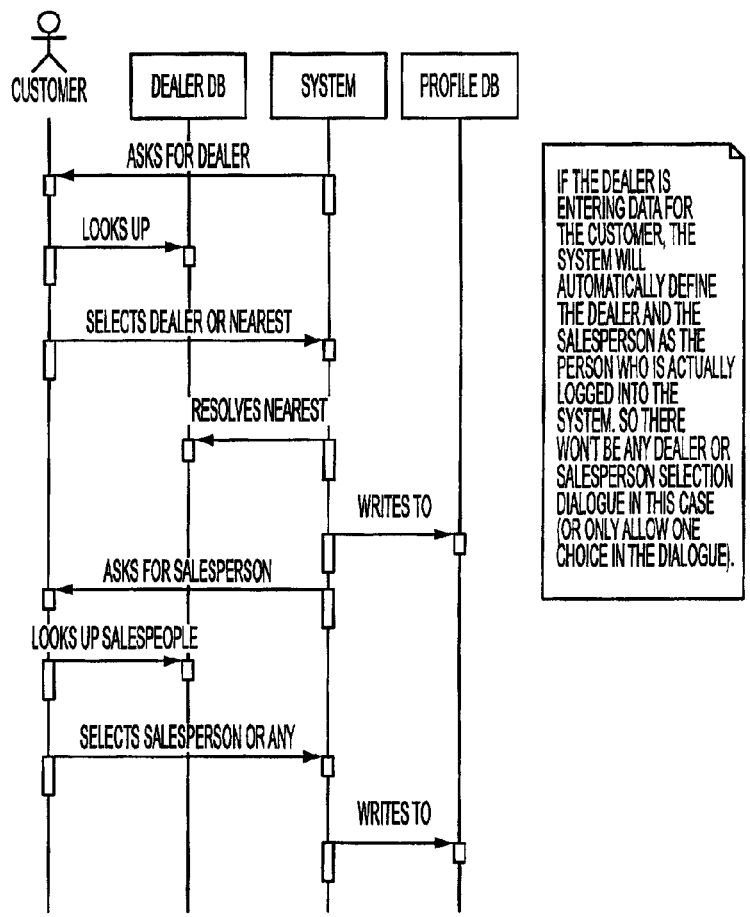
Figure 39:
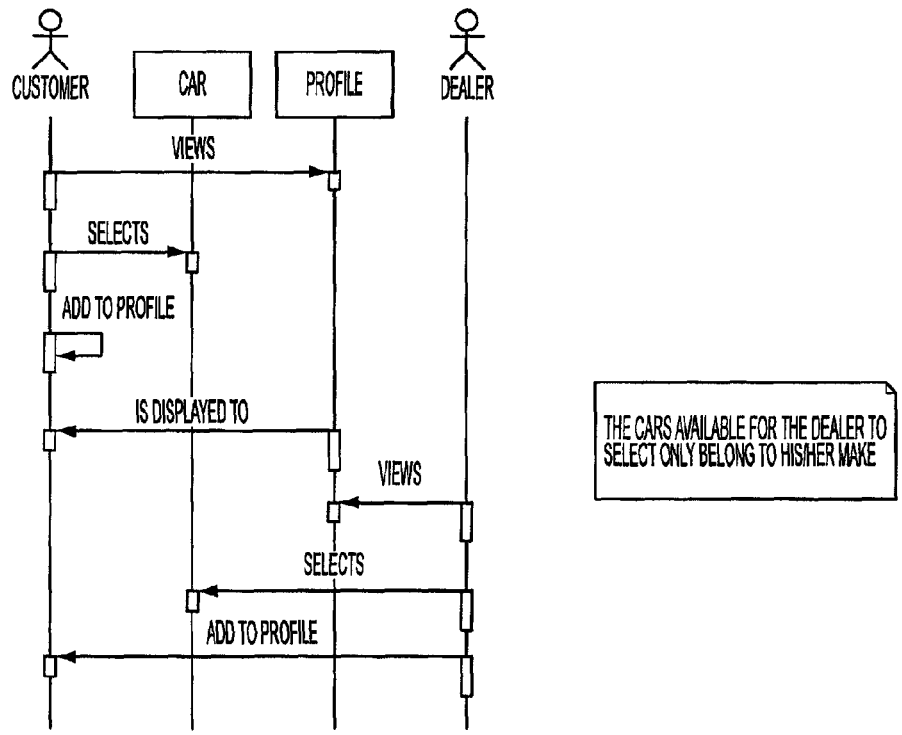
Figure 40:
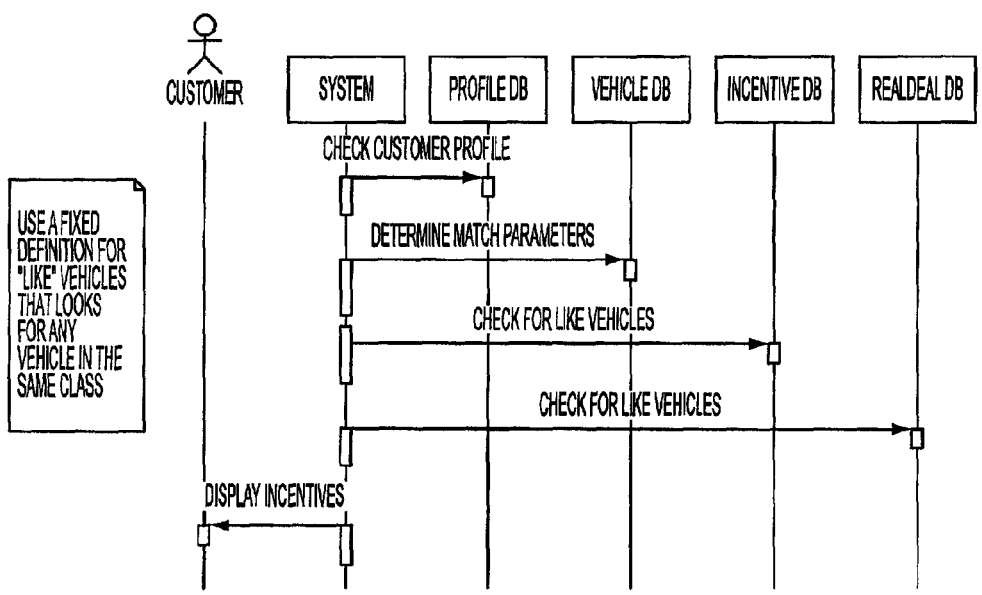
Figure 41:
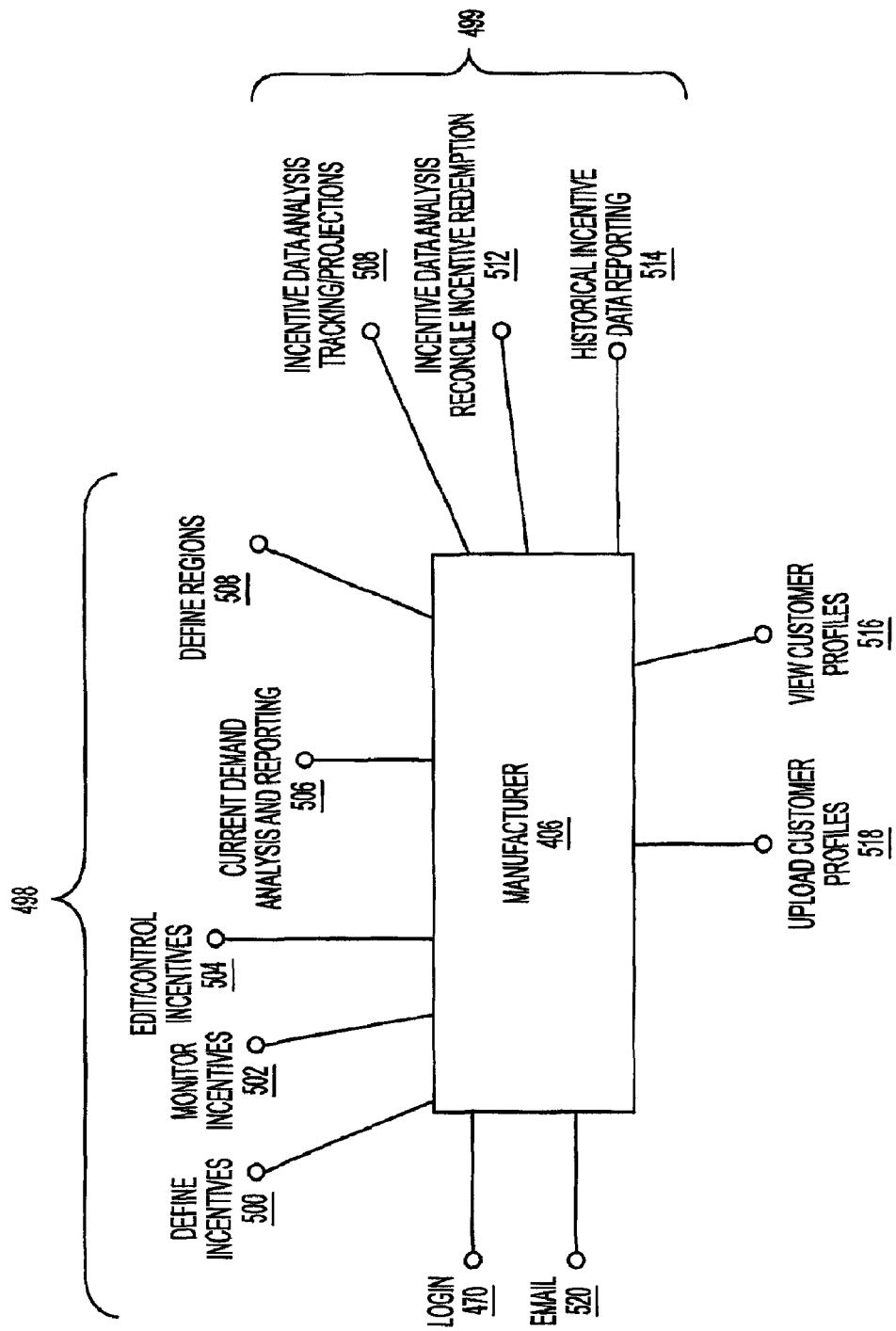
FIG. 41 schematic diagram illustrating the manufacturer function of the system of FIG. 9.
Figure 42:
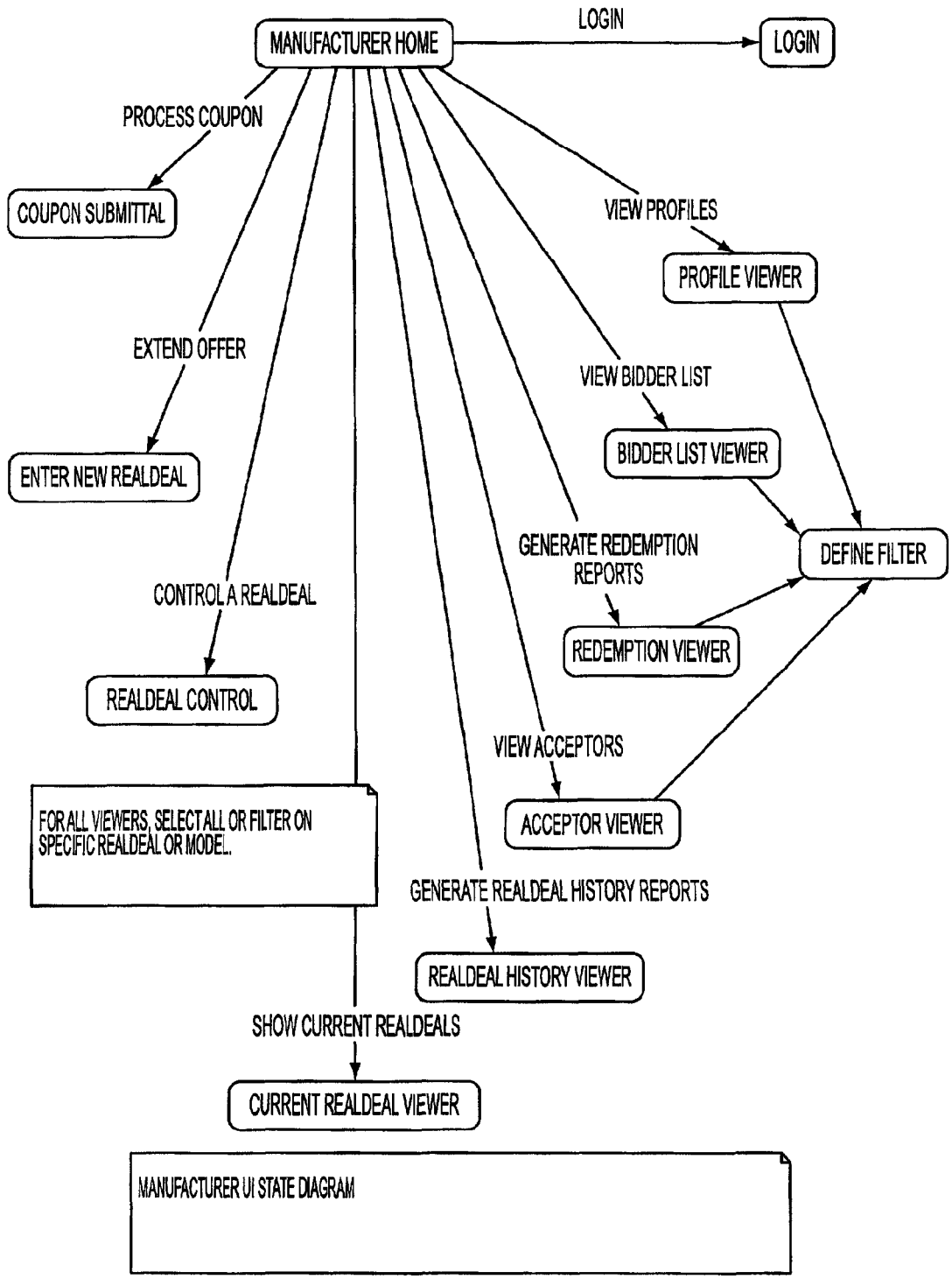
FIGS. 42-47 represent functional flow diagrams illustrating various sub-module aspects of the manufacturer function of FIG. 41.
Figure 43:
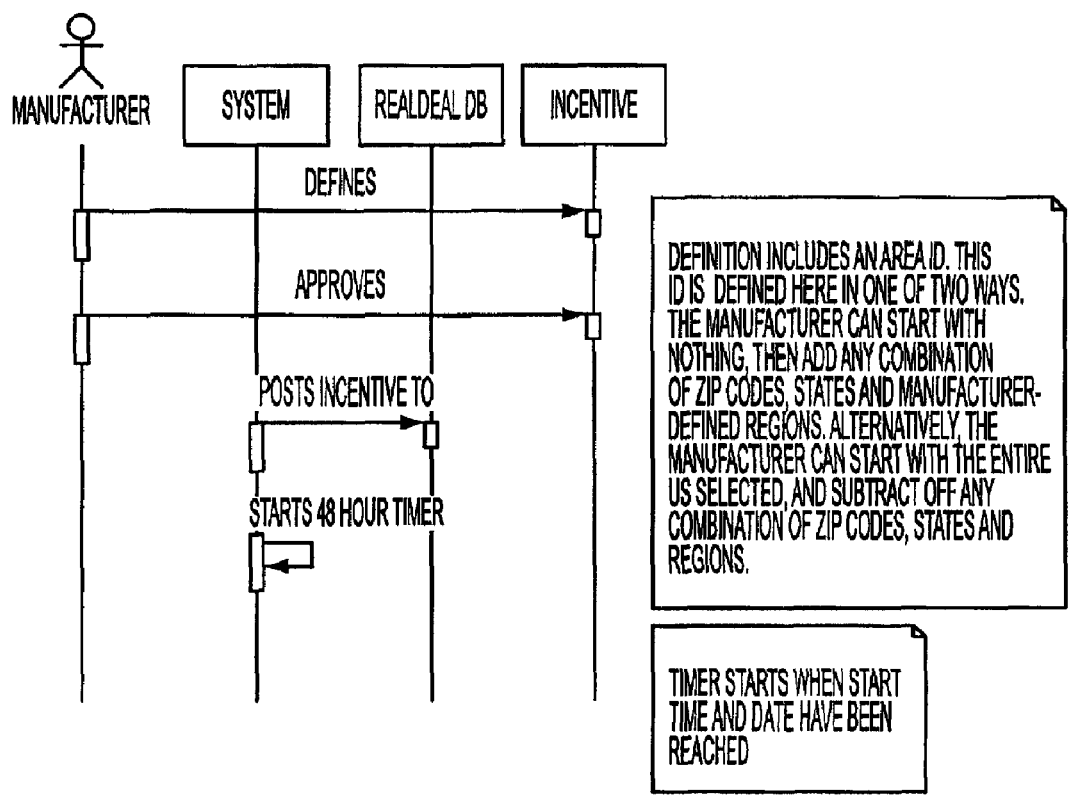
Figure 44:
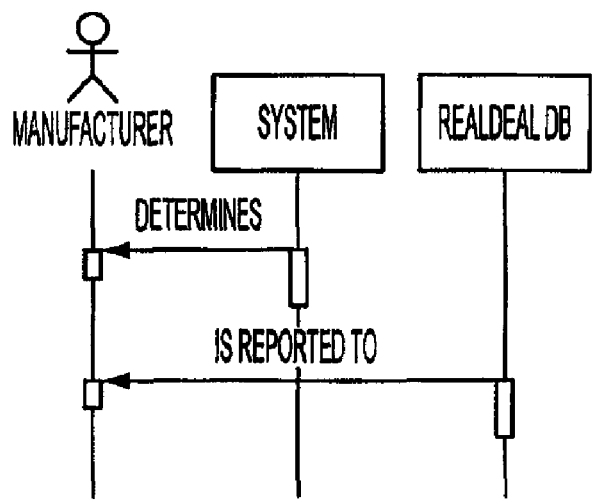
Figure 45:
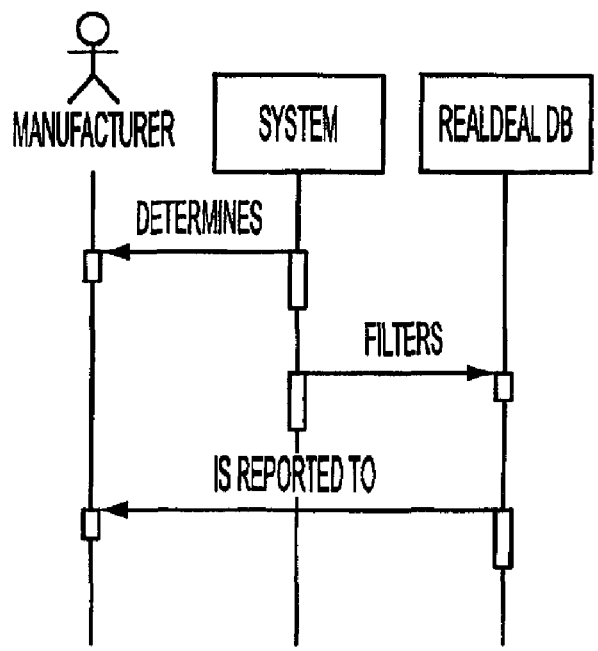
Figure 46:
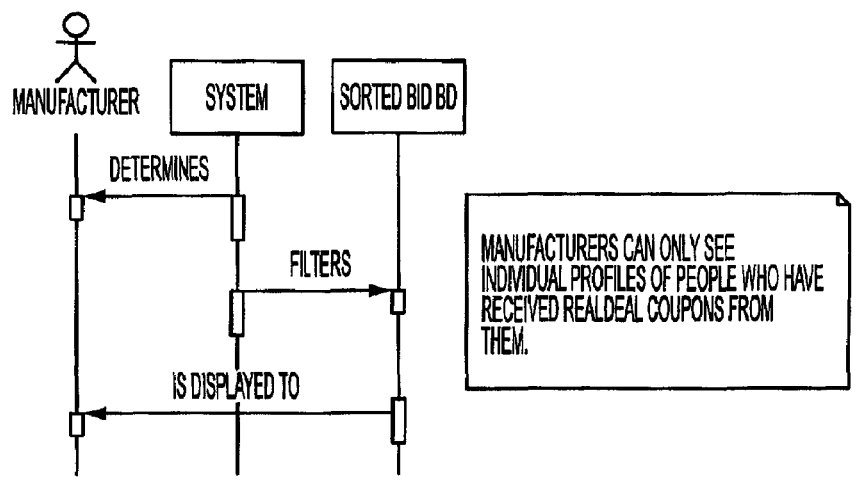
Figure 47:
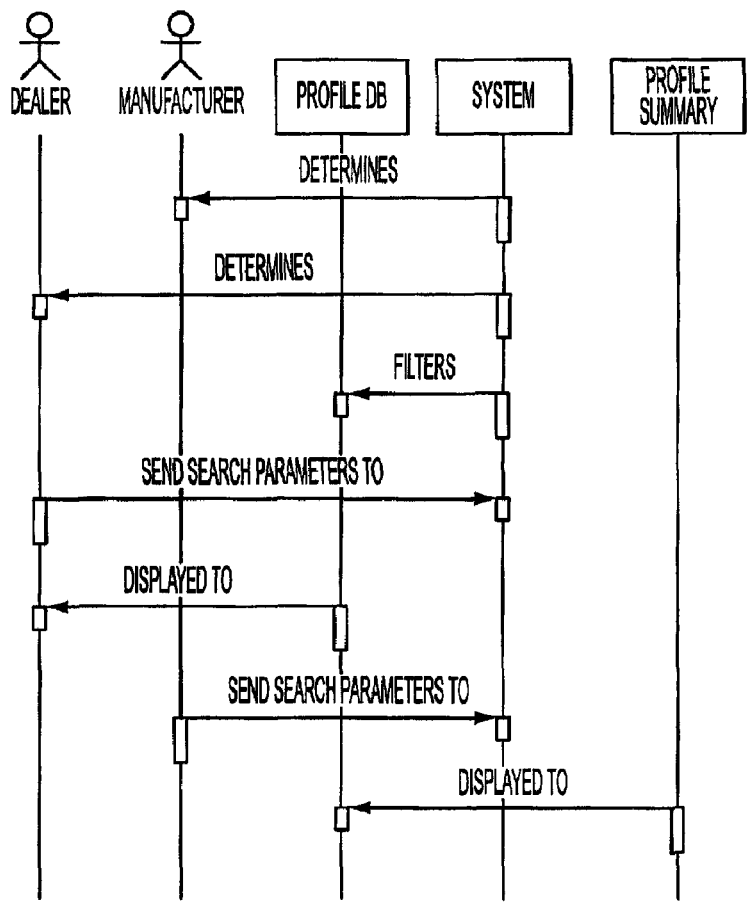

Now referring to FIGS. 23 as well as FIGS. 22 and 24-40. For first time customers, after having entered the required fields of the profile, the system administrator will permit the registered customer to access various area of the system, such as registering for giveaways or other events 414, manufacture/dealer/car search and selection area 416, and incentive investigation and processing area 428. From search/selection area 416, the remote user can access information relating to manufactures, dealers, and cars of interest. From the incentive processing area 428, the remote user can access modules to view all incentives, including current, past, future, and interactive/definable incentives, and can request incentives and receive notification of actions regarding any incentive of interest.

The register for giveaway program 414 may be presented to the customer in the form of a banner having a link to such things as information pertaining to: the manufacturer; the model that is the subject of the giveaway; other models manufactured by the promoting company; and the opportunity to register for the giveaway. In order to register for the giveaway, the remote user will be presented with an informational inquiry used to incentivize the user to provide additional user specific profile information in exchange for the opportunity to participate in the giveaway program. For instance, where the user elected not to provide information in one or more of the non-required field associated with the initial customer profile, then those and/or other fields may be presented to the customer as required fields in exchange for the user's participation in the giveaway program.

One or more customers may be associated with a given customer site 402, such as by assigning individual unique password and login identifiers. A primary customer may be associated with the address of the computer itself. Additional information and notifications may be sent and received by the customer via email 454, which may be by a separate email system or as supported by the system administrator 404 via the system home page presented to the customer.

According to one embodiment of the invention, the incentives search and selection area 428 includes a module that enables a user to view incentives that are currently being offered. These incentives may be categorized as general, related to the user, related to the product or related to user or dealer location. The relative association is processed by the system administrator 404 and is based at least in part on the customer, manufacturer and dealer profiles.

In one manner, the user begins the interaction by specifying year, make and model of the desired vehicle as well as the total dollar value of the incentive required by the user. The system searches local and for remote databases to identify all relevant incentives and presents those incentives that match the user-specified criteria. The system then identifies all incentives which could potentially match the user, such as based on location and/or other profile information. The system prompts the user for additional information to qualify the user for additional incentives. The qualified incentives are then presented to the user. There are three possibilities: that the incentive requirement has not been met; that it may have been met; or that it has been met.

In the first instance, the incentive has not been met by currently available incentives. The user is asked whether they would like to issue a request for additional incentives to meet their requirement or to take the current incentive as it is. In the second instance, the incentive may have been met. For instance, some incentive components are relevant to the user's request, but their actual dollar value has not been determined. The user is asked whether they would like to register for the incentive in furtherance of the likelihood that the incentive will reach their required level. In the third instance, the incentive has been met. The user is informed of this and asked if they would like to register for the incentive.

According to one aspect of the invention, the system will track any number of incentives in an attempt to meet a user's incentive requirement. The system will always present these to the user as a single incentive, with a set of eligibility constraints and an expiration date.

According to another aspect of the invention, when the user wishes to participate in an incentive or to issue a request for a personalized incentive, they will be asked to provide payment information for purposes of securing a service fee. The service fee may be required upon requesting an incentive or upon the user's incentive requirements being met.

According to another aspect of the invention, once the target incentive level has been met for a particular user, that user will be charged a service fee which may be returned to them when the vehicle is actually purchased.

According to another aspect of the invention, if the vehicle selected is not that of a participating manufacturer, and a participating manufacturer is offering incentives on a similar vehicle, the web site will inform the user of this fact, and offer to show them incentives on similar vehicles.

If the incentive search based on user criteria turns up no matches, then all information provided by the user is saved in their personal profile. At any subsequent point, the user can choose to renew the request or to issue a request for additional incentives on any vehicle in the user's profile.

The user may elect to review incentives on all vehicles currently configured in the user's profile. This review would consist of the current value of all combined determined applicable incentives, the eligibility conditions, and the current status of any undetermined incentives. Depending on the type of incentive involved (set by the manufacturer), the current status may consist of the current dollar value, the next dollar value, and/or the completion date and time at which the incentive value is made final.

Upon the system administrator identifying one or more matches, then a certificate, such as representing a rebate or the right for rebate may be requested by the user or may automatically be delivered to the user. The user, the user may print out a certificate, which includes one or more fields of information, such as for identifying the user, the incentive or incentives, the dollar value of incentives, the vehicle incented and all incentive terms and conditions.

Figure 48:
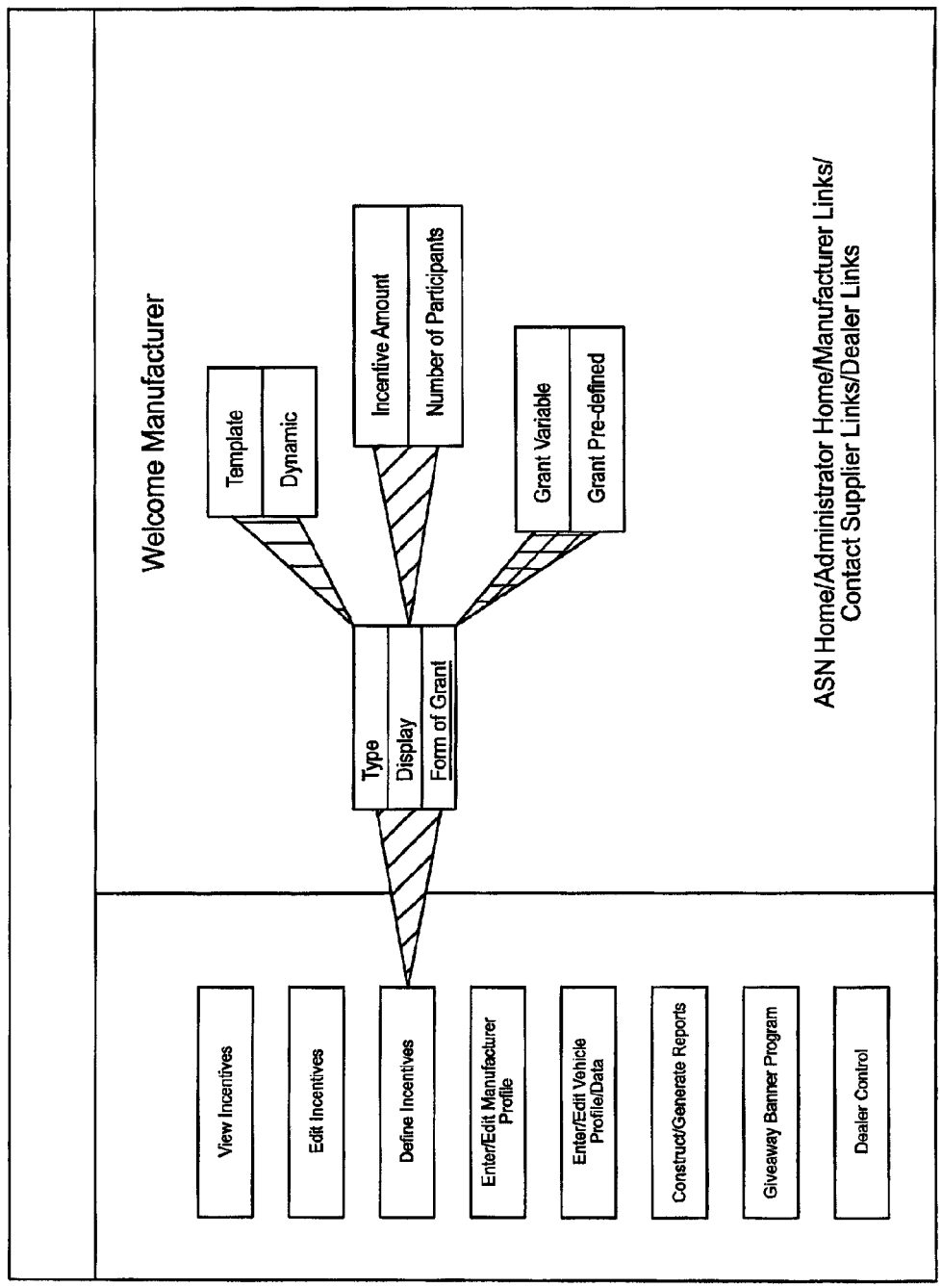
FIG. 48 represents a screen shot of a sample manufacturer web page with define incentives associated with the manufacturer function of FIG. 41.
Figure 49:
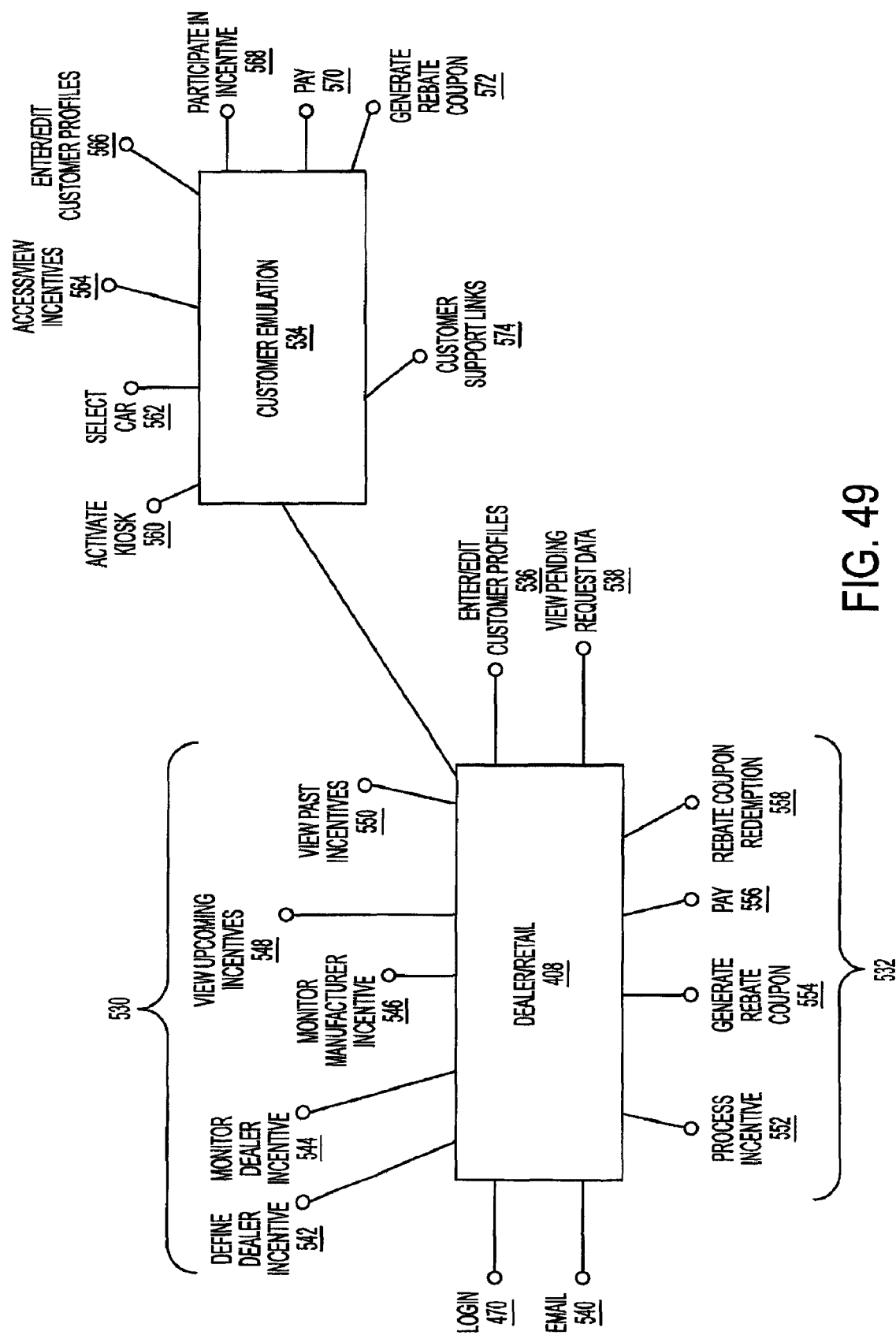
FIG. 49 schematic diagram illustrating the dealer/retailer function of the system of FIG. 9.
Figure 50:
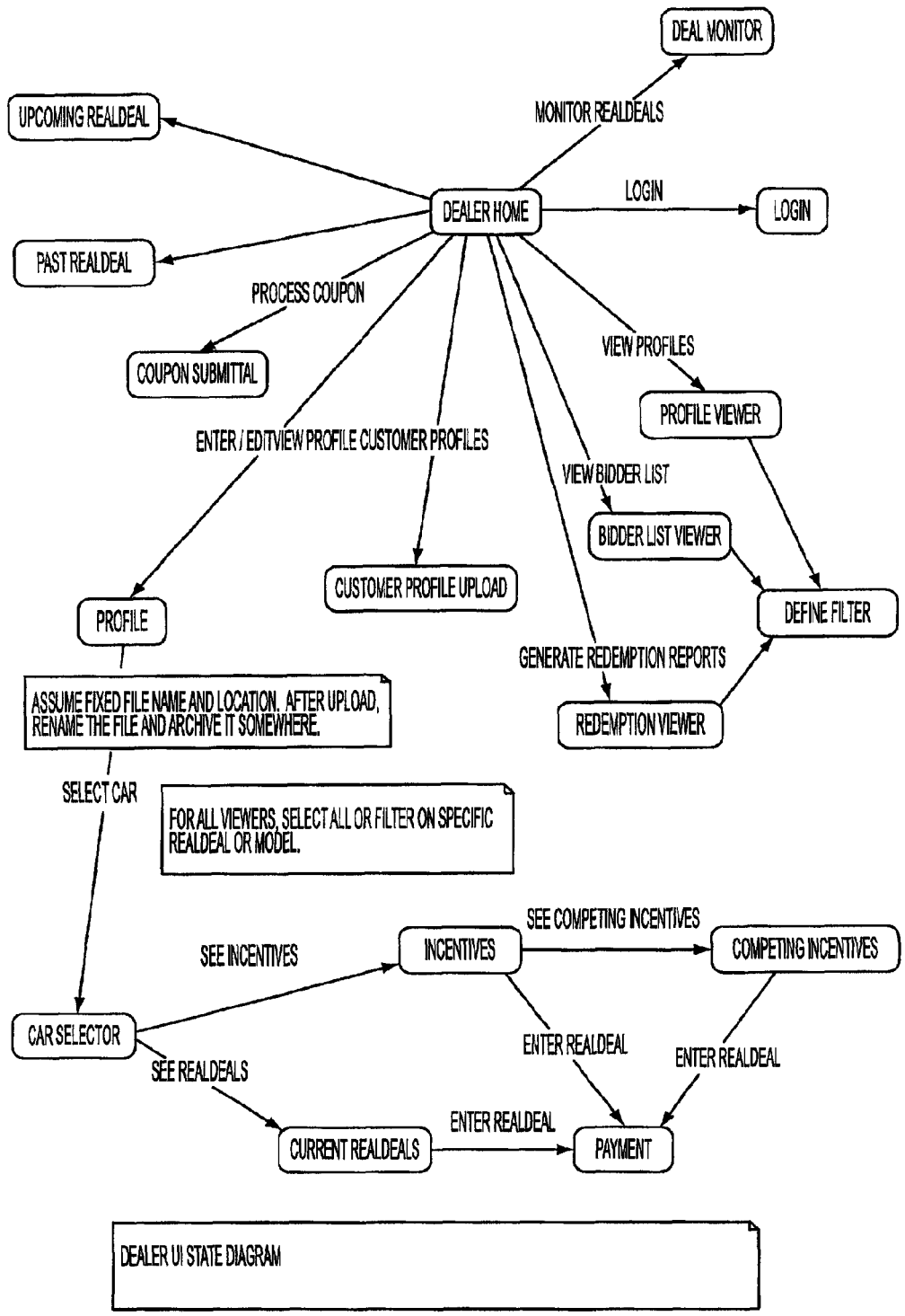
FIGS. 50-59 represent functional flow diagrams illustrating various sub-module aspects of the dealer/retailer function of FIG. 49.
Figure 51:
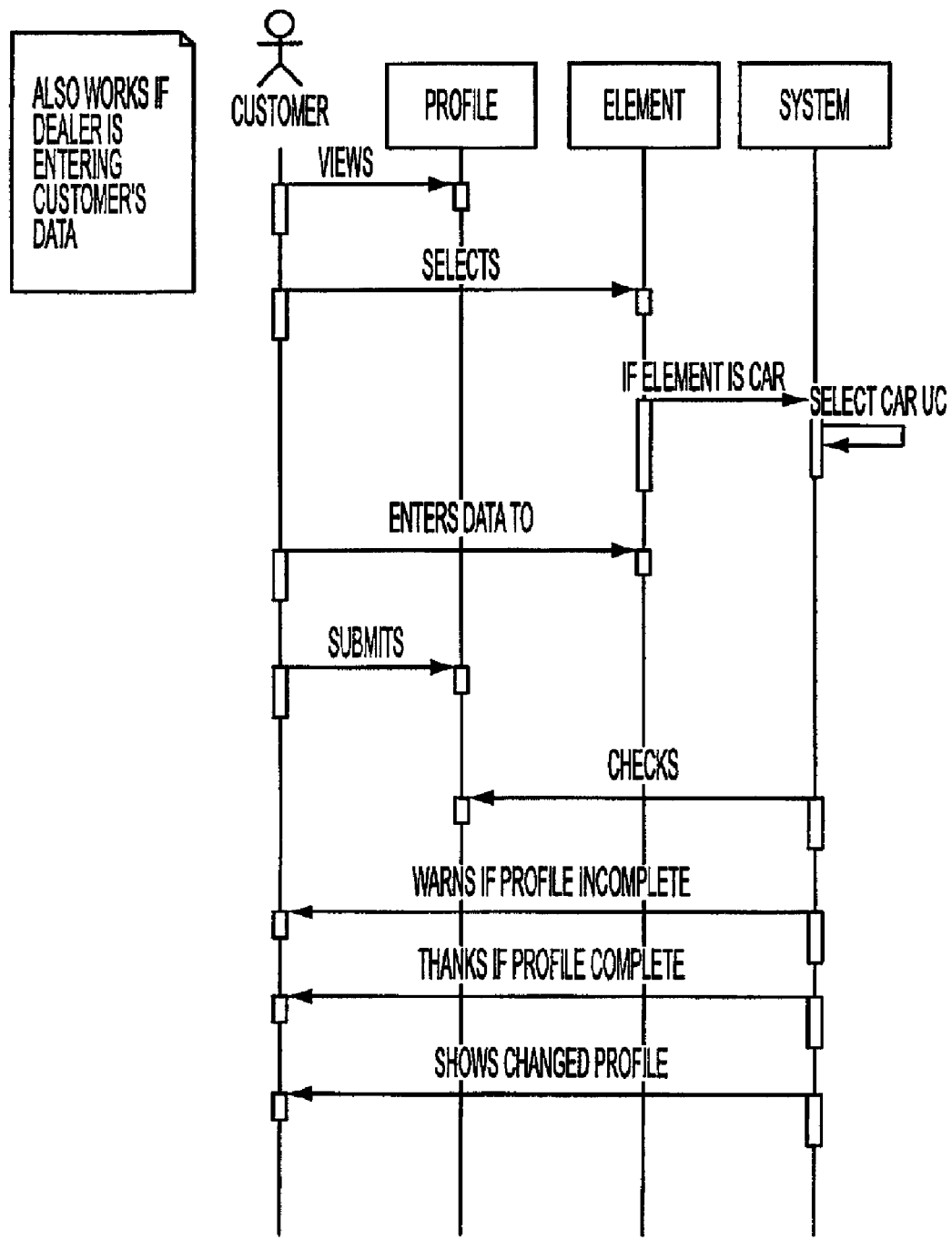
Figure 52:
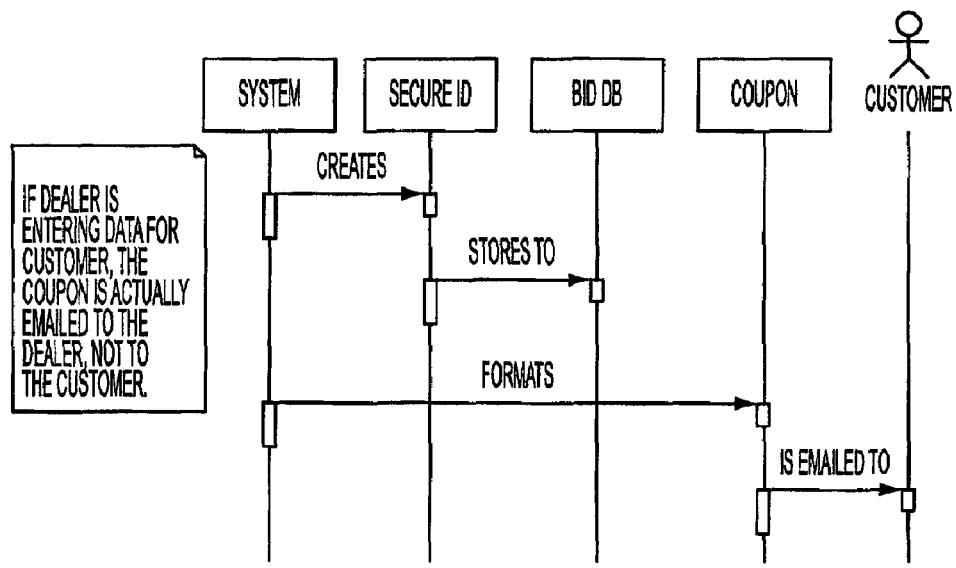
Figure 53:
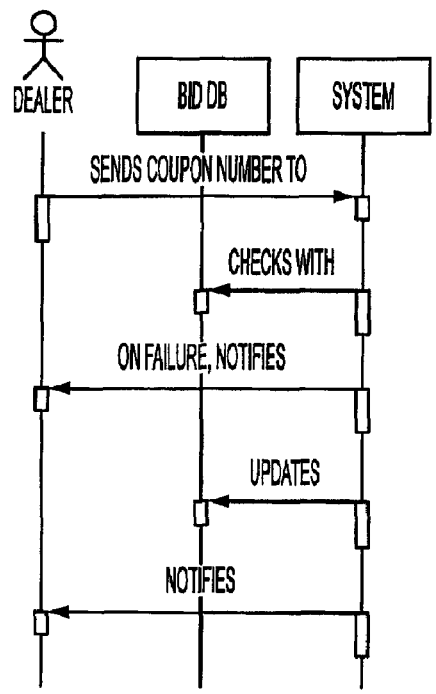
Figure 54:
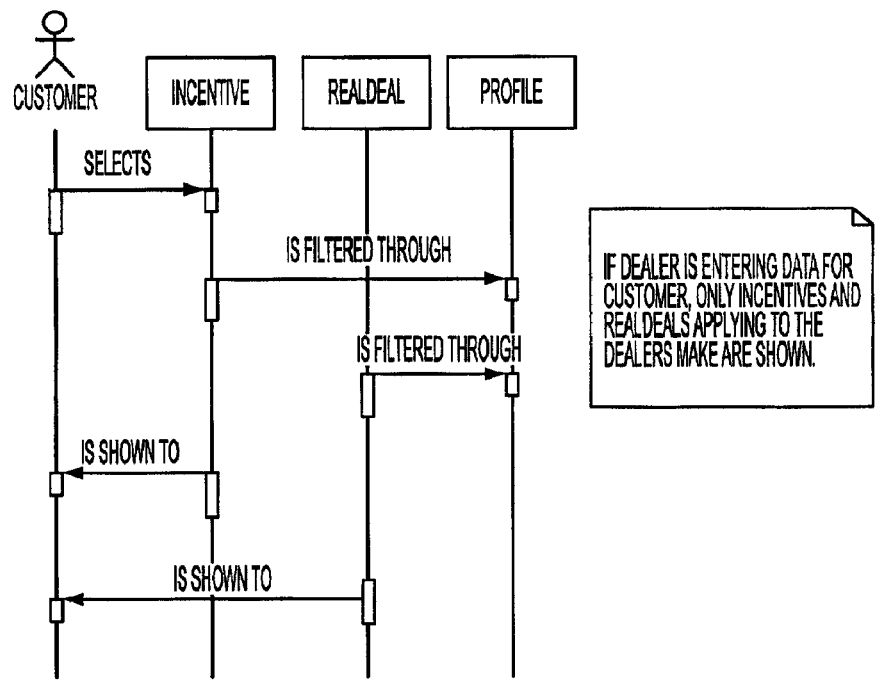
Figure 55:
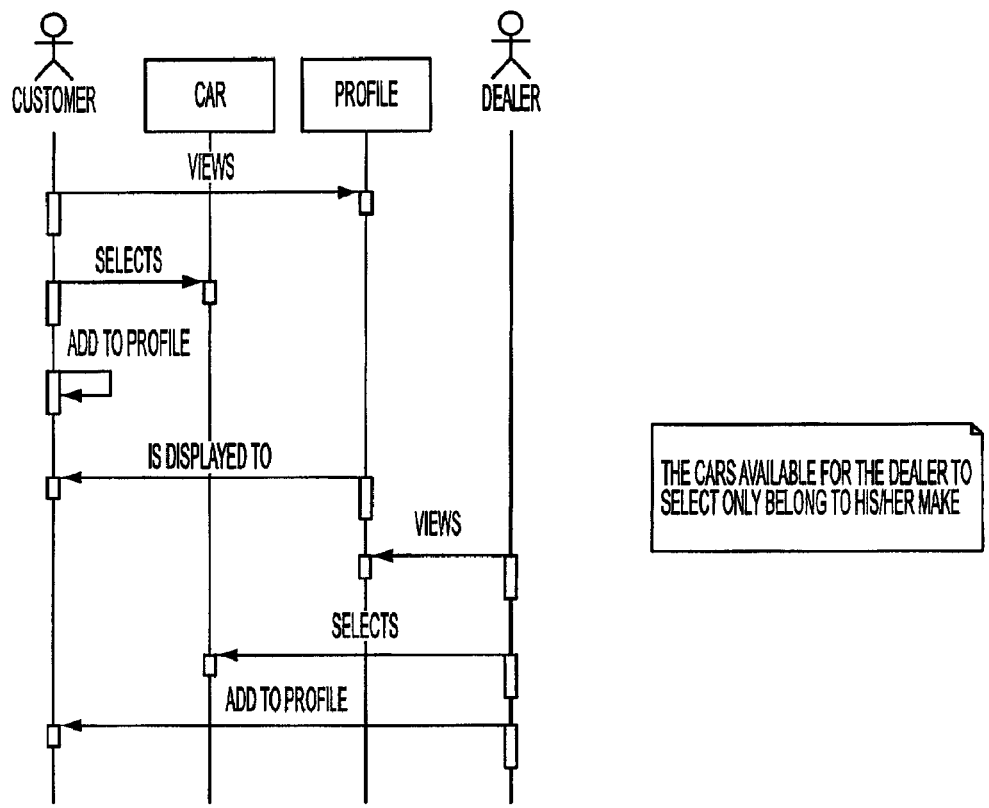
Figure 56:
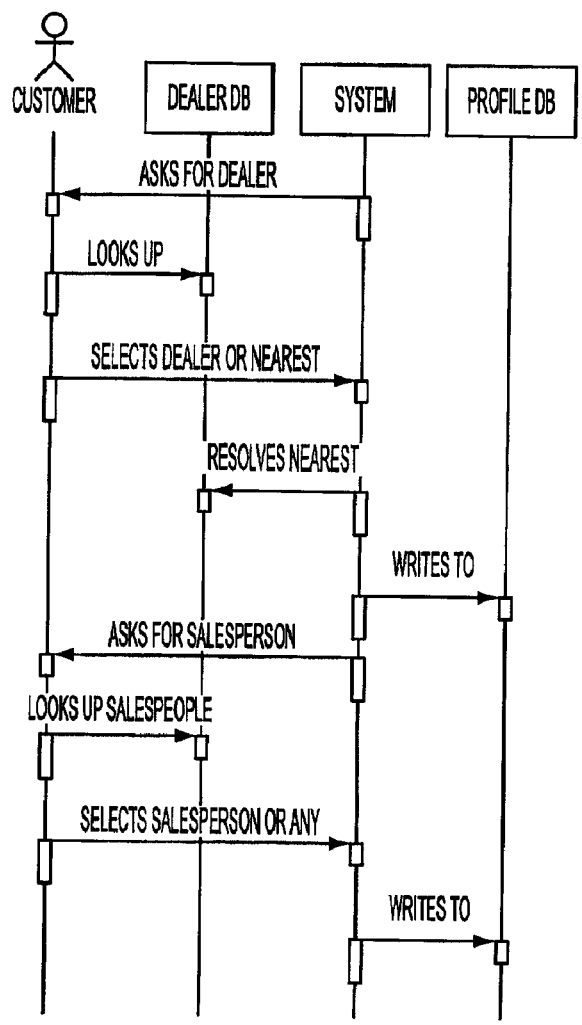
Figure 57:
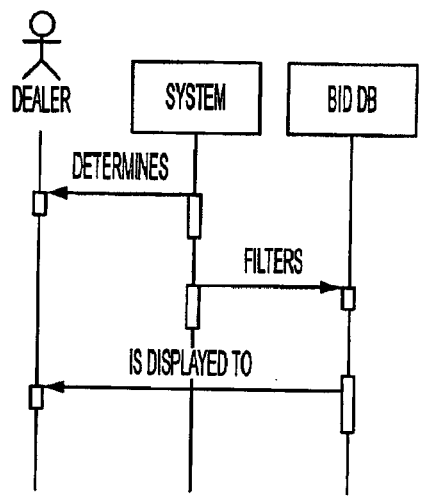
Figure 58:
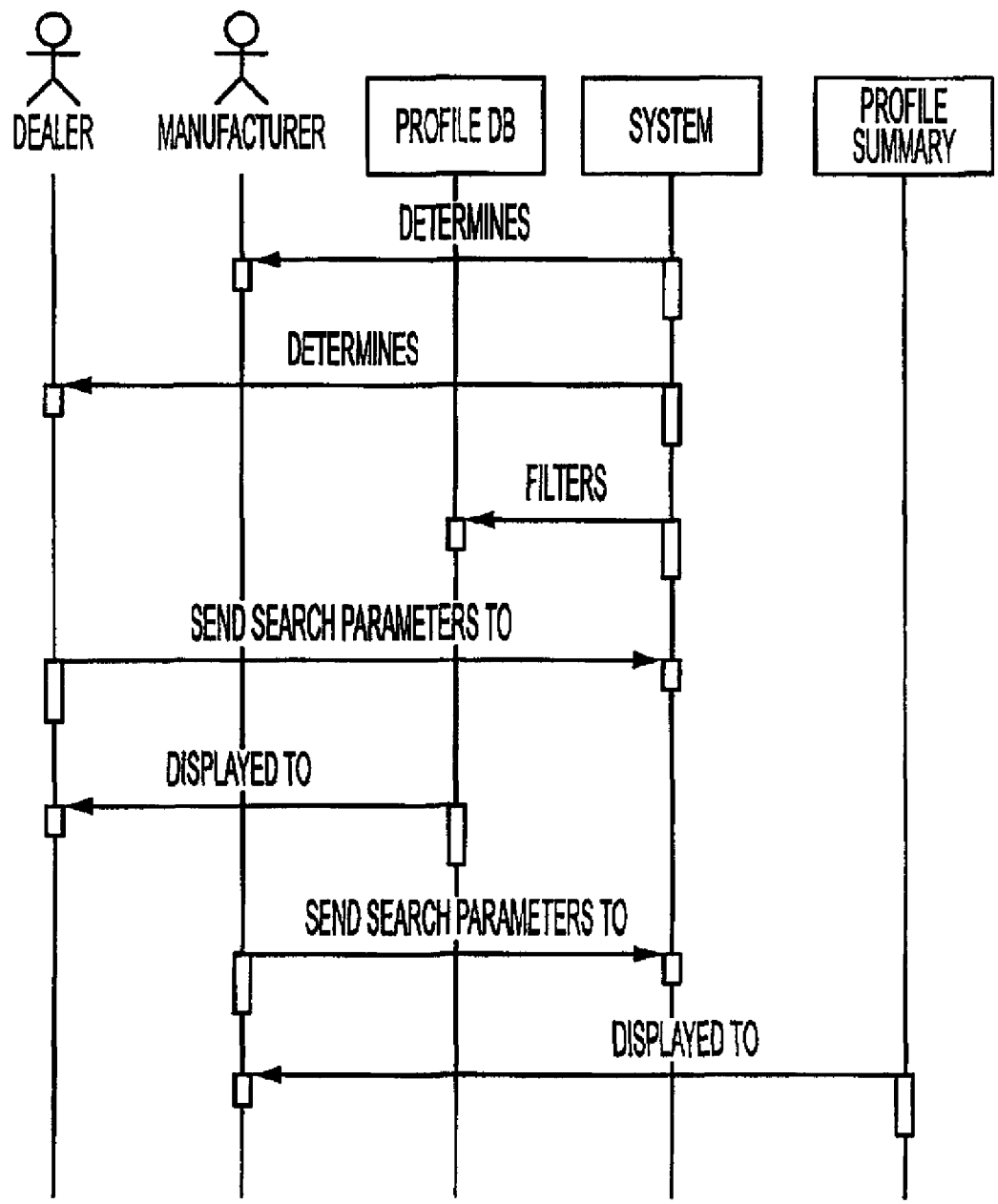
Figure 59:
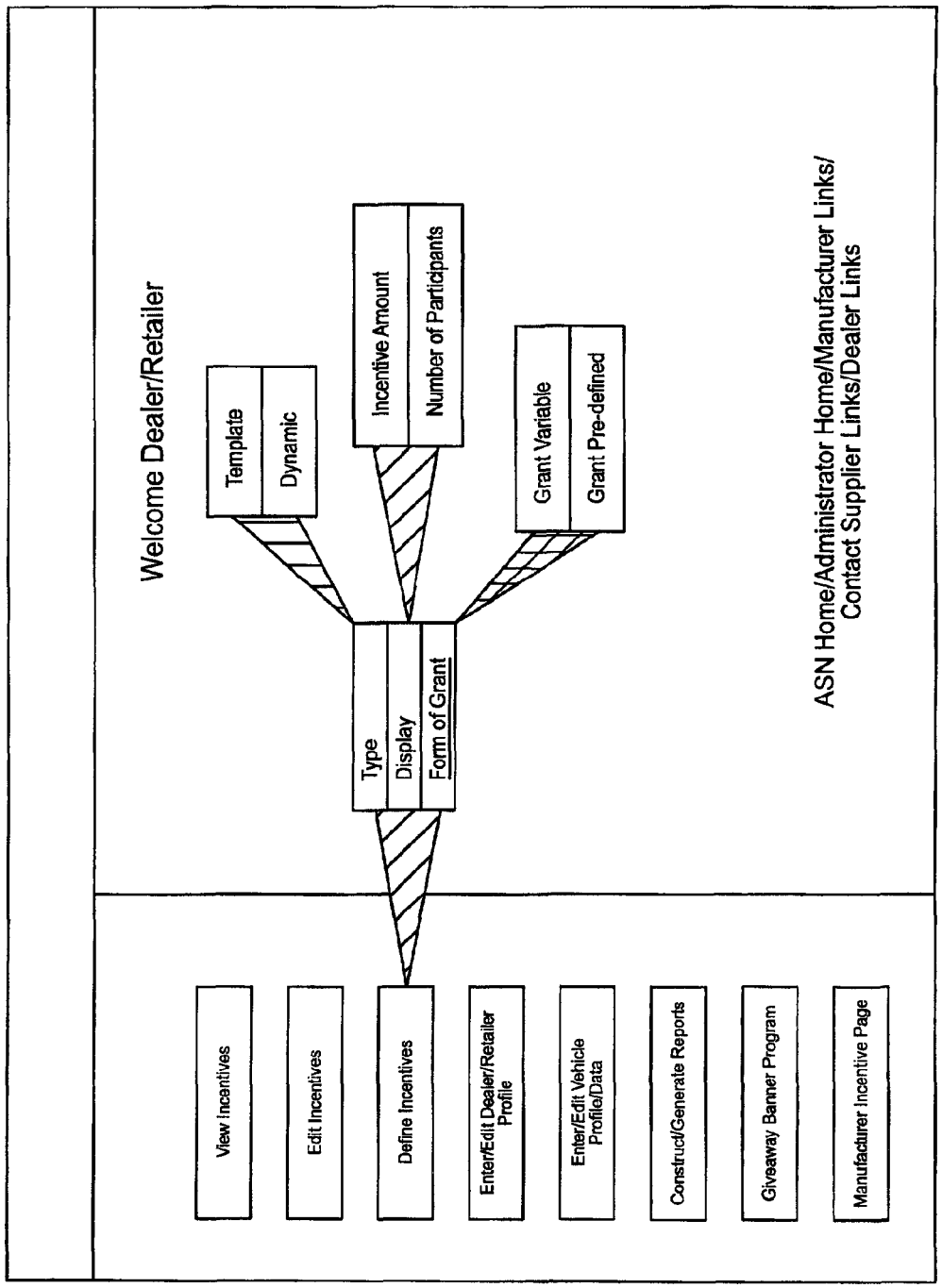
Figure 60:
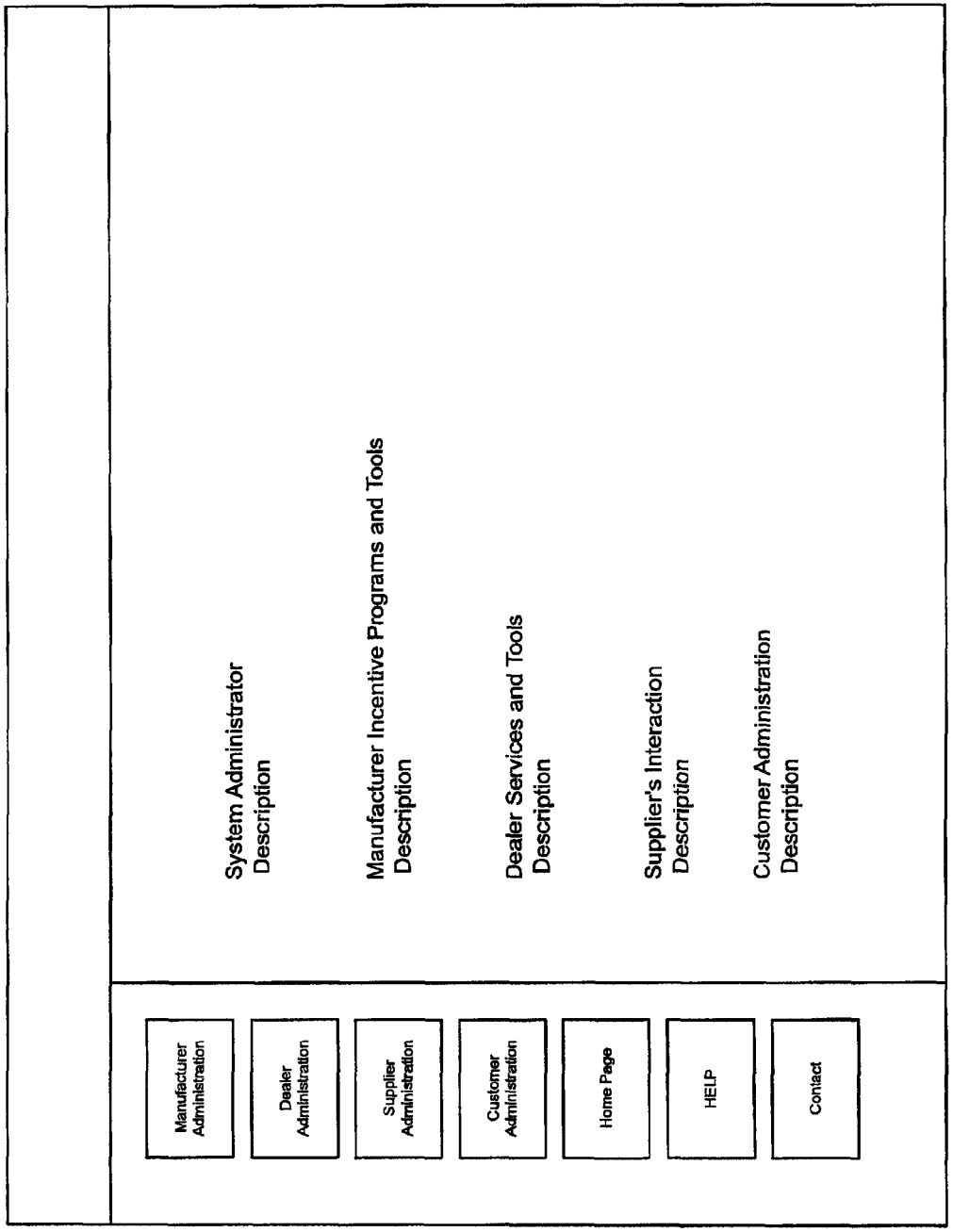
FIG. 60 is a sample screen shot of an administrator web page for use in a central system associated with the present invention.

With regard to manufacturers, and now referring to FIGS. 41-48, such as automobile manufacturers, the system administrator presents to participating manufacturers 406a a manufacturer home page, as illustrated in FIG. 48. From the home page, the manufacturer representative can access various modules. These may include, for example, incentive administration area 498, comprising modules to define an incentive, control an incentive, monitor incentives, show current demand, define regions and an incentive data trending and analysis area 499, comprising modules to show incentive history, perform trending and forecasting analysis, generate associated reports, and reconcile incentive redemption. One type of fixed incentive strictly defined by the manufacturer is characterized by fixed duration periods during which a manufacturer provides a configurable dollar incentive to a fixed population group for a fixed vehicle group in a fixed geographic area. The manufacturer representative begins the interaction by accessing the website and logging 470 into the system.

After logging onto the system, a manufacturer may define new incentives, which may be classified in multiple ways. For example, the manufacturer may define incentives as template-defined, in which certain levels of registered users trigger certain incentive levels, or as manufacturer-defined, in which the manufacturer controls the level of the incentive as needed during the incentive period. The manufacturer may additionally define incentives as visible, in which the current incentive value is shown to users, or invisible, in which only the number of participating users is known to the users. In either instance, the incentive value is made known to the user when the incentive period ends or when the incentive is granted to the user. The manufacturer may additionally define incentives as granted only at incentive end, i.e., where the incentive is not actually finally determined and made available to users until the conclusion of the incentive, or granted by user demand, i.e., where the incentive can be granted at the then-current value whenever the user so demands.

The system may also provide a means of relating the "define an incentive" process to the "show current demand" process, such that another process, external to the system, incorporating the manufacturer's business model may heuristically define incentives based upon current demand and competition.

Another incentive type provides for continuous manufacturer control. Such incentives are defined as manufacturer-defined incentives. The manufacturer defines a template, choosing threshold levels, such as the number of participating users, which trigger various incentive levels. The manufacturer may alter the template at any point during the existence of the incentive.

The manufacturer may monitor incentives at any point during the existence of the incentive. The manufacturer may see how many users have registered for the incentive and the current total incentive liability. For incentives which are granted by user demand, the manufacturer may also see how may incentives have been actually granted. The manufacturer may also model incentives, such as by an incentive modeling module, to try different incentive values to observe the commensurate impact on sales and incentive liability.

Another aspect of the manufacturer interface enables the manufacturer to run a series of reports or charts to determine current demand and incentive requirements. One possible use of the system, provided manufacturers willingness, is to permit the manufacturer to view demand at the make, model or trimline level, assessing demand against competing vehicles, by geographic area and by demographic segment in any combination. All competitive information would be known to all participating manufacturers.

The manufacturer may view historical incentive data, including numbers of participating customers who are eligible for an incentive, numbers of customers who have registered for an incentive, numbers of customers who have received a certificate, and numbers of customers who have purchased a vehicle. Such historical database analysis may be used to project the likely outcome of a current or future incentive.

The manufacturer may reconcile the list of incentive grantees with those who purchased a vehicle. This involves the connection between this system and an incentive processing system, which may be external to this system. For instance, there could be one such connection for each participating manufacturer. The list of incentive grantees would constitute a manifest, a list of all individual users granted a certificate for a particular incentive. This process may be used to detect error or fraud, for instance, in the event of multiple use of the same certificate or inappropriate application of a certificate.

Also, the manufacturer may define regions for control of incentive eligibility. These regions may be resolved down to the individual dealer level, allowing the manufacturer to establish any grouping of one or more dealers and define them as a region. The manufacturer may also define regions as aggregations of states, counties or ZIP codes.

The system is also capable of receiving and downloading customer profile data from and to the manufacturer 406 via access\upload customer profiles module 516\518. In this manner, a manufacturer may provide to the system administrator customer data information for data processing and maintenance at the system administrator. This customer data may be archived from past sales of the manufacturer or may be derived from other sources. Also, where customers have registered for incentives and provided customer data or where customers have otherwise indicated that their profile data may be shared with one or more manufacturers, the manufacturer 406 may access such customer profile data to manage processing and report generation at the system administrator or for internal storing and processing. The system administrator 404 may provide for multiple levels of authorization to the representatives of the manufacturer 406 so that only authorized representatives of the manufacturer may access certain information at the system administrator or accomplish certain tasks by and through the system administrator. A profile module may be provided at the manufacturer web page to permit a manufacturer's representative to enter or edit the manufacturer's profile. Or other means, such as by email 520 and other verifiable correspondence.

Now referring to FIGS. 49-59 and with regard to dealers/retailers, the system administrator presents to participating dealers 408*a* a dealer home page. From the dealer home page, the dealer representative can access various modules. These may include, for example, incentive data area 530, which comprises modules to define dealer incentives, monitor dealer and manufacturer incentives, and view past incentives, incentive processing area 532, which comprises modules to process incentives, generate rebates, pay service fees, and provide rebate redemption, customer emulation 534, which comprises modules to activate customer kiosk, select desired car, access\view incentives, enter/edit customer profiles, process customer participating, process service fee payment, and generate rebates, access\upload customer profiles 536, and view pending request data 538. The dealer representative begins the interaction by accessing the system and logging onto the system.

One aspect of the dealer webpage is to permit the dealer view the active incentive request list. For any user who has expressed an interest in an incentive and has either been awarded or is awaiting the award of an incentive coupon, and who has selected that dealer within their profile, the dealer may see the user profile including the status of the incentive offer, such as amount requested, amount granted, amount outstanding, expiration date.

The system enables the dealer to see upcoming incentives. As soon as an incentive is entered into the system by the manufacturer, whether or not it has started, it becomes visible to dealers of that manufacturer. This is advantageous to the dealer in providing proactive sales prospect management. In the alternative, a manufacturer may block dealer access to this or any other function associated with the manufacturer.

The system enables the dealer to monitor incentives in the same manner as the manufacturer can monitor incentives.

Based on customer consent and authorization, a dealer may upload customer profiles. In one manner, the dealer may collect customer profile data into a spreadsheet program, for example, and then load an entire set of customer profiles into the system at once.

The dealer may choose to validate coupons which the users are redeeming. In one manner, the dealer processes rebate certificates presented by customers for redemption or processing by entering the Vehicle Identification Number of the vehicle being purchased, and checking off a questionnaire produced by the system listing forms of verification accepted for the various incentive parameters. The system administrator 404 then validates the incentive as having been properly granted to the user. This is advantageous to the dealer, as it reduces dealer liability in mistakenly granting an incentive.

In viewing past incentives, the system displays to the dealer historical incentives for all manufacturers (or just the manufacturer of the dealer), showing, among other things, date, number of entrants, final incentive amount or range, number of coupons issued within the dealer's area, and number of coupons redeemed at that dealer. Alternatively, the dealer may request a report of all coupons issued and redeemed by make and model, showing for pre-selected time ranges the number of coupons and the maximum and minimum coupon values as well as the distribution of values within that range. This is advantageous to the dealer for sales forecasting.

In customer emulation mode 534, the dealer provides a public kiosk function. In this mode, the system displays a static image and a scrolling banner of the dealer's choosing. At any time that an incentive is active for that dealer's products, the scrolling banner changes to a scrolling banner announcing the incentive and its details. In the case of more than one incentive being active, the kiosk would alternately scroll the various active incentives.

Within this kiosk mode, there would also be a consumer registration function. Consumers activating this function are enabled to register and input profile information to system administrator 404 in the manner described above. In this manner, only information pertinent to that dealer would be made available to the user and the user's profile can automatically be associated with that dealer. At the kiosk, only cars sold by that dealer would be selectable by the user, and only that dealer and its sales personnel could be selected by the user. After a configurable period of no activity, the kiosk would automatically resume the incentive display. By keying in a password, a dealer may return the terminal to the dealer home page. When the registered user accesses the system administrator, such as on a home-based PC, the user has access to the full range of functions available to any other customer 402. It is only at the kiosk at the particular dealer 408 that the customer is presented with a display that is limited to the particular dealer.

Figure 10:
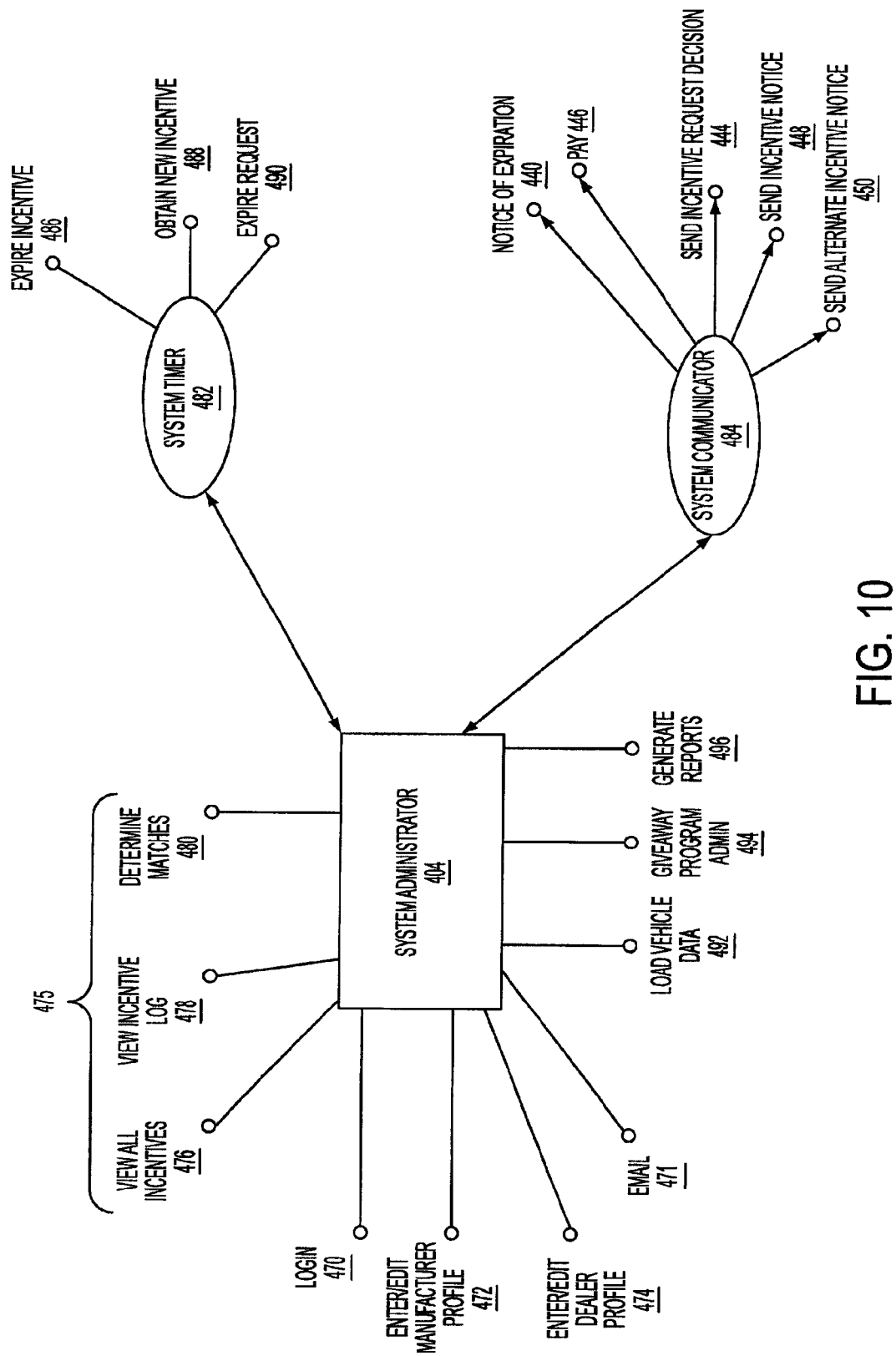
FIG. 10 is a schematic diagram illustrating the system administrator function of the system of FIG. 9.
Figure 11:
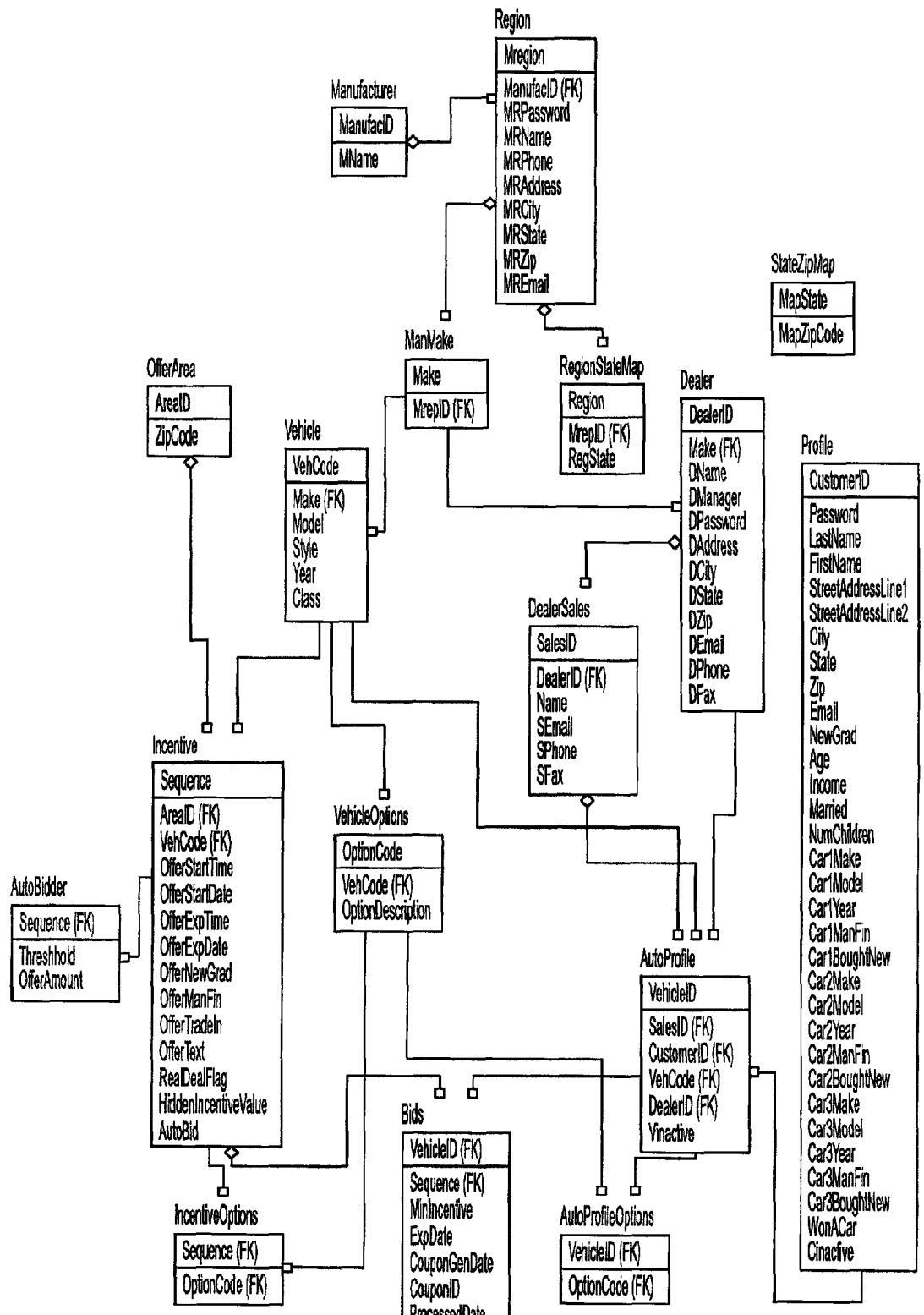
FIG. 11 is a logical data diagram illustrating the data content and relationships associated with modules used in implementing the system of FIG. 9.
Figure 12:
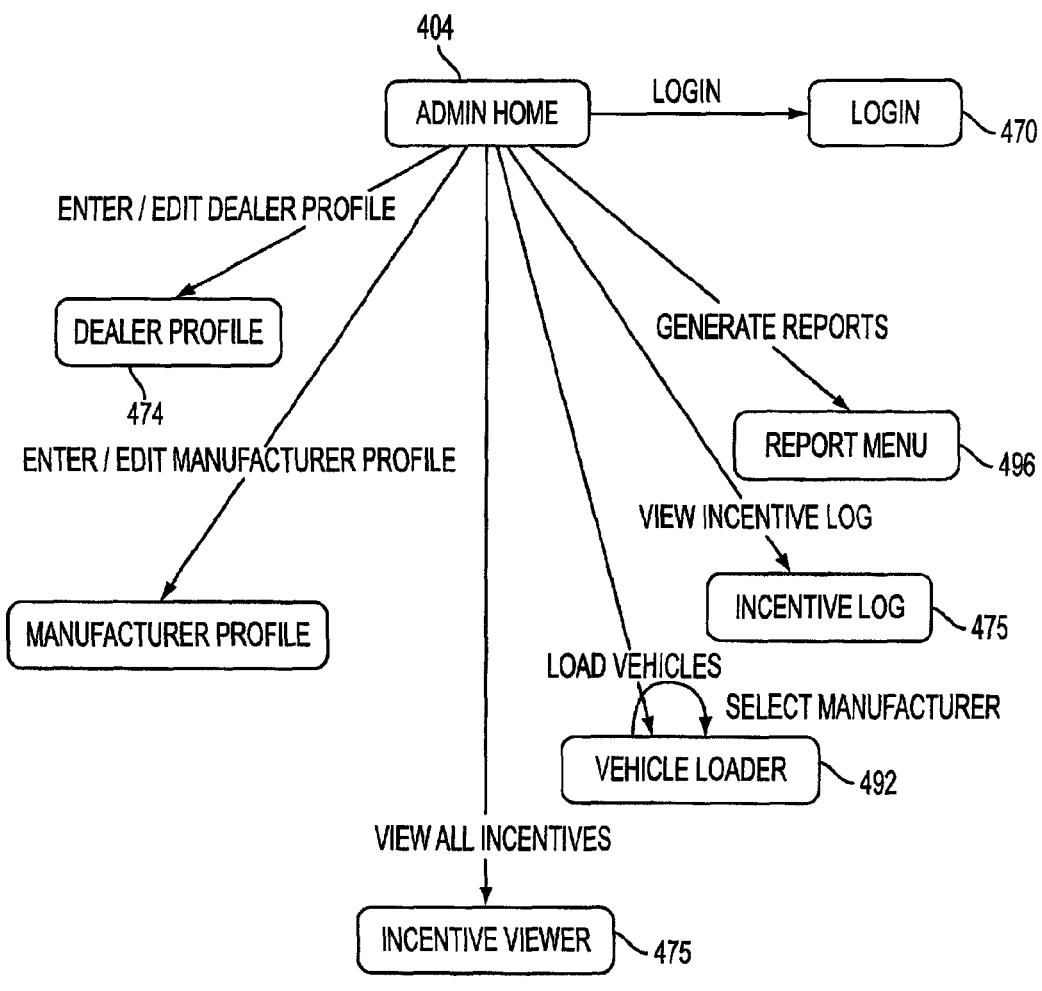
FIG. 12 is a schematic illustrating the functionality of the system administrator of the system of FIG. 9.
Figure 14:
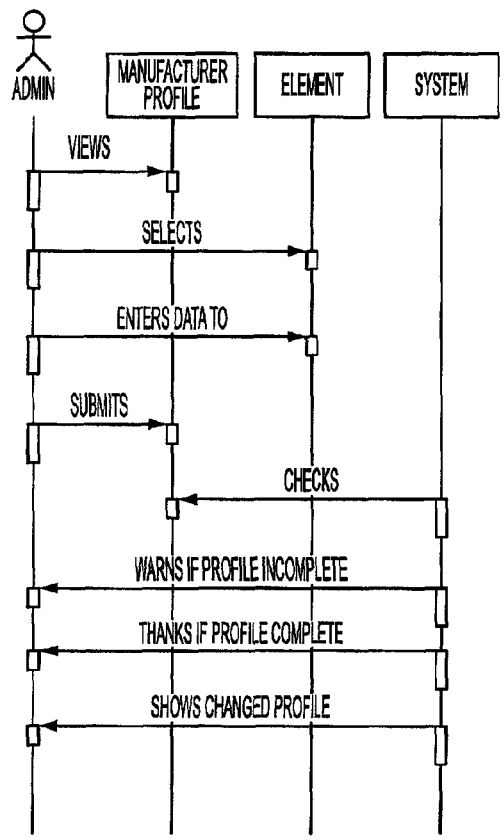
FIG. 14 is a functional flow diagram illustrating the manufacturer profile processing function associated with the system of FIG. 9.
Figure 15:
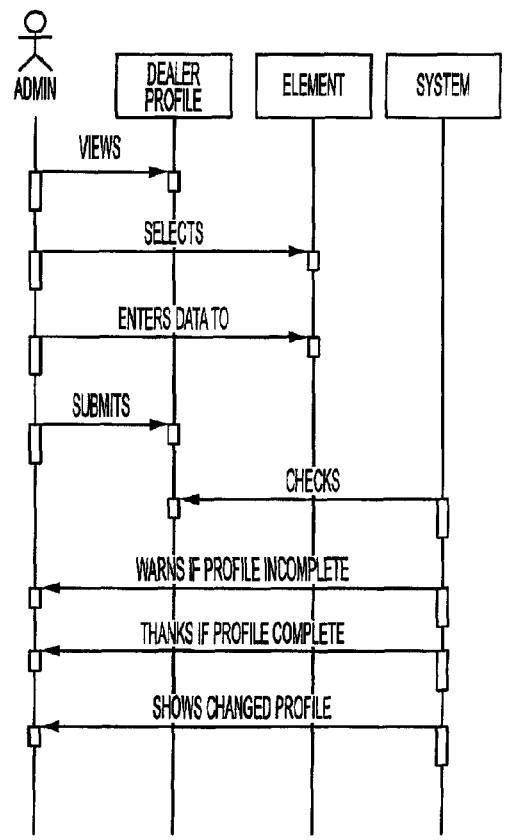
FIG. 15 is a functional flow diagram illustrating the dealer profile processing function associated with the system of FIG. 9.

With reference to FIG. 10, the system administrator 404 includes a number of modules employed to carry out the wide ranging functionality of the system, some of which have been described here in above. The login module 470, which is also illustrated in the informational flow chart of FIG. 13, enables access to the system administrator by the customer 402, manufacturer 406 and dealer/retailer 408. In addition, equipment suppliers to manufacturers 406 may be provided with a separate web page or other limited access to the system administrator, which may enable interaction among such suppliers and manufacturers to achieve various commercial goals such as real time or periodic updates of inventory, pricing, options, historical data, or other information of interest which may be used by the manufacturer in defining or accepting incentives.

In one manner, a manufacturer profile module 472 may be utilized by the system administrator to enter or effect changes to a manufacturer's profile based on information received via e-mail or other correspondence, or in the alternative, the profile module may be accessible by a manufactures representative to effect such changes in an online fashion. Only certain representatives may be provided access to this online module to prevent general access to all representatives to such data.

The dealer profile module 474 functions in like fashion. The system administrator receives vehicle data by the load vehicle data module 492, which may be handled in an online fashion by manufacturer 406. In the alternative, the manufacturer may provide data in some other fashion such as by attaching data files to e-mail messages or by delivery using other storage media. As described above, carried this may be in an online fashion so that only certain of the manufacturers representatives may be provided with access to the load vehicle data module.

The giveaway program administrator module 494 administers the giveaway program which involves products of a manufacturer 406 and for presentation to customers 402. For instance, a manufacturer 406 participating in a giveaway program interacts with the system administrator 404 through the giveaway program administrator module 494 to set up a desired giveaway program. This may involve a series of prompts presented to the manufacturer in an online fashion or by processing information received from the manufacturer in some other fashion such as via e-mail. Once a giveaway program is established, including all rules, requirements, and other such parameters, the system administrator presents customers 402 with a display informing the customers of the availability of the giveaway program. The customer is given the opportunity to register for the giveaway, such as via the register for giveaway module 414 as described above, which may be a sub-module of the giveaway program administration module 494 or a separate functional module.

The system administrator includes a module 496 which enables the manufacturers 406 and/or dealer/retailers 408 to generate reports of various kinds, such as related to current and past incentive programs. An incentive program administration module or module group 475 includes a module 476 for viewing incentives, a module 478 for viewing incentive logs, and a module 480 for determining matches among customers 402 and any and all incentives offered, or accepted pr rejected by the manufacturers 406 and/or dealer/retailers 408.

For example, after a customer 402 searches for cars and/or incentives of interest, and upon selecting an incentive of interest, such as a predefined incentive offered by the manufacturer 406, the customer submits the required information to the system administrator 404. The match determining module 480 of the system administrator 404 compares the customer incentive submission with the predefined manufacturer incentive parameters to verify that the requirements of the manufacturer for that particular incentive are met by the customer's submission. Upon verifying that a match exists, the system communicator 484 communicates the incentive notice 448 to the customer 402. The incentive notice may include a printable file and/or enabling commands to permit the customer 402 to download and/or print a certificate representing the incentive, such as a rebate coupon. Also, the incentive match may be maintained electronically by the system administrator and may be accessible by the dealer/retailer 408 and manufacturer 406. In this manner, the customer 402, upon purchasing an automobile manufactured by manufacturer 406 from dealer 408 receives the benefit of the incentive from the dealer at time of purchase.

In the alternative, customer 402, after searching and selecting one or more cars of interest, may, instead of selecting a predefined manufacturer incentive, submit a request for incentive to the system administrator 404. The request for incentive includes criteria defined by the customer 402 that if met by a manufacturer 406 or dealer 408 would cause the customer to purchase the vehicle that is the subject of the incentive. The system administrator 404 may provide specific notice of the request for incentive to the manufacturer 406 or the manufacturer 406 may periodically access and monitor a system administrator database maintaining such incentive request data, the manufacturer may then determine whether to accept the customer -defined incentive, to deny or reject the customer incentive, to propose an alternative incentive at variance to the customer-defined criteria, or to aggregate data associated with a plurality of customer-defined incentive requests and/or historical incentive data to make the determination of acceptance or rejection.

Further, the manufacturer may employee a predefined selection routine and/or predefined selection criteria to automate, in whole or in part, the process of accepting, rejecting, or submitting counter-proposals to customer incentive requests. In one manner, the manufacturer 406 can offer an alternative incentive in an online fashion and communicate the alternative incentive via sub-module 450 on the system communicator 484 to the customer 402. Upon receiving the alternative incentive, the customer 402 may accept or reject the alternative incentive or submit a revised incentive request as a counter-proposal. As described herein above, upon accepting a manufacturer-defined incentive or upon submitting an incentive request, the customer 402 pays a fee, such as $50.00, to establish a level of commitment to act on the incentive and to purchase the incented car upon acceptance by a manufacturer 406.

Figure 18:
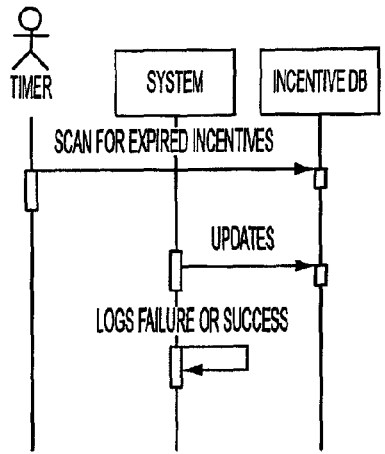
FIG. 18 is a functional flow diagram illustrating the expired incentives function of the timer module of the system of FIG. 9.
Figure 19:
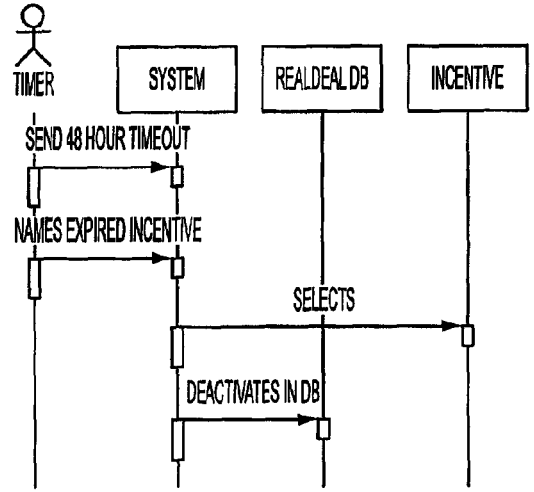
FIG. 19 is a functional flow diagram illustrating the incentive expiration function of the timer module of the system of FIG. 9.

The system administrator 404 also includes a system timer module 482 which provides various functions related to monitoring expiration dates associated with incentives and periodic or other updating of the incentive, vehicle, and other databases. As shown in more detail in FIG. 18, sub-module 486 relates to the automatic expiration of incentives wherein the system timer module scans for expired incentives, such as by scanning an expiration data field included in the incentive data stored in the incentive database. The timer updates the incentive database such as by disabling the incentive so that all expired incentives are no longer visible or viewable by the customer 402 via the incentive investigation and processing module 428, as illustrated in more detail in FIG. 23. However, expired incentives may be viewable or visible to customers as past incentives.

Figure 20:
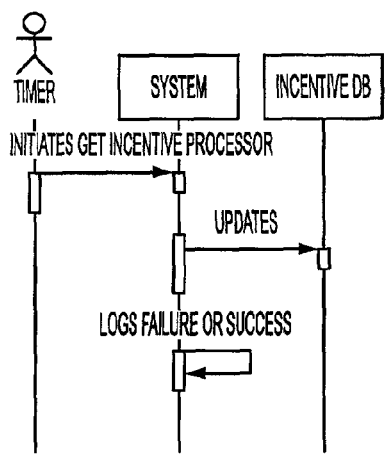
FIG. 20 is a functional flow diagram illustrating an aspect of the incentive installation function of the timer module of the system of FIG. 9.

Sub-module 488 obtains new incentives, such as by periodically accessing a database maintained by manufacturer 406 or by other means, from the manufacturers. This module can also be used to periodically update existing and pending incentives with altered data provided by the manufacturer. This process is shown in FIG. 20. The expire request sub-module 490 scans all customer initiated incentive requests in a periodic fashion to determine if any such incentive requests have expired. This may be based on a customer-defined expiration criteria or on an internal limit expiration timer.

One aspect of the customer incentive request process may involve the customer setting up a desired car profile which may be associated with a customer-defined incentive request. Upon the expiration of the customer incentive request, the system may, such as through system communicator 484, send an expiration notice 440 to the customer 402 to notify the customer that their incentive request has expired. Such notice may include a prompt or other means to enable the customer to change the expiration date, change other incentive request criteria data, or investigate other related or qualified incentives. As an example, the expiration notice may be in the form of an e-mail message addressed to the customers e-mail address contained in the customer profile and may include a hot link to the customer home page. The e-mail may also contain a hot link directly to the customers car profile page where the customer can click a "renewed bid" button or the like associated with the car profile. The system administrator 404 may coordinate the operation of the system timer module 482 and the determine incentive match module 480 as well as the system communicator module 484 and the e-mail module 471 to carry out the process illustrated in FIG. 21.

Figure 21:
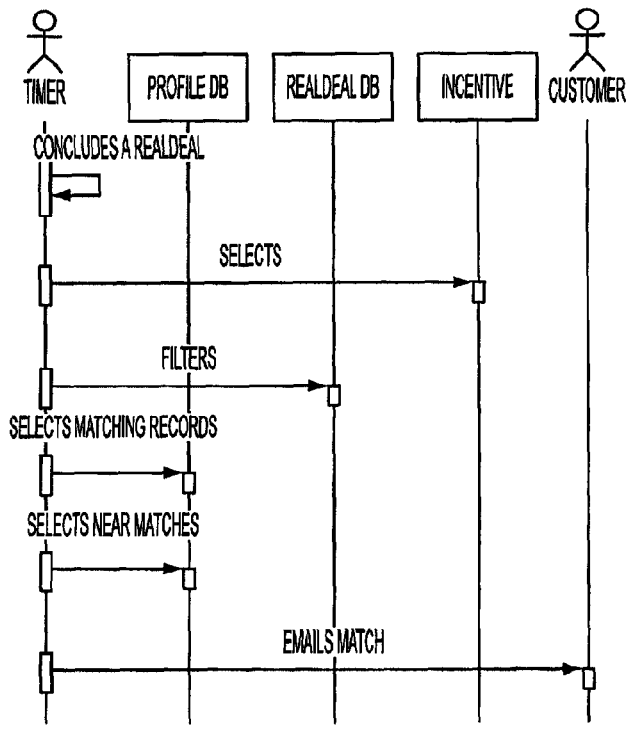
FIG. 21 is a functional flow diagram illustrating one aspect of the incentive matching process associated with the timer module of the system of FIG. 9.

The "real deal" of FIG. 21 is a type of interactive incentive that can take many different forms and involve many different processes. For example, a typical real deal would involve a manufacturer specifying a vehicle that is the subject of the incentive as well as the particular model or options that are included in the specified vehicle. The manufacturer also identifies a start date and time as well as an end date and time, or in the alternative, the real deal may be open ended with the manufacturer terminating the real deal in an announced or an unannounced fashion at a time of its choosing.

Typically, a fixed incentive value is associated with the real deal. Also, a customer may conditionally participate in the real deal incentive based upon a required minimum entry level, that is above the minimum incentive value or current incentive value associated with the real deal. Through incentive administration module 498, the manufacturer 406 may monitor the submitted minimum requirements offered by customers conditionally participating in the real deal incentive. Through a decisioning routine and/or some other process the manufacturer may elect to raise the minimum or current incentive value, or other parameter, associated with the real deal. This decisioning may be based upon an analysis of the number of participants indicating a willingness to act on the incentive and the level of incentive necessary to attract the respective groups of conditionally participating customers. At the end date of the real deal or upon manufacturer termination of the real deal incentive, the manufacturer finalizes and extends the incentive offer in its final form or it may pull the offer if a minimum number of participants is not met or based on some other reason.

As shown in FIG. 21, the timer concludes the real deal based upon a defined end date and time and identify matches and near matches by comparing the final real deal incentive parameters against the customer profile incentive data. For instance, where a customer registered for a real deal incentive regardless of the final incentive value, then a match automatically is generated and the customer is notified of the match and of the available incentive.

Where a customer indicated a conditional participation in the real deal incentive by requiring a certain minimum incentive value, then the system matches the respective data of the real deal incentive and the customer profile incentive to determine if the parameters match. In the event that the final real deal incentive value is equal to or greater than the minimum required incentive value of the customer, then the customer will receive notice of a match and available incentive. The notice will include at least certain incentive parameters such as the incentive value, the expiration date for redeeming the incentive, identify the selected vehicle, and may include other information such as the nearest dealer, etc.

In the event the customer incentive parameters do not match the final real deal incentive parameters, then the system may send notice to the customer that the final real deal incentive does not match the required parameters of the customer and offer the customer the opportunity to accept the final real deal incentive or some other alternative incentive as defined by or generated by the manufacturer.

In order to persuade customers to accept the real deal incentive while pending as opposed to requiring an elevated or predefined minimum requirement, the real deal incentive may give indication to the customer that if the customer's minimum requirements are not met, then the final real deal incentive value will not be offered to the customer. This indication could also provide that the customer may be offered an incentive value somewhat reduced from the final incentive value. In addition, periodic updates may be e-mailed or otherwise made available to the customers to indicate the status of the real deal incentive and also provide a pre-termination notice of qualification for the real deal incentive. In exchange for an incentive offering, a manufacturer may require a customer to pay a fee to show a level of commitment to act on the incentive and purchase the subject vehicle. The system communicator 484 performs much of the notice functionality describe herein above.

Referring to FIG. 22, upon customer login, the system administrator 404 presents the customer 402 with a personalized web page 403. The web page 403 includes a series of buttons 411 that enable the customer to access various informational databases and resources and to perform various acts. For instance, the buttons 412 relate to the module for editing a customers profile. The buttons 416 relate to the module, or group of modules, associated with car and manufacturer searching and selection. The group of buttons 428 relate to the module associated with incentive investigation and processing, whereby the customer can search for and select incentives, submit customized incentive requests, search past incentives, and look ahead to upcoming incentive programs. Both the banner and the button marked 414 relate to the module for presenting the giveaway program to the customer and enabling the customer to register for the giveaway program.

Upon selecting a button of interest, the system administrator 404 presents to the customer a separate web page, at least in part devoted to the selected subject, and having additional functionality associated with that subject. For instance, upon selecting the find cars button 416, the customer is presented with a page dedicated to the searching and selection of cars. The customer may be presented with various pull down windows for selecting cars by manufacturer, model, price range, style, etc., each of which may have an additional pull down menu. For instance, upon selecting a particular manufacturer, the customer may be presented with a further pull down for selecting a particular model(s) of that manufacturer. In addition, articles of interest may be made available to the customer and/or links to resources helpful in selecting cars of interest to the customer.

Upon selecting a particular vehicle, the customer may then search to find any available incentives for that vehicle. In the event that no available incentives are offered or of interest to the customer, the customer may submit a request for incentive to the manufacturer identifying one or more required criteria, e.g. a minimum incentive value. The customer may be required to pay a fee to indicate a commitment to the manufacturer to act on and redeem the requested incentive in the event the requested incentive is accepted by the manufacturer. To assist the customer in making an incentive request, the system may provide the customer with one or more pull down windows or data entry fields.

In addition to or as part of this process, the customer may be presented with a car profile. A customer may enter a vehicle of interest including information such as make, model, style, options, price range, color, etc. The system administrator 404 monitors car profile data and, if permitted by the customer, makes the data available to the manufacturer of the desired vehicle and/or additional manufacturers having comparable models. The system notifies the customer in the event an incentive of interest becomes available to the customer. The system administrator compares the customer profile and the car profile against incentive data and utilizes a rule-based decisioning technique, or other such approaches, to determine incentives potentially of interest to the customer for presenting to the customer.

While the foregoing has been described in connection with an automobile rebate system, the invention relates generally to incentives-based systems for providing inducements to customers to purchase goods or services via traditional retail facilities or e-commerce retail facilities.

The service need not be a commercial service, but rather may be a service or function provided by or on behalf of a governmental or corporate entity. For example, a governmental agency may be desirous of having significant participation among a class of persons, it being understood that the term persons includes both living and non-living entities such as companies, in a particular program, e.g., environmental protection, child care, health, labor, etc.

In exchange for receiving benefits from an agency or for taking a defined course of action, e.g., implementing pollution abating scrubbers at a plant, a participating person may receive some defined incentive, such as a tax credit or deduction. Such a program may include a predefined range from a minimum to a maximum level of credit. Where such a program has a fixed budget, the actual incentive value may be determined based on the number of participants, e.g., if there is a budget of $10,000.00 and there are ten participants, then each participant receives $1,000.00; five participants then the value is $2,000.00 per participant. In this manner a governmental agency or corporation may fix the costs associated with various programs.

Other embodiments and uses of the invention will be apparent to those skilled in the art from consideration of the specification and practice of the invention disclosed herein. The specification and examples should be considered exemplary only. The intended scope of the invention is defined by the following claims and is not limited to the examples described herein.

We claim:

1. An online system configured to present incentives over a distributed network, the incentives being presented over the distributed network to potential purchasers of goods or services associated with the incentives, the system comprising:
   one or more servers that communicate with remote user terminals over a network, the one or more servers comprising:
      non-transient electronic storage that stores incentive information pertaining to incentive offers available from a plurality of offerors; product information pertaining to goods or services associated with the incentives; and user profile information pertaining to users of the system; and
   one or more processors that execute computer modules, the computer modules comprising:
      an incentive data output module that determines which if any of the incentives should be offered to the individual users based on the incentive information and the user profile information;
      a product module that transmits information pertaining to incentives and the associated goods or services which should be offered to the individual users to the remote user terminals for presentation to the users, wherein the product module is configured such that responsive to the incentive data output module determining that a first incentive should be offered to a first user, the product module transmits incentive information and product information associated with the first incentive to a remote user terminal for the first user;
      an incentive data input module that receives user selections of individual incentives that have been received by the users from the remote user terminals;
      a payment module that prompts users for payment of user selected incentives, wherein the payment module is configured such that, responsive to reception at the incentive data input module of a selection of the first incentive by the first user, the payment module transmits a prompt for payment to the remote user terminal for the first user; and
      an incentive dispersal module that transmits incentive information to the remote user terminals to enable the users to redeem incentives for which they have paid, wherein the incentive dispersal module is configured such that, responsive to receipt of payment by the first user for the first incentive through the prompt transmitted by the payment module, the incentive dispersal module transmits incentive information to the remote user terminal for the first user that enables the first user to redeem the first incentive.

2. The system of claim 1, wherein the incentive data output module is configured such that one or more incentive parameters of the first incentive are dynamic and vary between users based on the user profile information for the users.

3. The system of claim 1, wherein the user profile information includes user requested incentive parameters.

4. The system of claim 1, wherein the incentive information enabling redemption of the incentives comprises a certificate that is printable at the remote user terminals.

5. The system of claim 4, wherein the offeror of the goods or services associated with a redeemed incentive reimburses the user the amount of the user fee or conveys like value.

6. The system of claim 1, wherein the incentive information further comprises geographic regions in which the individual incentives should be offered, and wherein the geographic regions are set by the offerors.

7. The system of claim 1, wherein the computer modules retain at least a portion of payment received from the users for the operator of the system.

8. The system of claim 1, wherein the computer modules receive user profile information from a graphical user interface presented to the users via the remote user terminals.

* * * * *